US 9,535,891 B2

(12) United States Patent
Raheja et al.

(10) Patent No.: US 9,535,891 B2
(45) Date of Patent: Jan. 3, 2017

(54) SYSTEM AND METHOD FOR REAL TIME TEXT STREAMING

(75) Inventors: Virendra Raheja, New South Wales (AU); Nagesh Chopra, Chandigarm (IN)

(73) Assignee: Access Innovation Media Pty Ltd (AU)

( * ) Notice: Subject to any disclaimer, the term of this patent is extended or adjusted under 35 U.S.C. 154(b) by 881 days.

(21) Appl. No.: 13/388,522

(22) PCT Filed: Aug. 6, 2010

(86) PCT No.: PCT/AU2010/000997
§ 371 (c)(1),
(2), (4) Date: Feb. 7, 2012

(87) PCT Pub. No.: WO2011/014927
PCT Pub. Date: Feb. 10, 2011

(65) Prior Publication Data
US 2012/0197770 A1    Aug. 2, 2012

(30) Foreign Application Priority Data

Aug. 7, 2009 (AU) ............................ 2009903717
Apr. 23, 2010 (AU) ............................ 2010901731

(51) Int. Cl.
*G07B 17/00* (2006.01)
*G07F 19/00* (2006.01)
(Continued)

(52) U.S. Cl.
CPC ........... *G06F 17/2258* (2013.01); *G06F 17/24* (2013.01); *G06Q 40/12* (2013.12); *G10L 15/26* (2013.01)

(58) Field of Classification Search
None
See application file for complete search history.

(56) References Cited

U.S. PATENT DOCUMENTS

2008/0295040 A1    11/2008    Crinon

FOREIGN PATENT DOCUMENTS

EP            2106121 A1    9/2009
WO    WO 01/95631 A2    12/2001

OTHER PUBLICATIONS

Extended Search Report for European Patent Application No. 10805892.6, dated Nov. 24, 2014, 7 pages.

(Continued)

*Primary Examiner* — Fateh M Obaid
(74) *Attorney, Agent, or Firm* — Sheridan Ross P.C.

(57) ABSTRACT

The present invention relates to a system and method for real time streaming of a text string which is periodically updated. The system and method is adapted to enable live, real time, delivery of text-captioned voices/sounds to one or more viewers in the same or different physical locality as the voice/sound which is being captioned. The system comprises streaming means adapted to communicate with a server and to process a first text string inputted via first text input means and update the first text string in real time with additional or edited text string portions inputted via second text input means to thereby generate a second text string; control means adapted to periodically monitor a state of at least the second text string and generate an output text string therefrom, the output text string being communicated to a server for streaming to a text viewing means; wherein the output text string is updated in real time to substantially correspond to the second text string, such that the output text string represents the updated text string, thereby facilitating editing of text string portions already communicated to the server.

33 Claims, 31 Drawing Sheets

(51) Int. Cl.
  *G06F 17/22* (2006.01)
  *G06F 17/24* (2006.01)
  *G06Q 40/00* (2012.01)
  *G10L 15/26* (2006.01)

(56) References Cited

OTHER PUBLICATIONS

International Search Report Prepared by the Australian Patent Office on Sep. 13, 2010, for International Application No. PCT/AU2010/000997.

Written Opinion Prepared by the Australian Patent Office on Sep. 13, 2010, for International Application No. PCT/AU2010/000997.

Figure 7: Transcript (Captions) Delivery to Viewer Algorithm

Figure 7: Transcript (Captions) Delivery to Viewer Algorithm

Figure 9 : Viewer Display formatting and highlighting of new text and editing changes

SYSTEM AND METHOD FOR REAL TIME TEXT STREAMING

CROSS REFERENCE TO RELATED APPLICATIONS

This application is a national stage application under 35 U.S.C. 371 of PCT Application No. PCT/AU2010/000997 having an international filing date of 6 Aug. 2010, which designated the United States, which PCT application claimed the benefit of Australian Application No. 2009903717 filed Aug. 7, 2009, and Australian Patent Application No. 2010901731 filed Apr. 23, 2010, the entire disclosures of which are incorporated herein by reference.

FIELD OF THE INVENTION

The present invention is broadly directed to a system and method for real time text streaming, and more particularly, to a system and method for real time streaming of a text string which is periodically updated. In some preferred embodiments, the system and method is adapted to enable live, real time, delivery of text captioned voices/sounds to one or more viewers in the same or in a different physical locality as that of the voice/sound which is being captioned. The system and method of some preferred embodiments is adapted to accommodate multiple users and multiples sessions in which the same or different voices/sounds are being captioned.

BACKGROUND OF THE INVENTION

Any reference to or discussion of any document, act or item of knowledge in this specification is included solely for the purpose of providing a context for the present invention. It is not suggested or represented that any of these matters or any combination thereof formed at the priority date part of the common general knowledge, or was known to be relevant to an attempt to solve any problem with which this specification is concerned.

It is known to use captioning facilities to provide a text-based screen display of spoken dialogue and important sounds in, for example, a television show. Captioned text is typically pre-entered into a video comprising the television show or is streamed over a bandwidth to televisions on which the television show is being watched.

European Patent Application EP 2106121 describes a subtitle generation method for live programming. A subtitling technician is assigned to each participant in the particular scene for which subtitles are being generated. Each subtitling technician repeats the words (or a summary thereof) spoken by their assigned participant into a microphone, with the audio signal from the microphone being directed into a voice-to-text recognition system. The generated text is forwarded to a subtitling editor for correction and formatting prior to being inserted in the broadcast stream, for broadcast with the audiovisual signal of the original scene.

In these and related contexts, the term "captioning" typically refers to the on screen display of text for spoken dialogue and other important sounds. In video terminology, a caption typically means a text representation of the audio accompanying the video. Captions are often used by those viewers who are hearing impaired, and will describe what is being said, including emotions, and background sounds.

In these and related contexts, the term "streaming" typically refers to the technique of transferring data such that it can be processed as a steady and continuous stream. Streaming technologies are becoming increasingly important with the growth of the Internet, to avoid the need to download large multimedia files quickly. With streaming, the client browser or plug-in can start displaying the data before the entire file has been transmitted.

Technological advancements have made possible innovations in access solutions that combine captioning and streaming—typically referred to as "text streaming". Text streaming over the Internet caters to the need for streaming and delivering captions for individual or group events in real time.

Examples, of some currently available streaming technologies include:
1. Quick Time Streaming Media Player
2. Real Media Player
3. MP3—an audio encoding format using data compression.
4. Windows Media Player
5. Adobe Flash Player These and other currently available streaming technologies have a number of shortcomings. For example, they typically do not allow contemporaneous editing of generated and already streamed content. This means that errors identified in already streamed text strings cannot be corrected for the viewer during a live viewing session. Many of the currently available streaming technologies do not work reliably or at efficient speeds in low bandwidth environments and are typically highly resource intensive. They also do not typically provide display formatting control to viewers of streamed content, are not capable of being delivered through standard web browsers and do not typically deliver authentication control. In addition, currently available streaming technologies do not typically permit interactivity, and they typically only accommodate a single user.

Moreover, currently available streaming technologies do not provide secure, real time, low bandwidth, editable, multi-session, interactive live text streaming to a customisable display in a standard web browser.

The present invention is directed to a system and method which addresses at least some of the above noted shortcomings of currently available streaming technologies.

SUMMARY OF THE INVENTION

According to a first aspect, the present invention provides a system for real time streaming of a text string which is periodically updated comprising:
   streaming means adapted to communicate with a server and to process a first text string inputted via first text input means and update the first text string in real time with additional or edited text string portions inputted via second text input means to thereby generate a second text string;
   control means adapted to periodically monitor a state of at least the second text string and generate an output text string therefrom, the output text string being communicated to a server for streaming to a text viewing means;
wherein the output text string is updated to substantially correspond to the second text string, such that the output text string represents the updated text string, thereby facilitating editing of text string portions already communicated to the server.

In preferred embodiments, real time streaming of the periodically updated text string occurs through periodic streaming cycles. The streaming means preferably generates the output text string after identifying whether the first text string has any additional or edited text string portions following the previous streaming cycle.

The periodic streaming cycles of some preferred embodiments may be initiated automatically, by a prompt from the system, by a prompt from a particular component of the system, by a prompt from a user, or by any kind of prompt adapted to initiate a streaming cycle. In other preferred embodiments, the periodic streaming cycles may occur at regular time intervals or irregular time intervals. In yet still further preferred embodiments, the periodic streaming cycles may occur when one or more of the first text string, the additional or edited text string portions, the second text string or the output text string has reached a predetermined character length.

According to yet still further preferred embodiments, real time updating of the first text string may occur based on input of text, or a prompt from the first text input means, the second text input means, the first text input means and second text input means, a component of the system or a user of the system, or may occur automatically. In other preferred embodiments, the real time updating of the first text string occurs at regular time intervals or at irregular time intervals. In yet still further preferred embodiments, the real time updating of the first text string occurs when one or more of the first text string, the additional or edited text string portions, the second text string or the output text string has reached a predetermined character length.

In some preferred embodiments, the monitoring of state of at least the second text string may be initiated automatically, or by a prompt from a particular component of the system, by a prompt from a user, or by any kind of prompt adapted to initiate monitoring of state of the second text string. In other preferred embodiments, the monitoring of state of the second text string may occur at regular time intervals or irregular time intervals. In yet still further preferred embodiments, the monitoring of state of the second text string may occur when one or more of the first text string, the additional or edited text string portions, the second text string or the output text string has reached a predetermined character length.

According to yet still further preferred embodiments, the generation of the output text string may occur based on input of text, or a prompt from the first text input means, the second text input means, the first text input means and second text input means, a component of the system or a user of the system, any kind of prompt adapted to generate or initiate generation of the output text string, or may occur automatically. In other preferred embodiments, the generation of the output text string occurs at regular time intervals or at irregular time intervals. In yet still further preferred embodiments, the generation of the output text string occurs when one or more of the first text string, the additional or edited text string portions, the second text string or the output text string has reached a predetermined character length.

In some of the embodiments described above, the predetermined character length is 10 to 100 characters, and more preferably the predetermined character length is 20 characters. However, there is no limitation on the predetermined character length.

Preferably, the streaming means further allocates different characteristics to different portions of the first text string. In some preferred embodiments, a first portion of the first text string is allocated a locked transcript characteristic, substantially inhibiting the first portion of the first text string from being editable. Preferably, a second portion of the first text string is allocated a floating transcript characteristic, substantially retaining the second portion of the first text string as being editable. According to some such preferred embodiments, the streaming means generates the second text string after identifying whether the floating transcript portion of the first text string has any additional or edited text string portions following the previous streaming cycle.

The floating transcript portion of the first text string preferably has a predetermined transcript buffer size. In one preferred embodiment, the predetermined transcript buffer size is up to 2000 characters. Preferably, when a size of the first text string causes the predetermined transcript buffer size to exceed 2000 characters, a portion of the first text string is allocated as locked transcript.

The allocated locked transcript preferably has a predetermined transcript lock size. In one preferred embodiment, the predetermined transcript lock size is up to 1000 characters.

Alternatively, a portion of the first string is allocated as locked transcript in the event that the size of the first text string exceeds the predetermined transcript buffer size and the position of the first text input means is spaced from the first character of the first text string by at least the predetermined transcript lock size.

According to some preferred embodiments, the streaming means sends the second text string to a server from where the control means monitors the state of the second text string. In some preferred embodiments, the streaming means executes a transcript processing routine, algorithm, or process adapted to give effect to generation of the second text string. In further preferred embodiments, the streaming means executes a streaming routine, algorithm or process adapted to give effect to streaming of the second text string to the server.

The control means preferably sends asynchronous requests for the second text string to the server. In other preferred embodiments, text viewing means sends the asynchronous requests for the second text string to the server directly or via the control means. The asynchronous requests of some such preferred embodiments are sent using an asynchronous request model based on Asynchronous JavaScript and XML (AJAX) format. According to some embodiments, the text viewing means includes in asynchronous requests for second text strings, information about the most recently received second text string at the text viewing means. The information may include the index position of the last character of the most recently received second text string at the text viewing means.

The control means may make a determination whether an asynchronous request from a text viewing means for the output text string is the first request from the text viewing means. The determination may be made in any convenient manner. According to one embodiment, the determination is made by examining a characteristic of the most recently-streamed second text string to the text viewing means. The characteristic may be the index position of the last character of the most recently-streamed output text string.

The control means may, in the event of a first request from a text viewing means, determine whether the size of the output text string exceeds a predetermined value, and depending on the result of the determination, either stream the first output text string or a modified first output string to the text viewing means.

Typically, the modified first text string is the first text string suitably truncated such that the size thereof does not exceed the predetermined value.

According to preferred embodiments, the control means employs a delivery-verification routine, algorithm or process to determine whether the text viewing means received the most recently streamed second text string.

Optimally, the delivery-verification routine, algorithm or process comprises:

means for extracting from the asynchronous request for an output text string received from the text viewing means, information about the most recently received output text string at the text viewing means;

means for comparing the information to the most recently streamed output text string to thereby determine whether the text viewing means received the most recently streamed second text string; and means for re-streaming the most recently streamed output text string in the event that the most recently streamed second text string was not received at the text viewing means.

In some preferred embodiments, the control means compares the second text string received following an asynchronous request with the second text string received following the preceding asynchronous request and generates the output text string incorporating any additional or edited text string portions identified by the comparison.

The server of some preferred embodiments includes a memory pool. Preferably, the memory pool comprises an application state pool adapted to store data in application variables that are shared globally by users accessing the system, and a session state pool adapted to store session variables that are private to each user accessing the system. Each user of some such embodiments is bound to a dedicated HTTP request context identified by a unique HTTP session state id. Preferably, the HTTP session state id is used to store data in form of session variables.

In some preferred embodiments, session variables are selected from live session ids for each user and dispatched transcript text, comprising the output text string, for each user.

A live session id variable is preferably used by the system to identify which application variable is associated with a particular user. In preferred embodiments, the application variable data is stored in the form of a live session class object. Preferably, each time a live session is accessed by the system or a user, the control means accesses the live session class object.

According to some preferred embodiments, the system is adapted to accommodate at least one captioner which inputs text via text input means and one viewer which views the updated text string via text viewing means. The system of some such preferred embodiments is adapted to accommodate multiple captioners and multiple viewers.

In accordance with yet further preferred embodiments, the system is adapted to accommodate multiple sessions, wherein the same or different text strings are being inputted and viewed in each session.

The captioner is preferably selected from a person, a speech recognition program, any means capable of generating a text transcript of audio, or a combination of two or more thereof. Preferably, text input means is selected from a PC, a PDA, a keyboard, a stenography machine, a speech recognition program, any other means capable of providing means for inputting text, or a combination of two or more thereof. In some preferred embodiments, the first text input means is the same as the second text input means. In other preferred embodiments the first text input means is different to the second text input means. Preferably, text viewing means is selected from a PC, a PDA, a monitor, a display means, a projection means, any other means capable of providing means for viewing text, or a combination of two or more thereof.

In some preferred embodiments, output text string is displayed in a standard web browser. According to some such preferred embodiments, the text viewing means requires standard web browsing software to be able to display the output text string. In other such embodiments, the text viewing means does not require specialised software to be installed to be able to display the output text string.

According to some preferred embodiments, the text viewing means is adapted to control, or enable a user to control, the manner in which the output text string is displayed. Preferably, the text viewing means controls, or enables a user to control visual features of the display of the output text string including one or more of font size, font style, formatting style, formatting, colour, background colour, highlight colour, continuous or manual scrolling, and other visual features.

In further preferred embodiments, the system further comprises event state means adapted to monitor and manage events occurring in the system. The events monitored are preferably selected from a captioner has exited a session, a captioner is live but not on-air because another captioner has taken control forcefully, a captioner is live and another captioner has requested control, a captioner is live and there are no pending control requests, a captioner has taken control forcefully, a captioner has initiated to take control forcefully, a captioner has requested control and has received handover, a captioner has requested control and is still waiting for handover, a captioner is not live but is still on-air due to an abnormal closure of another event or of a session, a captioner is live, and no captioner is live.

According to some preferred embodiments, the system engages the streaming means in different ways depending on the state of various events at a given point in time. In one such embodiment, the streaming means allocates a locked transcript characteristic to the second text string upon the occurrence of any one or more of events including a Live captioner has exited a session, a captioner has taken control forcefully, and a captioner has requested control and has received handover.

In some preferred embodiments, the streaming means further comprises the event state means or further performs functions of the event state means.

In some preferred embodiments, the streaming means executes an event state routine, algorithm or process adapted to give effect to managing event states of the system. In further preferred embodiments, the streaming means executes a session event state routine, algorithm or process adapted to give effect to managing states of an active or live session.

According to some preferred embodiments, the control means gives effect to synchronization, or substantially simultaneous coordination, of streaming of the second text string to the server and of delivery of the output text to the text viewing means.

In some preferred embodiments, the control means and/or the text viewing means executes a transcript delivery routine, algorithm or process adapted to deliver the output text to the test viewing means.

According to some preferred embodiments, the system is adapted to stream text inputted via text input means and deliver an output text string to at least one text viewing means. In other preferred embodiments, the system is adapted to deliver the output text string to multiple text viewing means.

In some preferred embodiments, the system streams and delivers text strings. In other preferred embodiments, the system further streams and delivers a data packet carrying data adapted to enable the system to operate. According to some further preferred embodiments, the system further streams and delivers text associated data, included data selected from one or more of font size data, font style data, formatting style data, formatting data, colour data, background colour data, highlight colour data, and other visual feature data. According to other further preferred embodiments, the system does not stream or deliver text associated data, included data selected from one or more of font size data, font style or formatting style data, formatting data, colour data, background colour data, highlight colour data, and other visual feature data.

In some preferred embodiments, the control means and/or the text viewing means is adapted to further process the output text string such that added or edited text string portions are displayed in a different format to a format of the output text string displayed following a preceding streaming cycle.

According to some such preferred embodiments, the further processing includes:
identifying a first output text string as the output text string displayed following a preceding streaming cycle;
identifying whether at least a portion of the first output text string has been changed in a present streaming cycle thereby nominally giving rise to a changed output text string;
identifying differences between the first output text string and the changed output text string;
applying formatting to the differences which is unlike formatting applied to the first output text string.

Alternatively, the further processing includes:
identifying a first output text string as the output text string displayed following a preceding streaming cycle;
identifying whether at least a portion of the first output text string has been changed in a present streaming cycle thereby nominally giving rise to a changed output text string;
truncating part of the first output text string;
ceasing display of the first output text string on the text viewing means;
appending the changed output text string to the truncated first output text stream to thereby generate a new output text string; and
displaying the new output text string on the text viewing means.

Preferably, the formatting applied to the differences is applied for a predetermined period. In some preferred embodiments, once the predetermined period has expired, the formatting applied to the difference is made the same or similar to the formatting applied to the first output text string. In some preferred embodiments, the predetermined period is between about 1 second and about 5 seconds.

Preferably, the formatting applied to the differences is unlike formatting applied to the first output text string with respect to one or more of font size, font style, formatting style, formatting, colour, background colour, highlight colour, and other visual features. In one preferred embodiment, the formatting applied to the differences is reverse video mode formatting.

In some preferred embodiments, the control means and/or the text viewing means executes a viewer display routine, algorithm or process adapted to give effect to displaying added or edited text string portions in a different format to a format of the output text string displayed following a preceding streaming cycle.

The streaming means of preferred embodiments is a software module, a hardware module or a combination software and hardware module.

The control means of preferred embodiments is a software module, a hardware module or a combination software and hardware module.

According to yet still further preferred embodiments, the system further comprises audio transfer means adapted to provide sounds or voices for transcription. The audio transfer means is preferably selected from a person listening to the sounds or voices, a captioner (other than a person) receiving and/or processing a real time generated audio file or a pre-recording, of sounds or voices, a microphone, a standard land-line telephone, a mobile telephone, a VOIP telephone, or other means capable of transmitting or amplifying a sound or voice, or a combination of two or more thereof.

In some preferred embodiments, the system further comprises operations management means adapted to provide user and session management of at least one text streaming session. The operations management means is preferably further adapted to provide and manage a costing structure and billing for each streaming session.

The operations management means of some preferred embodiments assigns a unique session-ID to each session. Preferably, each session-ID is associated with session specific data for each session. The session specific data of some preferred embodiments includes information selected from session time to expire and session dates, a list of authenticated users, and contract and billing information.

Preferably, billing is effected through prepaid or post-paid formats.

The operations management means of preferred embodiments is a software module, a hardware module or a combination software and hardware module.

The system of preferred embodiments is adapted to operate over a bandwidth of between about 56 KBPS and about 512 KBPS. More preferably the system is adapted to operate at a bandwidth of about 512 KBPS. In some preferred embodiments, the text input means is operating with the system over a bandwidth of between about 256 KBPS and about 512 KBPS. More preferably the text viewing means is operating with the system at a bandwidth of about 512 KBPS. In further preferred embodiments, the text viewing means is operating with the system over a bandwidth of between about 56 KBPS and about 512 KBPS. More preferably, the text viewing means is operating with the system at a bandwidth of about 512 KBPS.

According to some preferred embodiments, these preferred bandwidth ranges and preferred bandwidths enable the system to operate via a dial-up internet or network connection or a broadband internet or network connection. The system can also operate over a 3G network. The system of some preferred embodiments can also operate over higher bandwidths than those described above.

The system of some preferred embodiments further provides user authentication control, including for captioners and/or viewers.

In some preferred embodiments, the system further incorporates a public chat window enabling interactivity among users or session participants. In one preferred embodiment, the public chat window is hideable. In another preferred embodiment, the public chat window is secure.

According to a second aspect, the present invention provides a method of streaming a text string, which is periodically updated, to text viewing means at a location comprising:

providing a server;

providing streaming means adapted to communicate with the server and to process a first text string inputted via first text input means, and update the first text string in real time with additional or edited text string portions inputted via second text input means to generate a second text string;

providing control means adapted to communicate with the server and to monitor a state of at least the second text string, and to generate an output text string for displaying on text viewing means;

wherein the output text string is updated in real time to substantially correspond to the second text string, such that the output text string represents the updated text string; and streaming the output text string to text viewing means at the location.

The method of some preferred embodiments of the second aspect is applied on a network The network may be a local area network or the internet. In some preferred embodiments, the location to which the updated text string is streamed is identified by a URL. In one preferred embodiment, the URL is directed to a control means service on the server. Preferably, the URL begins with an IP address or a host name uniquely pointing to an IP address of the server.

The system of preferred embodiments and/or the method of preferred embodiments can be used in a range of applications. In one preferred embodiment, the system and/or method are used to enable a student with a hearing impairment to receive real time captions of the content of a teacher's verbal discussion in a classroom or lecture theatre. In other preferred embodiments, the system and/or method are used in circumstances where a person is receiving real time translations of the content of a person speaking in another language.

In yet still further preferred embodiments, the system and/or method are used in generating court transcripts, in online chat rooms, in blogs, or in relation to telecasts of events, in captioning for television, events, classrooms, meetings, workplaces, doctors' surgeries, hospitals, public places, interviews, phone calls, retail, transport, sporting venues, radio, emergency broadcasts and conferences.

In an alternative embodiment, wherein the system and/or method are adapted so that updated text string streaming and output text string viewing both occur from the text input means and from the text viewing means substantially simultaneously, the system and/or method can be used in collaborative text editing arrangements.

It is envisaged that the system and/or method of the present invention can be used in several applications where real time streaming of text is desirable.

BRIEF DESCRIPTION OF THE DRAWINGS

A preferred embodiment of the present invention will now be described and illustrated by reference to the accompanying drawings in which.

DETAILED DESCRIPTION OF THE DRAWINGS

The system of preferred embodiments comprises a streaming means and a control means adapted to provide real time streaming of a periodically updated text string. In some particularly preferred embodiments, the system further comprises various additional features giving rise to an integrated solution adapted to provide live, real time, secure delivery of text captioned voices/sounds to one or more viewers in the same or different physical locality/s as the voice/sound which is being captioned. In some such embodiments, the system accommodates multiple separate and/or concurrent sessions each with their own voices/sounds being captioned.

Broad Overview of Some Preferred Embodiments of the System

The system of preferred embodiments (variously referred to herein and in the Figures as "Ai-Live") is a web based application that delivers live captions from a captioner's PC, or any other means capable of use for text input to viewers through a web portal, for viewing on a PC, PDA, monitor, or any other means capable of use for viewing text. Preferably, each user of Ai-Live has remote access to the application via the internet or through an intranet using a web browser running on a PC or other mobile device. In some preferred embodiments, Ai-Live supports Internet Explorer and Mozilla FireFox running on PCs.

The system of preferred embodiments can accommodate three types of users:

1. Captioners
2. Viewers
3. Administrators

Preferably, the system streams live captions from a captioner's PC to viewers through a web portal. Authorized viewers can logon to this web portal and get access to these captions in real time. Administrators can set up users, monitor sessions and report on usage statistics and billing.

Captioning sessions are preferably controlled by session-IDs. Session-IDs are preferably permanent and have time-limits, which may also be set not to expire.

Preferably, multiple captioning sessions can be held concurrently. Multiple captioners can be assigned to the same session. Multiple viewers can view the same captioning session.

In some preferred embodiments, the system delivers captions to people with hearing impairments. In a particularly preferred embodiment, students with hearing impairments in the classroom or a lecture theatre can use the system to enhance their learning experience.

Figure 1:
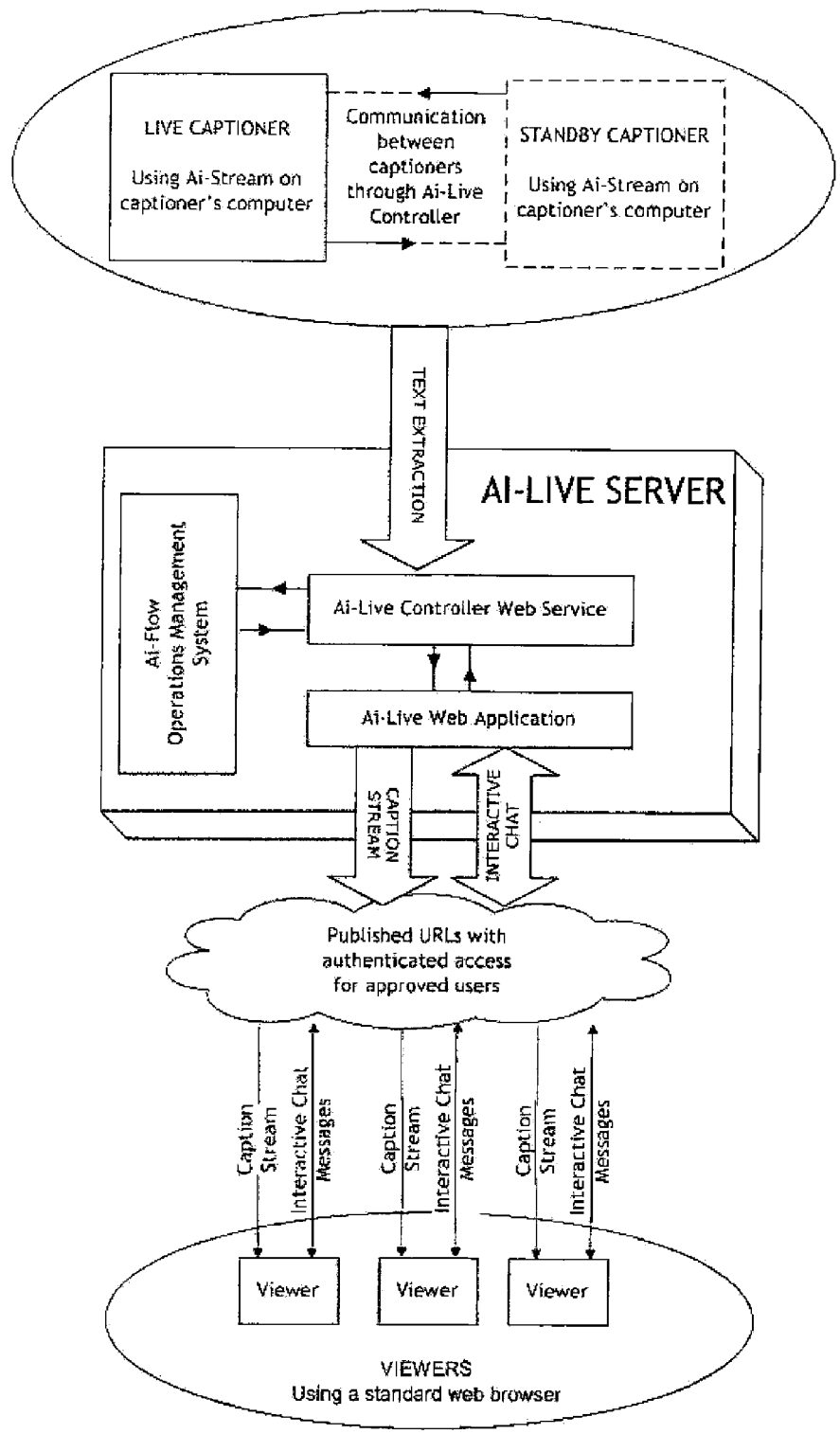
FIG. 1 is a schematic illustration of the architecture of a system according to one preferred embodiment of the invention.

Preferred features of one preferred embodiment of the system are illustrated in FIG. 1. In the preferred embodiment depicted, the system comprises five features:

1. Streaming means (variously referred to herein and in the Figures as "Ai-STREAM")
2. Control means (variously referred to herein and in the Figures as "Controller Web Service")
3. Session access means or text viewing means (variously referred to herein and in the Figures as "Ai-Live Web Application")
4. Operations management means (variously referred to herein and in the Figures as "Ai-Flo")
5. Audio transfer means (not shown in the Figures)

In general terms, each of these features provide the following preferred functions.

Ai-STREAM

Ai-STREAM is a text extraction and streaming application that resides, in preferred embodiments, on the captioner's computer. It is, preferably, a desktop application that is installed on the captioner's computer to join a live session and communicate with the other captioners and viewers. Session management features include extensions, early terminations and reporting.

A secure Instant Messaging chat window is provided in some preferred embodiments to enable captioners and viewers to communicate with each other during the session.

In preferred embodiments, Ai-STREAM allows multiple captioners to caption the same session and offers features that enable passing control seamlessly between captioners. Ai-STREAM permits multiple input modes for receiving captions for streaming including, for example, keyboard, stenography machines and speech recognition programs.

Ai-Live Controller Web Service

The Controller Web Service is adapted to control, relay and coordinate communications and captions streaming within and across the Ai-Live system, preferably by controlling communication between captioners, monitoring the event state of a live captioning session, relaying/streaming live captions received from a captioner for viewers to access, and enabling secure interactive messaging (for example, public chat) between users (including captioners/viewers).

Ai-Live Web Application

Ai-Live Web Application preferably provides web access to live session captions for viewers. In some preferred embodiments, an authentication process allows valid users to join a live captioning session. Communication is preferably provided between viewers and captioners via an Instant Messaging chat window. Session details are recorded for billing and reporting purposes.

Ai-Flo

Ai-Flo preferably provides an operations management system for Ai-Live with various features, including:

1. User Management
2. Live Session Management
3. Billing and Reporting

Audio Transfer Means

The audio transfer means of some preferred embodiments provides audio to the captioner for captioning (when the captioner is not within hearing distance of voice/sound to be captioned). Preferably, the audio transfer means is adapted to allow mobility to a person whose voice is to be captioned, to be non-intrusive, and to provide a predetermined audio quality to the captioner with minimal, and preferably no, drop-outs during the session. These capabilities are achieved in some preferred embodiments by various methods, including:

1. A microphone adapted to record and/or amplify the voice/sound to be captioned.
2. Direct telephone hookup using a standard land-line between the captioner and the voice/sound to be captioned using a wireless lapel microphone.
3. Mobile phone hookup using a standard mobile carrier between the captioner and the voice/sound to be captioned using a wireless lapel microphone.
4. VOIP telephony hookup using, for example, a high-grade QoS enabled IP telephony service between the captioner and the voice/sound to be captioned with a wireless lapel microphone.

Figure 1A:
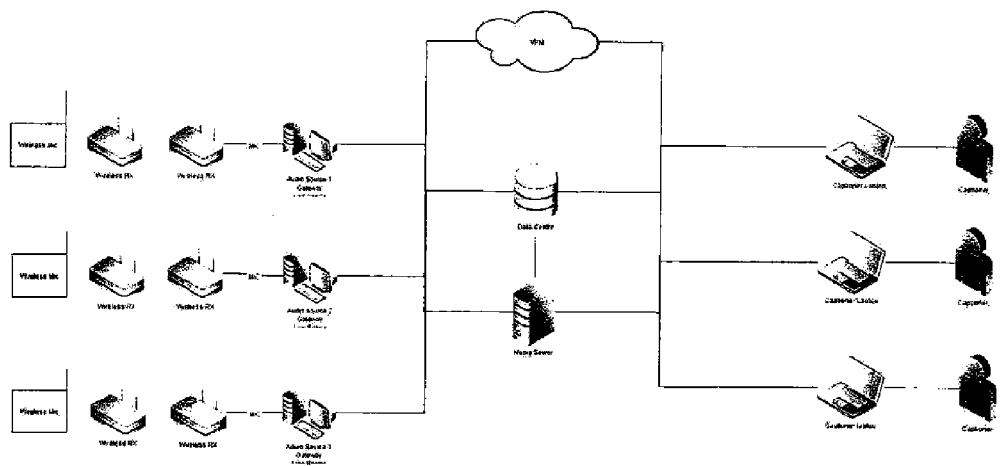

An alternative audio transfer means is illustrated in FIG. 1A. The system includes wireless microphones 10 (of the lapel, handheld or boundary variety), that are used by the speaker whose voice is to be captioned. A wireless receiver 12 is located in a suitable position to receive a signal from wireless microphones 10. Wireless receiver 12 converts the input signal into an audio signal of suitable strength for feeding into the microphone input of PC 14.

A suitable multimedia streaming server, such as the Unreal Live Server, is installed on PC 14 and configured to stream the signal received on the microphone input to a Media Server 16, that runs on a Data Centre 18. Data Centre 18 is accessible to PC 14 by way of a Virtual Private Network 18, as would be understood by those skilled in the art.

Captioners 20, using their own laptops 22 on which suitable media playing software (such as the Unreal Media Player) is installed, access Media Server 16 and select the streaming audio source. Captioners 20 are then able to commence captioning of the streaming audio source using the AI-STREAM Package.

The invention also envisages using any means capable of transmitting or amplifying a sound or voice.

In some embodiments, each of the above options are available for catering to different scenarios and for providing redundancy.

The system of some preferred embodiments is not necessarily adapted to provide entirely accurate transcripts of the voice/sound to be captioned. Although accuracy can be important, the meaning of what is the voice/sound is to convey is also important. In some embodiments, a balance is made between degree of accuracy and real time delivery of captions.

Each of the five features broadly described above are described in more detail below having particular regard to the remaining Figures.

Ai-STREAM—Caption Extraction Utility

Figure 2:
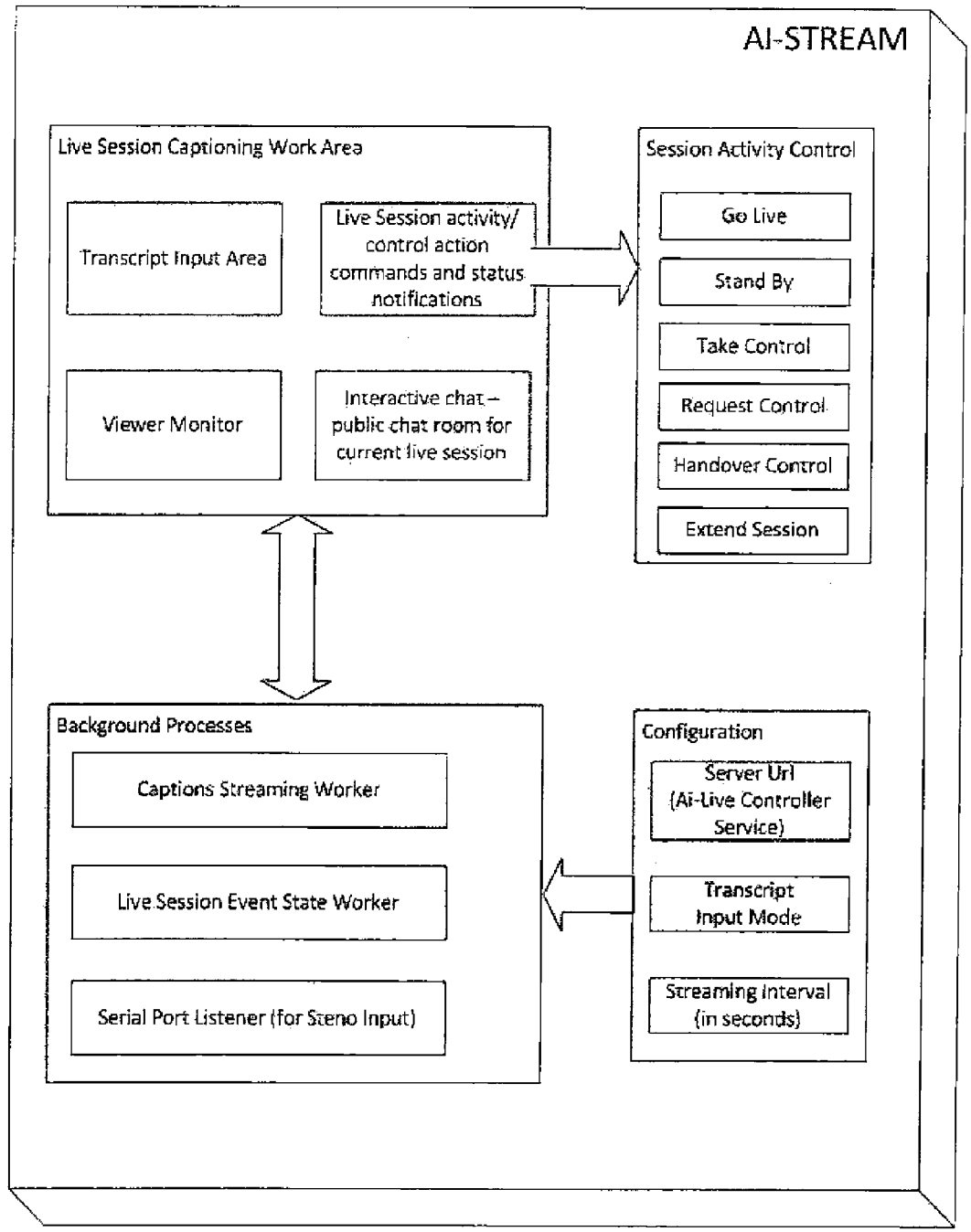
FIG. 2 is a schematic illustration of the architecture of a caption extraction and streaming means according to one preferred embodiment of the invention.

The broad architecture of preferred embodiments of Ai-STREAM is depicted in FIG. 2.

There may be multiple captioners in a live session. In preferred embodiments, one captioner is LIVE at a particular point in time. A LIVE captioner is the one who has control over the live session and is actively captioning the session. Other captioners logged into the session rest in STAND BY mode. A standby captioner cannot typically stream captions for the session. Multiple captioners may be required in order to, for example, alleviate captioner fatigue during the captioning of long duration sessions as well as to offer redundancy during mission-critical captioning sessions. This is preferably achieved by captioners switching control amongst themselves after regular intervals.

For example, before a STAND BY captioner can take control of the session for captioning, s/he can REQUEST CONTROL. The LIVE captioner is then notified, for example, by a flashing notification, that another captioner is requesting control. When ready to release control, LIVE captioner can HANDOVER CONTROL to the requesting captioner, thus designating the requesting captioner as LIVE and enters STAND BY mode.

There could be a situation when the LIVE captioner somehow gets disconnected from the live session without releasing control. To cater for such circumstances, the STAND BY captioner preferably has a facility to forcefully TAKE CONTROL.

Another, different but related, circumstance, could be that the network/internet connection of the LIVE captioner is lost. In this situation the captioner is no longer connected to the Ai-Live Controller Web Service and can not send a message to release control. In addition, the captioner might not notice that the connection has been lost. For this situation, Ai-STREAM keeps a 'watch' on internet connectivity as well and raises a notification, which could, for example, flash, when connectivity is lost. The notification that says "Network Disconnected" remains presented or, for example, keeps on flashing, until connectivity is resumed. Once the connectivity is resumed, Ai-STREAM automatically tracks it and removes the notification.

In preferred embodiments, Ai-STREAM is primarily for streaming live captions and providing a transcript area for captions input. It can also facilitate the captioner monitoring the captions, in a area, as they are sent out to the viewer. It can also include an interactive public message area where the captioner can have a chat with viewers and fellow captioners.

Preferred embodiments of Ai-STREAM support at least three (3) different input modes to facilitate the captioner choosing the preferred input medium for creating the transcript for streaming captions:

1. PC Keyboard
2. Stenography machines
3. Speech

Ai-STREAM is preferably a multi-threaded application. In addition to main desktop interface application, it can run certain background processes in independent processor threads that continuously stream out the captions and monitoring, plus update session operation state for communication with other captioners and viewers in the same live session.

The background processes of some preferred embodiments (discussed in more detail below) communicate with Ai-Live Controller Web Service in carrying out their designated roles. At the same or similar time, the main desktop application provides an interface to the user (captioner) updating on the current operations state of the live session and allowing the captioner to create the transcript for streaming and to handle control of streaming.

In preferred embodiments, there are two background worker processes (threads) in Ai-STREAM:

1. Event State Worker
2. Streaming Worker

In broad terms, Event State Worker is preferably activated once the captioner joins a live session, and continues to run throughout the captioner's participation in the session. When the captioner exits the live session, the Event State Worker Processes preferably ceases to operate.

Event State Worker preferably stays activated during the lifetime of a captioner's participation in the live session. It keeps track of various activities in the current session and raises timely notifications to catch the captioner's attention. Event State Worker preferably remembers the last activity state of an instance of the Ai-STREAM application running on a captioner's computer, learns the current activity state and processes it. Processing an event activity state typically involves manipulating the interface, functional and control behaviour of the current instance of Ai-STREAM application running on a captioner's computer.

Various event activity states that could arise in the Ai-STREAM are manifold and can include the following:

1. current user (captioner) has exited the event
2. current user (captioner) is LIVE but not on air because some other user has TAKEN CONTROL forcefully
3. current user (captioner) is LIVE and some other user has REQUESTED CONTROL
4. current user (captioner) is LIVE and there are no pending control requests
5. current user (captioner) has TAKEN CONTROL forcefully
6. current user (captioner) has initiated to TAKE CONTROL forcefully
7. current user (captioner) has requested control and has received HANDOVER
8. current user (captioner) has requested control and is still waiting for HANDOVER
9. current user (captioner) is not live but is still on air due to earlier abnormal closure of event
10. another user (captioner) is LIVE
11. no user (captioner) is LIVE FIGS. 3A to 3D provide a flowchart illustration of the manner in which one preferred embodiment of the Event State Worker routine, algorithm or process carries out its preferred function in a live session, Each item in the flowchart has a reference numeral and the process taking place at each item is outlined here with a corresponding description for each reference numeral.

Live Session Event State Worker 3.1 Live Session Event State Worker Process begins.

3.2 "Input" to process from outside environment. The input "isUserExiting" status is a Boolean FLAG (True/False value). "isUserExiting" status FLAG indicates whether the User (Captioner) is exiting the current Live Session or is continuing to stay in the Live Session. The Boolean (True/False) status of this flag depends upon the user's (captioner) activity in the session at the particular instance of time for each timed repeated execution of this process. For instance, if the captioner is still LIVE since the last instance run of this process then "isUserExiting" FLAG is set to "False". Otherwise, if the captioner is in process of shifting to "STAND BY" with this current instance execution of the process then the "isUserExiting" FLAG is set to "True". The reason/ activity for captioner shifting to "STAND BY" could be, but is not limited to, any of the following:

a. LIVE Captioner needs to rest and consciously gives the command to STAND BY.

b. LIVE Captioner hands over control to another requesting STAND BY captioner.

c. Another STAND BY captioner takes control forcefully from the LIVE captioner.

d. LIVE captioner exits the session.

3.3 Invoke an external routine "OnAirUserName" from the Ai-Live Controller Web Service. This routine returns the "User Name" of the currently LIVE captioner in current Live Session. A LIVE captioner is the one who currently has control of the Live Session for streaming captions. Such instance status data for a Live Session is maintained and monitored by the Ai-Live Controller Web Service running on the Ai-Live Server.

3.4 The "Output" of "OnAirUserName" routine is saved as an instance variable "OnAirUserName". This variable stores the "User Name" of the currently LIVE captioner in current Live Session.

3.5 Invoke an external routine "IsControlGranted" from the Ai-Live Controller Web Service. This routine checks and returns a status for whether the Controller Web Service has already received an invocation to request (or take) control from the same "User Name" as the current captioner and, in that case, whether the current captioner has been granted control for captioning in the current Live Session.

3.6 The "Output" of "IsControlGranted" routine saved as a Boolean (True/False) FLAG instance variable. This FLAG indicates whether the current captioner has been granted control and can go LIVE for captioning in current session.

3.7 Invoke an external routine "IsControlRequested" from the Ai-Live Controller Web Service. This routine checks and returns a status for whether the Controller Web Service has already received an invocation for "request" of control in current Live Session from another captioner.

3.8 The "Output" of "IsControlRequested" routine saved as a Boolean (True/False) FLAG instance variable. This variable indicates whether another captioner has requested control for captioning in current Live Session. This FLAG is significant for activating a notification on LIVE captioner's computer (preferably running, or otherwise able to access, Ai-STREAM) that alerts the LIVE captioner of the "Request for Control".

3.9 "Off Page Reference" connector to the "Page 2" (FIG. 3B) of flowchart diagram/figure.

3.10 "Off Page Reference" connector in continuity from "Page 1" (FIG. 3A) of flowchart diagram/figure.

3.11 Check the Boolean value of "isUserExiting" FLAG and confirm whether the Current captioner is exiting the live session.

3.12 If result of 3.11 above is "Yes" i.e. "True"; Set the "New Event State" instance variable and designate the New Event State to "UserHasExitedEvent". This "New Event State" indicates that the current captioner is in process of exiting the Live Session. This new event state value is carried forward to the Output of this process in 3.37 and then passed for further processing to the Event State Processing process in 3.41.

3.13 If the result of 3.11 above is "No" i.e. "False"; confirm whether the current captioner is LIVE in the running instance of Ai-STREAM but not marked OnAir (LIVE) in the Controller Web Service on Ai-Live server. An example of a reason for such a situation could be a forceful "Take Control" by another Stand By captioner pushing the current LIVE captioner out of captioning.

3.14 If the result of 3.13 above is "Yes" i.e. "True"; Set the "New Event State" instance variable and designate the New Event State to "AnotherUserHasTakenControl". This "New Event State" value indicates that another captioner has forcefully taken control from current LIVE captioner. This new event state value is carried forward to the Output of this process in 3.37 and then passed for further processing to the Event State Processing process in 3.41.

3.15 If the result of 3.13 above is "No" i.e. "False"; confirm whether the current captioner is LIVE and some other captioner has requested control.

3.16 If the result of 3.15 above is "Yes" i.e. "True"; Set the "New Event State" instance variable and designate the New Event State to "ReceivedRequestForControl". This "New Event State" value indicates that another STAND BY captioner has sent a request to the LIVE captioner asking for control handover in current Live Session. This new event state value is carried forward to the Output of this process in 3.37 and then passed for further processing to the Event State Processing process in 3.41.

3.17 If the result of 3.15 above is "No" i.e. "False"; confirm whether the current captioner is LIVE and there are no pending control requests.

3.18 If the result of 3.17 above is "Yes" i.e. "True"; Set the "New Event State" instance variable and designate the New Event State to "CurrentUserIsLive". This "New Event State" value indicates that current captioner is LIVE and shall continue captioning normally. This new event state value is carried forward to the Output of this process in 3.37 and then passed for further processing to the Event State Processing process in 3.41.

3.19 If the result of 3.17 above is "No" i.e. "False"; confirm whether the current captioner has invoked a forceful "Take Control" and the control has also been granted to the captioner.

3.20 If the result of 3.19 above is "Yes" i.e. "True"; Set the "New Event State" instance variable and designate the New Event State to "CurrentUserHasTakenControl". This "New Event State" value indicates that the current captioner was earlier on STAND BY and has now gained control of the Live Session by invoking a forceful "Take Control" action command. This new event state value is carried forward to the Output of this process in 3.37 and then passed for further processing to the Event State Processing process in 3.41.

3.21 If the result of 3.19 above is "No" i.e. "False"; confirm whether the current captioner has invoked a forceful "Take Control".

3.22 If the result of 3.21 above is "Yes" i.e. "True"; Set the "New Event State" instance variable and designate the New Event State to "CurrentUserIsTakingControl". This "New Event State" value indicates that the current captioner, earlier on STAND BY, has invoked a forceful "Take Control" action command and is now waiting for the control transfer to complete. This new event state value is carried forward to the Output of this process in 3.37 and then passed for further processing to the Event State Processing process in 3.41.

3.23 "Off Page Reference" connector to the "Page 3" (FIG. 3C) of flowchart diagram/figure.

3.24 "Off Page Reference" connector to the "Page 3" (FIG. 3C) of flowchart diagram/figure.

Figure 3A:
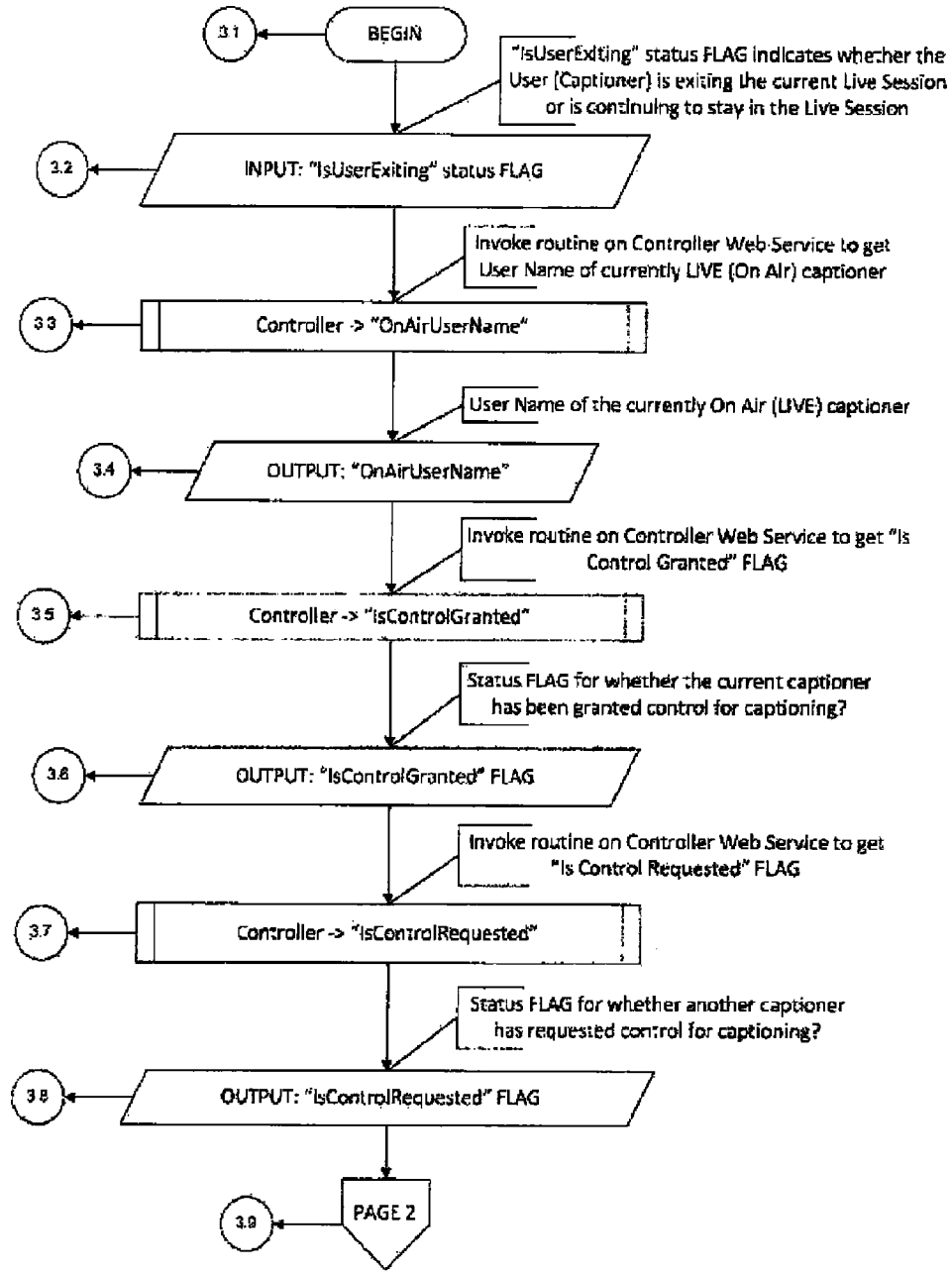
FIGS. 3A to 3D provide a flowchart illustration of the manner in which one preferred embodiment of the Event State Worker routine, algorithm or process carries out its preferred function.
Figure 3B:
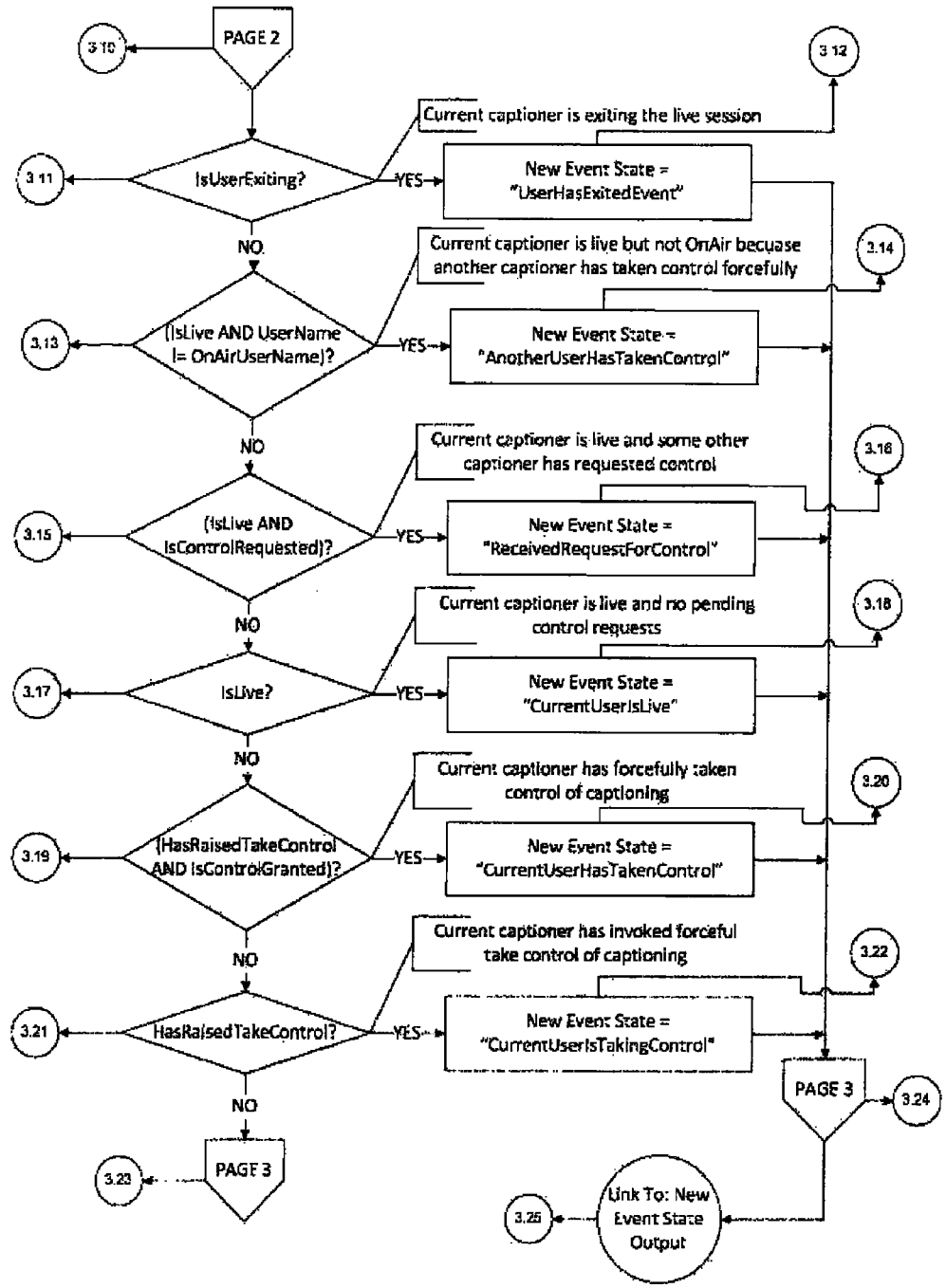
Figure 3C:
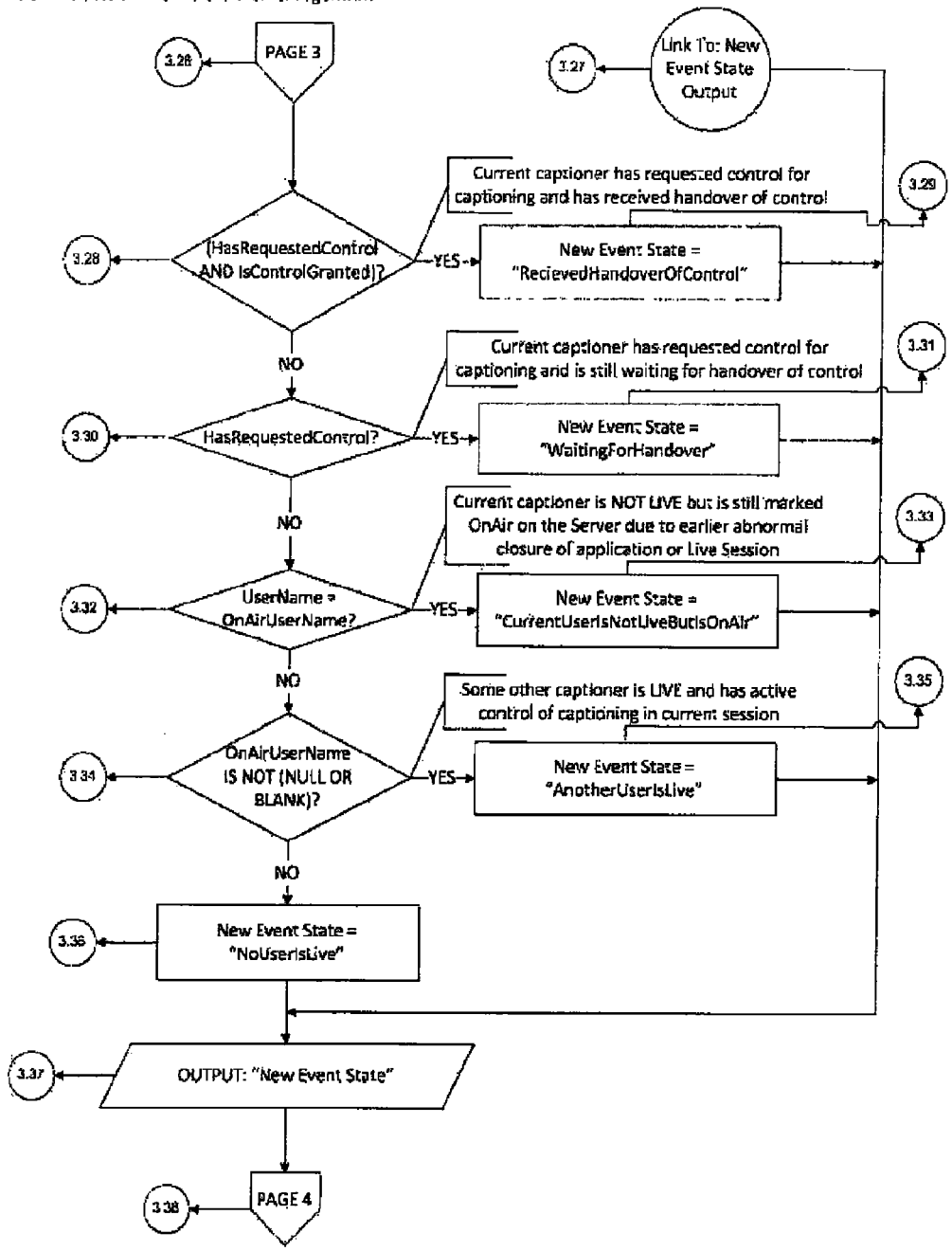
Figure 3D:
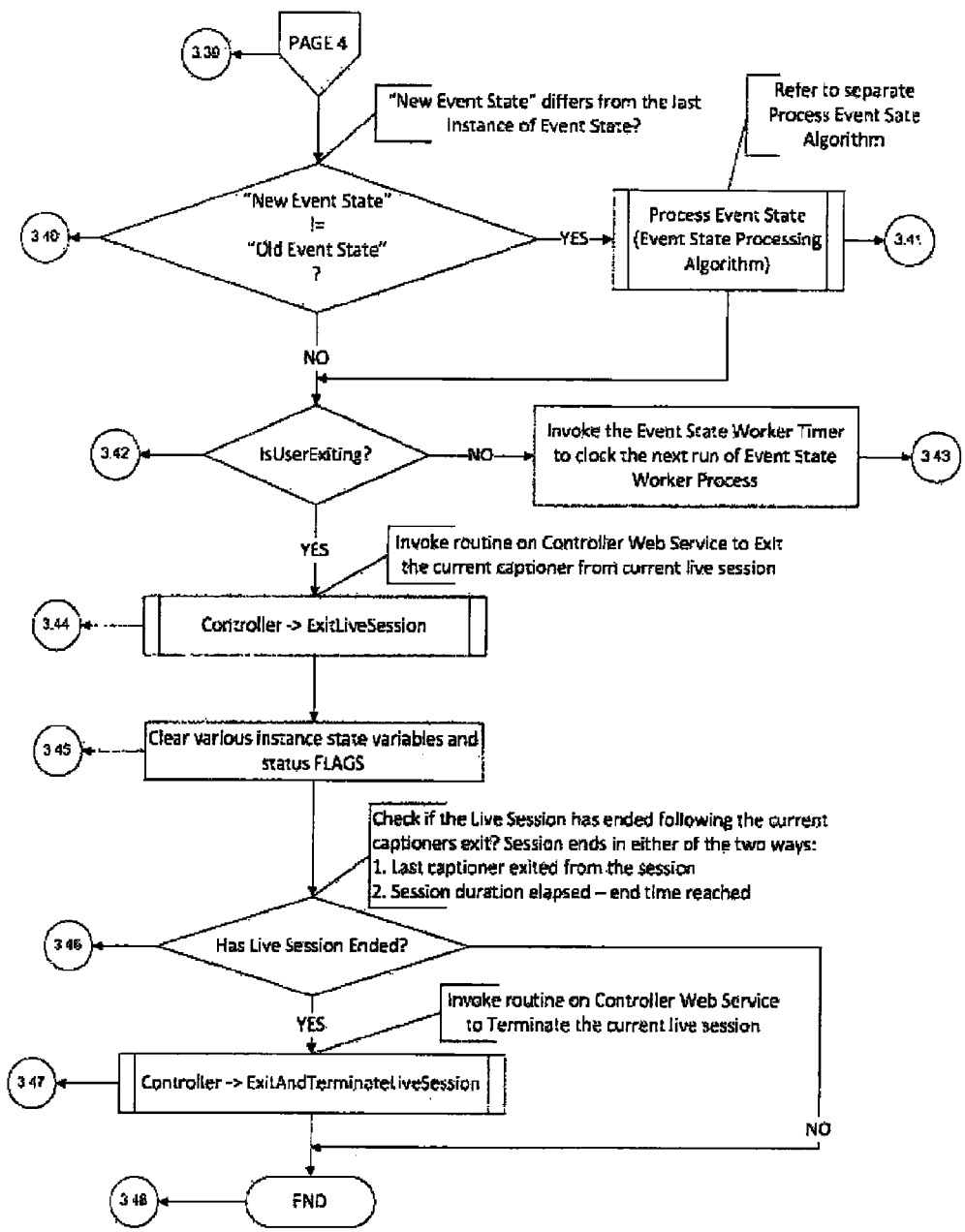

3.25 "On Page Reference" connector to "New Event State" Output (3.37) on "Page 3" (FIG. 3C).

3.26 "Off Page Reference" connector in continuity from "Page 2" (FIG. 3B) of flowchart diagram/figure.

3.27 "On Page Reference" connector to "New Event State" Output (3.37) in continuity from "Page 2" (FIG. 3B) of flowchart diagram/figure.

3.28 If the result of 3.21 above is "No" i.e. "False"; confirm whether the current captioner has invoked "Request Control" and the control has also been granted to the captioner.

3.29 If the result of 3.28 above is "Yes" i.e. "True"; Set the "New Event State" instance variable and designate the New Event State to "RecievedHandoverOfControl". This "New Event State" value indicates that the current captioner, earlier on STAND BY mode, had invoked a "Request" for control handover and the control "Handover" has successfully completed and the current captioner can now go "LIVE". This new event state value is carried forward to the Output of this process in 3.37 and then passed for further processing to the Event State Processing process in 3.41.

3.30 If the result of 3.28 above is "No" i.e. "False"; confirm whether the current captioner has invoked "Request Control"—requesting to gain control of captioning in the current live session.

3.31 If the result of 3.30 above is "Yes" i.e. "True"; Set the "New Event State" instance variable and designate the New Event State to "WaitingForHandover". This "New Event State" value indicates that the current captioner, on STAND BY mode, has invoked a "Request" for Control and is now waiting for the control "Handover" by the current LIVE captioner. This new event state value is carried forward to the Output of this process in 3.37 and then passed for further processing to the Event State Processing process in 3.41.

3.32 If the result of 3.30 above is "No" i.e. "False"; confirm whether the current captioner's "User Name" is same as the "User Name" of the captioner marked as "On Air" on the Controller web service.

3.33 If the result of 3.32 above is "Yes" i.e. "True"; Set the "New Event State" instance variable and designate the New Event State to "CurrentUserIsNotLiveButIsOnAir". This "New Event State" value indicates that the current captioner, on STAND BY mode, is NOT LIVE in the Ai-STREAM application but is still marked LIVE (On Air) on the server. One possible reason for this inconsistency may relate, for example, to an earlier abrupt termination of Ai-STREAM on the captioner machine wherein the captioner was actually LIVE at the time when abrupt termination occurred, thus making the server state inconsistent. Following the abrupt termination of Ai-STREAM earlier, the captioner has now started up Ai-STREAM again and joined the same session. This new event state value is carried forward to the Output of this process in 3.37 and then passed for further processing to the Event State Processing process in 3.41.

3.34 If the result of 3.32 above is "No" i.e. "False"; confirm whether any captioner is LIVE (OnAir) in the current Live Session, i.e. whether the "OnAirUserName" attribute/property for the current Live Session contains some real value.

3.35 If the result of 3.34 above is "Yes" i.e. "True"; Set the "New Event State" instance variable and designate the New Event State to "AnotherUserIsLive". This "New Event State" value indicates that some other captioner is presently LIVE and has active control of captioning in current live session. This new event state value is carried forward to the Output of this process in 3.37 and then passed for further processing to the Event State Processing process in 3.41.

3.36 If the result of 3.34 above is "No" i.e. "False"; Set the "New Event State" instance variable and designate the New Event State to "NoUserIsLive". This "New Event State" value indicates that no captioner is presently LIVE in the current live session. This new event state value is carried forward to the Output of this process in 3.37 and then passed for further processing to the Event State Processing process in 3.41.

3.37 "Output"—"New Event State"—the designated event state type for the current Live Session having been worked out by the preceding sequence of conditional decisions.

3.38 "Off Page Reference" connector to the "Page 4" (FIG. 3D) of flowchart diagram/figure.

3.39 "Off Page Reference" connector in continuity from "Page 3" (FIG. 3C) of flowchart diagram/figure.

3.40 Confirm if the event state of Live Session has changed since the last instance execution of Live Session Event State Worker Process, i.e. if "New Event State" is different from "Old Event State".

3.41 If the result of 3.40 above is "Yes" i.e. "True"; invoke the external routine "Process Event State" for processing the new event state. Refer to the separate algorithm/flowchart (FIG. 4) for "Process Event State".

3.42 Confirm the status of Boolean FLAG "isUserExiting" i.e. whether the current captioner is exiting the live session following the completion of current execution of Event State Worker process.

3.43 If the result of 3.42 above is "No" i.e. "False"; invoke the Event State Worker Timer to clock the next run of Event State Worker Process. This leads to the next repeated execution of the Event State Worker Process after a brief interval. The entire process starts up again (3.1—BEGIN) and iterates until the captioner exits the live session or the live session is terminated.

3.44 If the result of 3.42 above is "Yes" i.e. "True"; this indicates that the captioner is exiting the live session. Invoke the "ExitLiveSession" routine on Controller Web Service to Exit the current captioner from current Live Session.

3.45 Clear (dispose of) various instance state variables and status FLAGS maintained by Ai-STREAM and worker processes for a running live session while the captioner stays in the live session.

3.46 Confirm whether the current Live Session has ended following the current captioner's Exit. A Live Session preferably exits in two or more ways, including, for example:

a) Last captioner exited from the Live Session—there is no remaining captioner online in the Live Session.

b) Live Session duration has elapsed—Live Session End Time reached.

3.47 If the result of 3.46 above is "Yes" i.e. "True"; this indicates that the Live Session has "Ended" and must be "Terminated" following the current captioner's exit. Invoke the "ExitAndTerminateLiveSession" routine on Controller Web Service to "Terminate" the current Live Session.

However, if the result of 3.46 is "No" i.e. "False"; this indicates that the current Live Session has not yet ended and shall continue even after the current captioner's exit.

3.48 Live Session. Event State Worker Process ends.

As indicated above, particularly regarding item 3.41, if the event state of a Live Session has changed since the last instance execution of Live Session Event State Worker Process, an external or separate routine, algorithm or process for processing the new event state is invoked. FIGS. 4A to 4D provide a flowchart illustration of the manner in which one preferred embodiment of the Process Event State routine, algorithm or process carries out its preferred function. Each item in the flowchart has a reference numeral and the process taking place at each item is outlined here with a corresponding description for the each reference numeral.
Live Session Process Event State

4.1 Live Session Process Event State Algorithm begins.

4.2 "Input" to the process—"New Event State"—inferred and provided by the "Live Session Event State Worker Process". (Refer to FIGS. 3A to 3D).

"New Event State" signifies the anticipated state of Ai-STREAM executing, or otherwise available for execution, on the current captioner's computer with respect to the ongoing activity(s) in the current "Live Session" being actioned and monitored by the Ai-Live Controller Web Service on a server.

4.3 Apply a conditional "switch case" match on the "New Event State". This switch case match is a lookup to match the inferred current instance "New Event State" value against a defined set of possible "Event State" values and accordingly proceed with the process execution and application behaviour defined corresponding to the matched "Event State".

4.4 Is the "New Event State" equal to "Received Request For Control"? If "Yes", proceed to 4.5. Otherwise (If "No"), proceed to 4.8.

4.5 Invoke (Start) Control Handover wait timer (stop watch)—the Event State Worker (FIG. 3) then monitors this wait timer, waits until the elapse of timer and automatically transfers "Control" to the "Requesting" captioner if the "LIVE" captioner does not complete "Handover" before the wait timer elapses. Proceed to "REF-UI" (4.66) on "Page 4" (FIG. 4D).

4.6 "Off Page Reference" connector to the "Page 4" (FIG. 4D) of flowchart diagram/figure.

Figure 4A:
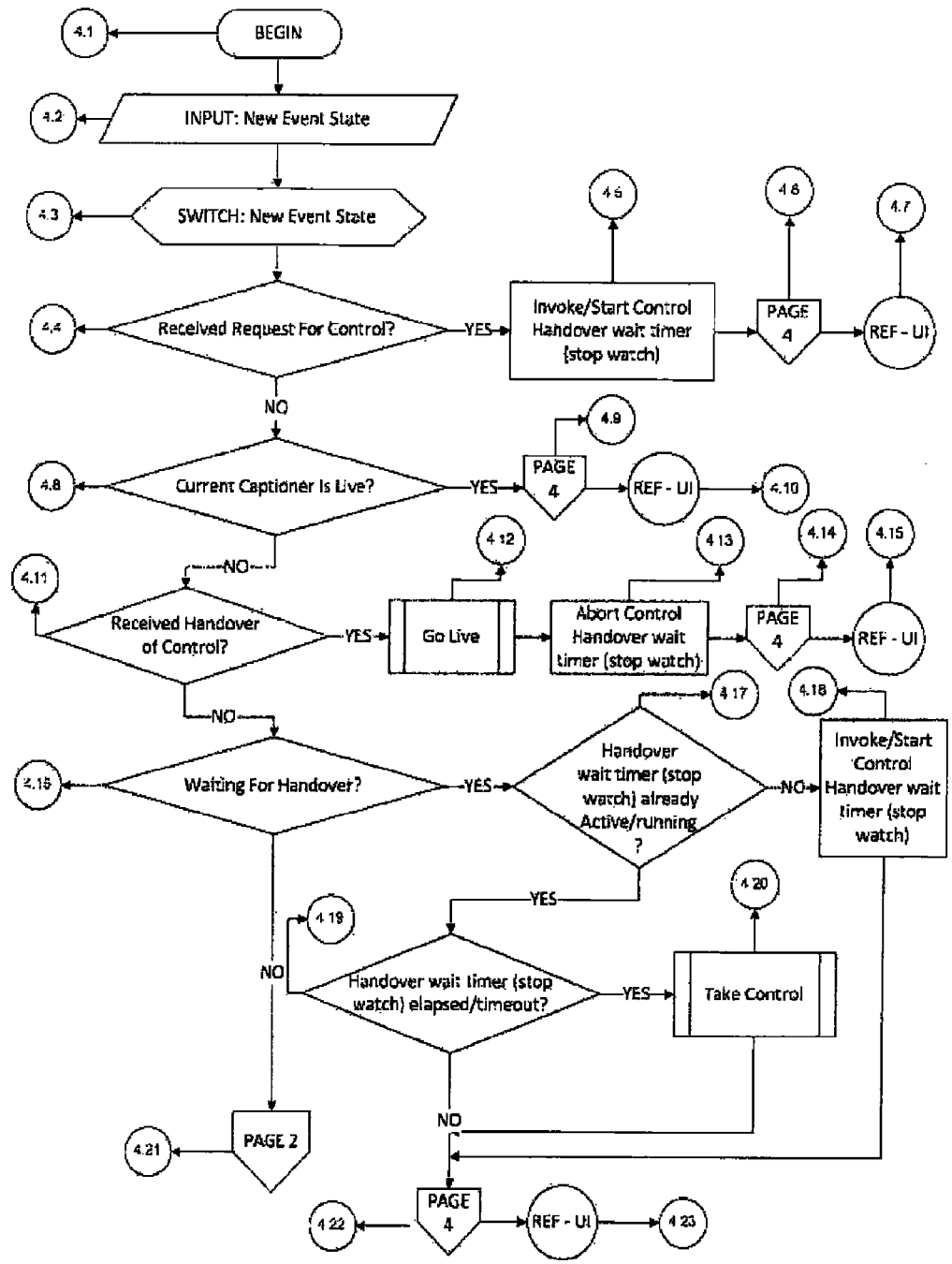
FIGS. 4A to 4D provide a flowchart illustration of the manner in which one preferred embodiment of the Process Event State routine, algorithm or process carries out its preferred function.
Figure 4B:
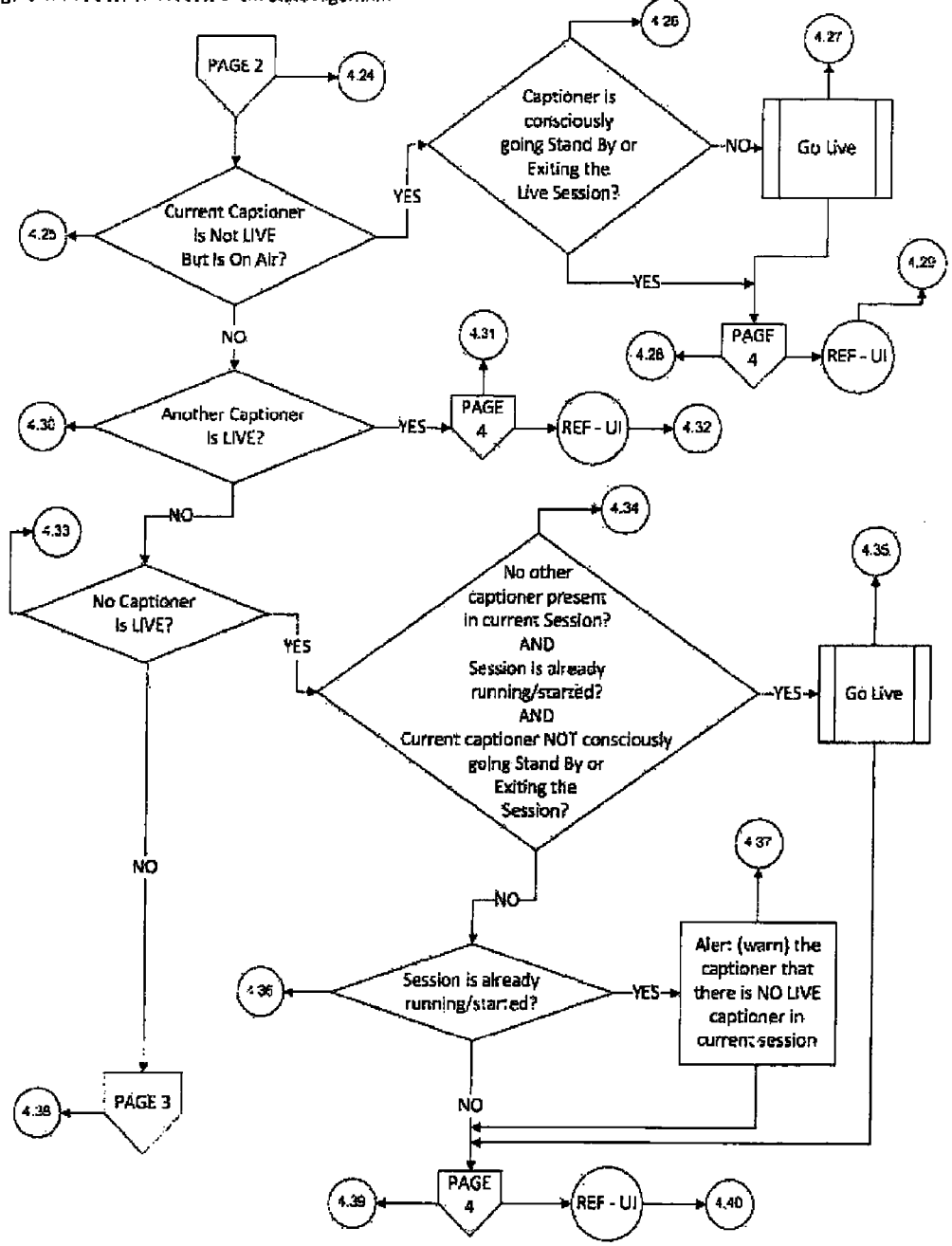
Figure 4C:
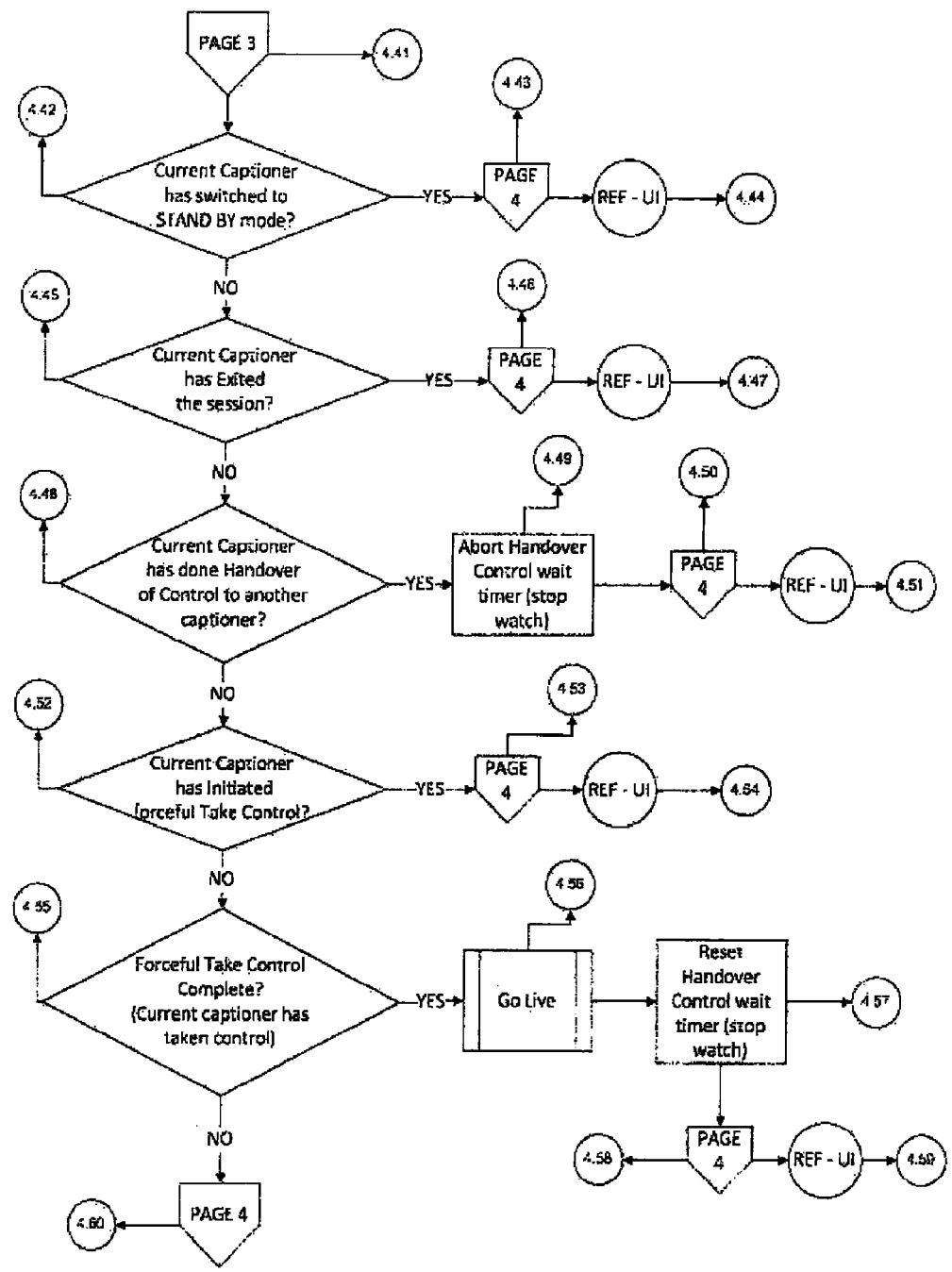
Figure 4D:
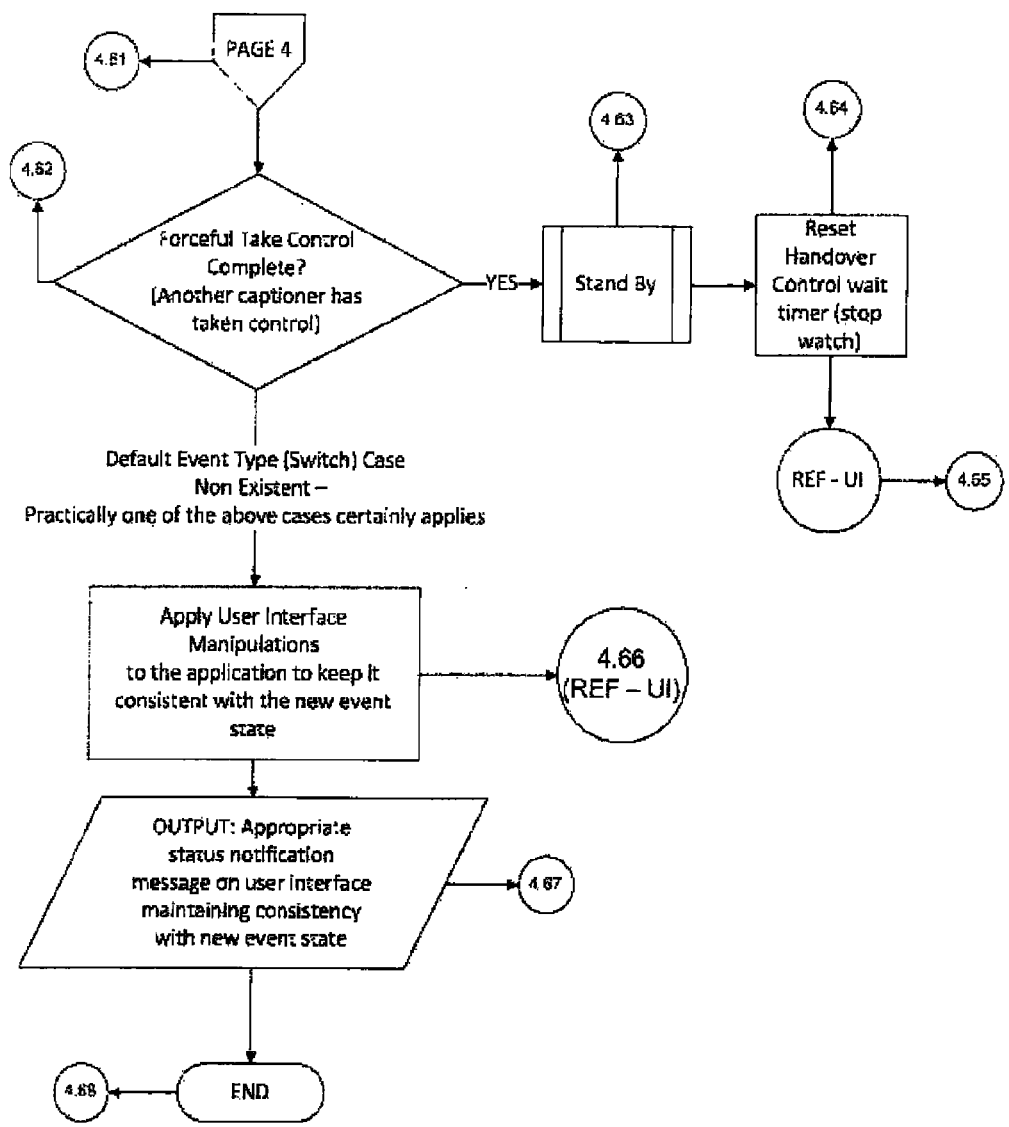

4.7 "On Page Reference" to "REF-UI" (4.66) on "Page 4" (FIG. 4D).

4.8 Is the "New Event State" equal to "Current Captioner Is Live"? If "Yes", proceed to "REF-UI" (4.66) on "Page 4" (FIG. 4D). Otherwise (If "No"), proceed to 4.11.

4.9 "Off Page Reference" connector to the "Page 4" (FIG. 4D) of flowchart diagram/figure.

4.10 "On Page Reference" to "REF-UI" (4.66) on "Page 4" (FIG. 4D).

4.11 Is the "New Event State" equal to "Received Handover of Control"? If "Yes", proceed to 4.12. Otherwise (If "No"), proceed to 4.16.

4.12 Invoke the "Go Live" routine on Ai-Live Controller Web Service—"Go Live" marks the current captioner as "LIVE" i.e. "On Air" captioner in current live session thus delegating control for captioning.

4.13 Abort the Control Handover wait timer (stop watch) that was otherwise clocked to "Take Control" forcefully if the last LIVE captioner had not transferred control to the "Requesting" captioner (now LIVE) before the wait timer elapsed.

4.14 "Off Page Reference" connector to the "Page 4" (FIG. 4D) of flowchart diagram/figure.

4.15 "On Page Reference" to "REF-UI" (4.66) on "Page 4" (FIG. 4D).

4.16 Is the "New Event State" equal to "Waiting For Handover"? If "Yes", proceed to 4.17. Otherwise (If "No"), proceed to 4.25 (on Page 2 (FIG. 4B)).

4.17 Check and confirm whether the "Handover" wait timer (stop watch) is already active (running). If "Yes", proceed to 4.19. Otherwise (If "No"), proceed to 4.18.

4.18 Invoke (start) Control Handover wait timer (stop watch). Proceed to "REF-UI" (4.66) on "Page 4" (FIG. 4D).

4.19 Check and confirm whether the "Handover" wait time (stop watch) has elapsed (timed-out). If "Yes", proceed to 4.20. Otherwise (If "No"), proceed to "REF-UI" (4.66) on "Page 4" (FIG. 4D).

4.20 Invoke the "Take Control" routine on Ai-Live Controller Web Service. This routine transfers the control forcefully to the "Requesting" captioner thus marking the "Requesting" captioner to "LIVE" and marking the exiting "LIVE" captioner to "STAND BY". Proceed to "REF-UI" (4.66) on "Page 4" (FIG. 4D).

4.21 "Off Page Reference" connector to the "Page 2" (FIG. 4B) of flowchart diagram/figure.

4.22 "Off Page Reference" connector to the "Page 4" (FIG. 4D) of flowchart diagram/figure.

4.23 "On Page Reference" to "REF-UI" (4.66) on "Page 4" (FIG. 4D).

4.24 "Off Page Reference" connector in continuity from "Page 1" (FIG. 4A) of flowchart diagram/figure.

4.25 Is the "New Event State" equal to "Current Captioner Is Not LIVE But Is On Air"? If "Yes", proceed to 4.26. Otherwise (If "No"), proceed to 4.30.

4.26 Check and confirm whether the captioner is consciously going "Stand By" or "Exiting" the Live Session. If "Yes", proceed to "REF-UI" (4.66) on "Page 4" (FIG. 4D). Otherwise (If "No"), proceed to 4.27.

4.27 Invoke the "Go Live" routine on Ai-Live Controller Web Service—"Go Live" marks the current captioner as "LIVE" i.e. "On Air" captioner in current live session thus delegating control for captioning. Proceed to "REF-UI" (4.66) on "Page 4" (FIG. 4D).

4.28 "Off Page Reference" connector to the "Page 4" (FIG. 4D) of flowchart diagram/figure.

4.29 "On Page Reference" to "REF-UI" (4.66) on "Page 4" (FIG. 4D).

4.30 Is the "New Event State" equal to "Another Captioner Is LIVE"? If "Yes", proceed to "REF-UI" (4.66) on "Page 4" (FIG. 4D). Otherwise (If "No"), proceed to 4.33.

4.31 "Off Page Reference" connector to the "Page 4" (FIG. 4D) of flowchart diagram/figure.

4.32 "On Page Reference" to "REF-UI" (4.66) on "Page 4" (FIG. 4D).

4.33 Is the "New Event State" equal to "No Captioner Is LIVE"? If "Yes", proceed to 4.34. Otherwise (If "No"), proceed to 4.42 on "Page 3" (FIG. 4C).

4.34 Check and confirm whether: (No other captioner is present in current session) AND (Session is already running/started) AND (Current captioner is not consciously going "STAND BY" or Exiting the session) If "Yes", proceed to 4.35. Otherwise (If "No"), proceed to 4.36. Three of these circumstances can have different results, but the logical decision to be taken here is inferred from the combination of all the three circumstances. A logical inference with (AND) operator results in a "YES" result only when all the participating circumstances return a "YES". On the other hand, if even one of the participating circumstances returns a "NO" then the final result of [AND] operation of different circumstances shall be "NO".

4.35 Invoke the "Go Live" routine on Ai-Live Controller Web Service—"Go Live" marks the current captioner as "LIVE" i.e. "On Air" captioner in current live session thus delegating control for captioning. Proceed to "REF-UI" (4.66) on "Page 4" (FIG. 4D).

4.36 Check and confirm whether the Live Session is already running (started). If "Yes", proceed to 4.37. Otherwise (If "No"), proceed to "REF-UI" (4.66) on "Page 4" (FIG. 4D).

4.37 Alert (warn) the captioner that there is NO LIVE captioner in current session—thus suggesting the captioner to "Go Live".

4.38 "Off Page Reference" connector to the "Page 3" (FIG. 4C) of flowchart diagram/figure.

4.39 "Off Page Reference" connector to the "Page 4" (FIG. 4D) of flowchart diagram/figure.

4.40 "On Page Reference" to "REF-UI" (4.66) on "Page 4" (FIG. 4D).

4.41 "Off Page Reference" connector in continuity from "Page 2" (FIG. 4B) of flowchart diagram/figure.

4.42 Is the "New Event State" equal to "Current Captioner has switched to STAND BY mode"? If "Yes", proceed to "REF-UI" (4.66) on "Page 4" (FIG. 4D). Otherwise (If "No"), proceed to 4.45.

4.43 "Off Page Reference" connector to the "Page 4" (FIG. 4D) of flowchart diagram/figure.

4.44 "On Page Reference" to "REF-UI" (4.66) on "Page 4" (FIG. 4D).

4.45 Is the "New Event State" equal to "Current. Captioner has Exited the Session"? If "Yes", proceed to "REF-UI" (4.66) on "Page 4" (FIG. 4D). Otherwise (If "No"), proceed to 4.48.

4.46 "Off Page Reference" connector to the "Page 4" (FIG. 4D) of flowchart diagram/figure.

4.47 "On Page Reference" to "REF-UI" (4.66) on "Page 4" (FIG. 4D).

4.48 Is the "New Event State" equal to "Current Captioner has done Handover of Control to another Captioner"? If "Yes", proceed to 4.49. Otherwise (If "No"), proceed to 4.52.

4.49 Abort the Control Handover wait timer (stop watch) that was otherwise clocked to "Take Control" forcefully if the last LIVE captioner had not transferred control to the "Requesting" captioner (now LIVE) before the wait timer elapsed.

4.50 "Off Page Reference" connector to the "Page 4" (FIG. 4D) of flowchart diagram/figure.

4.51 "On Page Reference" to "REF-UI" (4.66) on "Page 4" (FIG. 4D).

4.52 Is the "New Event State" equal to "Current Captioner has initiated forceful Take Control"? If "Yes", proceed to "REF-UI" (4.66) on "Page 4" (FIG. 4D). Otherwise (If "No"), proceed to 4.55.

4.53 "Off Page Reference" connector to the "Page 4" (FIG. 4D) of flowchart diagram/figure.

4.54 "On Page Reference" to "REF-UI" (4.66) on "Page 4" (FIG. 4D).

4.55 Is the "New Event State" equal to "Current Captioner Has Take Control (i.e. Forceful Take Control earlier initiated by current captioner has completed)"? If "Yes", proceed to 4.56. Otherwise (If "No"), proceed to 4.62 on "Page 4" (FIG. 4D).

4.56 Invoke the "Go Live" routine on Ai-Live Controller Web Service—"Go Live" marks the current captioner as "LIVE" i.e. "On Air" captioner in current live session thus delegating control for captioning.

4.57 Reset the Control "Handover" wait timer (stop watch).

4.58 "Off Page Reference" connector to the "Page 4" (FIG. 4D) of flowchart diagram/figure.

4.59 "On Page Reference" to "REF-UI" (4.66) on "Page 4" (FIG. 4D).

4.60 "Off Page Reference" connector to the "Page 4" (FIG. 4D) of flowchart diagram/figure.

4.61 "Off Page Reference" connector in continuity from "Page 3" (FIG. 4C) of flowchart diagram/figure.

4.62 Is the "New Event State" equal to "Another Captioner Has Take Control (i.e. Forceful Take Control earlier initiated by another captioner has completed)"? If "Yes", proceed to 4.63. Otherwise (If "No"), proceed to 4.66.—A result of "No" here can indicate the "default" case of "Conditional Switch Case" started above in 4.3. However the "default" Event Type Case may be essentially non-existent because at any instance of time the activity state of Live Session running in Ai-STREAM will correspond (match) to one of the specified "Event Type" cases. Hence this signifies that practically a "No" result at 4.62 will never be reached. By means of the processing logic put into the Event State Worker Process, the Event State at any instance of time should match one value out of the fixed set of Event States identified and tracked in the Event State Worker logic. This guarantees that just in case the processing logic has not reached a "Yes" or "True" result in any preceding steps (Switch Cases), it will get a "Yes" result at step 4.62.

4.63 Invoke the "Stand By" routine on Ai-Live Controller Web Service—"Stand By" marks the current LIVE captioner as "STAND BY" in current live session thus withdrawing control for captioning.

4.64 Reset Control Handover wait timer (stop watch).

4.65 "On Page Reference" to "REF-UI" (4.66) on "Page 4" (FIG. 4D).

4.66 Apply User Interface manipulations to Ai-STREAM to keep it consistent with the "New Event State" of the running Live Session.

4.67 "Output" of the process—Appropriate status notification message on user interface and appropriate functional behaviour of Ai-STREAM maintaining consistency with "New Event State" of running Live Session.

4.68 Live Session Process Event State Algorithm ends.

As earlier explained, in preferred embodiments, there is at least one other process (thread) running in the background of Ai-STREAM, the Streaming Worker process.

In broad terms, Streaming Worker process is preferably activated once the captioner, already joined a live session, goes LIVE and starts captioning for the current session and continues to run throughout the captioner's LIVE captioning state. When the captioner switches to STAND BY mode or Exits the live session, the streaming worker process preferably ceases to operate.

Streaming Worker process preferably continuously watches the caption input area and streams the captions to the controller web service on the server. The essence of streaming worker process is a transcript processing algorithm that processes the transcript/captions before sending a stream of captions to the server. Streaming of captions is preferably spontaneous as the captioner simply keeps on creating the transcript/captions. In preferred embodiments, the captioner is not required to fire any user action command to send off the captions. Instead the streaming worker silently keeps a watch on the captions inputted by the captioner, processes and sends off a stream of captions to the server without intervening with the captioner's job of inputting live captions into the system.

In preferred embodiments, the Streaming Worker does not send the complete transcript text (from start to end). Instead it utilizes a transcript processing routine, algorithm or process (described in more detail below) that identifies the new and/or edited captions/transcript text during each streaming cycle and streams only the identified new/edited substring of text from the transcript area. Preferably, the algorithm further splits the transcript into two parts:

Locked Transcript

Floating Transcript

Locked Transcript

As the transcript size grows with captions input, a preceding part of the transcript is "Locked", preferably being removed from transcript input area. In this embodiment, the locked transcript is considered to be a block of final streamed content that can not be edited anymore.

Floating Transcript

The trailing substring of transcript that stays in the transcript input area is the "Floating" transcript, in the sense that even though it has been streamed to the server, it preferably remains editable, including for any corrections/modifications. The routine, algorithm or process preferably readily identifies any changes in the already streamed part of floating transcript and resends the floating transcript with modifications.

Another transcript processing routine, algorithm, or process, which can work at the viewer end (also discussed in more detail below), preferably identifies the new and corrected text and applies the corrections to the captions text that has already been displayed on the viewer screen.

In some preferred embodiments, the maximum size of Floating Transcript size allowed in the transcript input area at any time, referred to as "Transcript Buffer Size", is preferably 2000 characters. Preferably, once the Transcript Buffer Size reaches 2000 characters, a first quantity of characters, is earmarked as locked and is, therefore, removed from the transcript input area. The block size of transcript text that is locked is referred to as "Transcript Locking Size". In one preferred embodiment, the Transcript Locking Size is 1000 characters.

According to one preferred embodiment, in the event that a LIVE captioner releases captioning control, the entire floating transcript/captions created by that captioner are preferably locked. Different events that lead to a LIVE captioner leaving control, and therefore to locking of complete floating transcript, are manifold and may include the following:

LIVE captioner goes to Stand By mode.

LIVE captioner hands over control to another captioner

Another captioner forcefully takes control

LIVE captioner exits the session.

Streaming worker process preferably seeks confirmation from the server (controller web service) that the last dispatch of captions/text has successfully reached the server. In the event that the streaming worker does not receive a "success" signal providing the required confirmation, it resends the captions with new text.

Figure 5A:
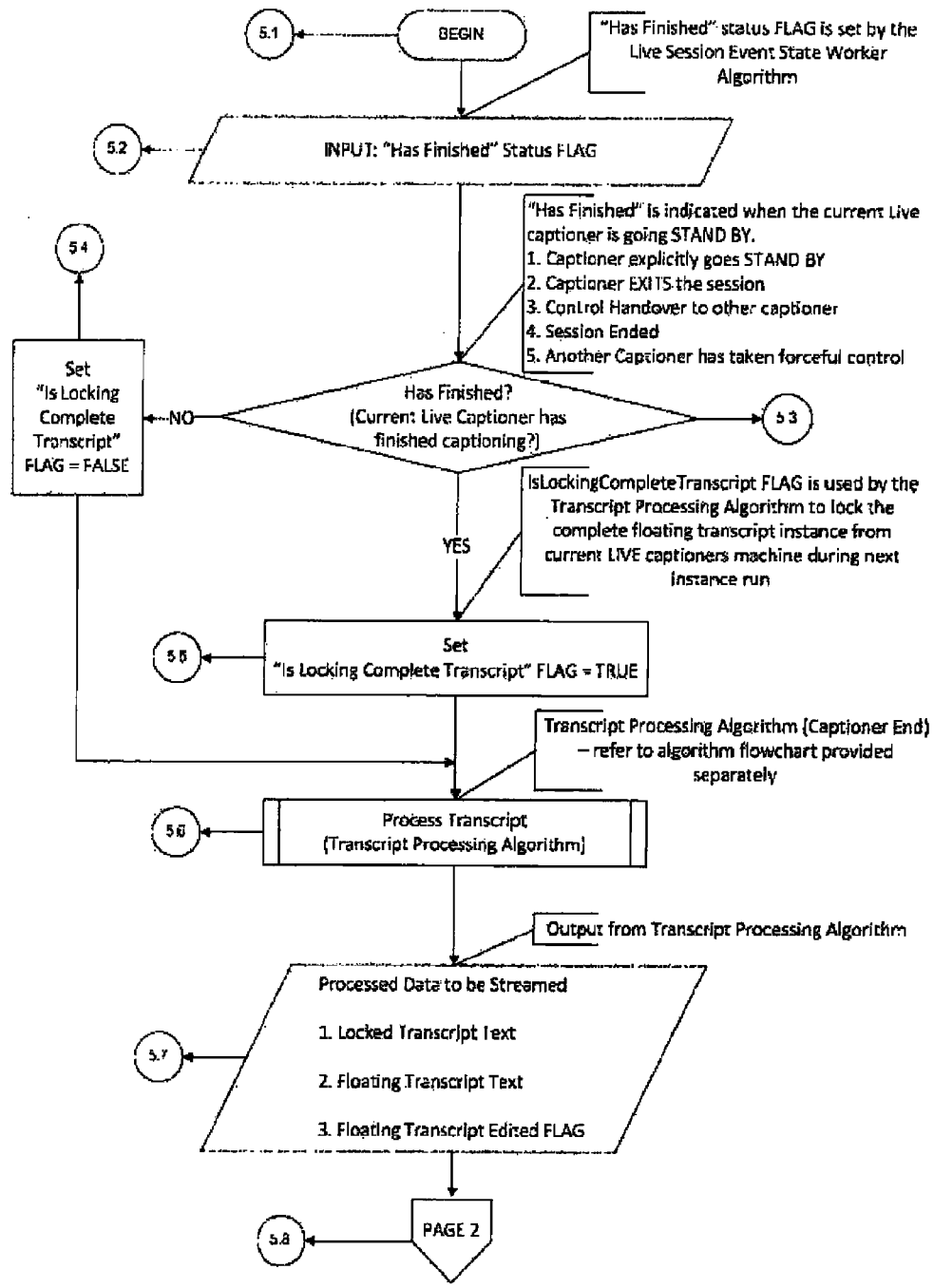
FIGS. 5A to 5C provide a flowchart illustration of the manner in which one preferred embodiment of the Streaming Worker routine, algorithm or process carries out its preferred function.
Figure 5B:
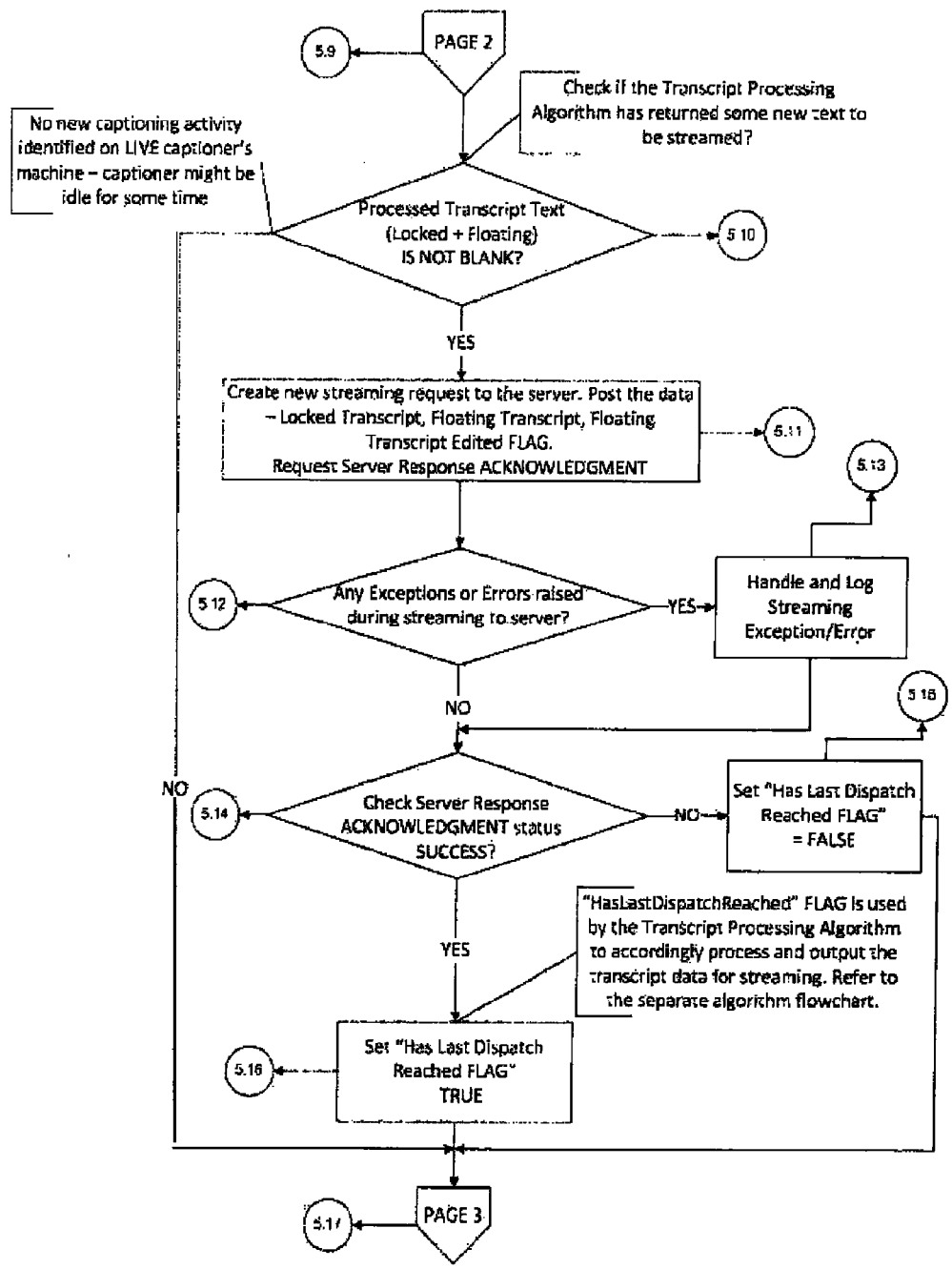
Figure 5C:
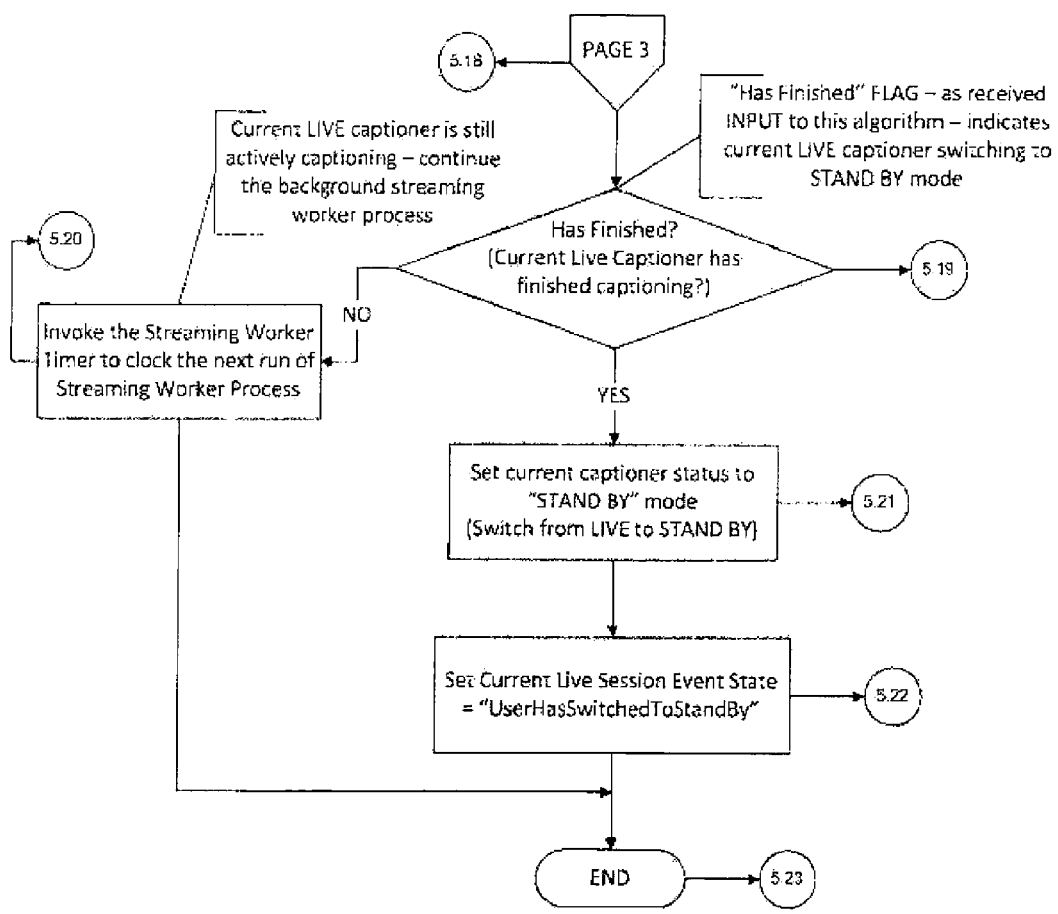

FIGS. 5A to 5C provide a flowchart illustration of the manner in which one preferred embodiment of the Streaming Worker routine, algorithm or process carries out its preferred function in a live session. Each item in the flowchart has a reference numeral and the process taking place at each item is outlined here with a corresponding description for the each reference numeral.

Streaming Worker Process 5.1 Live Session Streaming Worker Process begins.

5.2 "Input" to the process; "Has Finished" status FLAG. This Boolean (True/False) FLAG is set externally by the Live Session Event State Worker Process and indicates that the current LIVE captioner has finished captioning and is going to STAND BY following this current instance execution of the Streaming Worker process. This FLAG is set to True in one of several events, including the following:

a. LIVE Captioner explicitly goes STAND BY.

b. LIVE Captioner Exits the Live Session.

c. LIVE Captioner transfers (hands over) control of Live Session to another STAND BY captioner.

d. Another STAND BY captioner has taken control of the Live Session forcefully.

e. Live Session has ended.

5.3 Confirm whether the current captioner "Has Finished" captioning.

5.4 If the result of 5.3 above is "No" i.e. "False; set the "Is Locking Complete Transcript" FLAG to "False". The "Is Locking Complete Transcript" FLAG indicates to the "Transcript Processing Algorithm" (an external routine/process described in more detail below with reference to FIGS. 6A to 6C) to lock the complete floating transcript instance from current LIVE captioner's machine during the next instance execution of "Transcript Processing Algorithm" process.

5.5 If the result of 5.3 above is "Yes" i.e. "True; set the "Is Locking Complete Transcript" FLAG to "True".

Figure 6A:
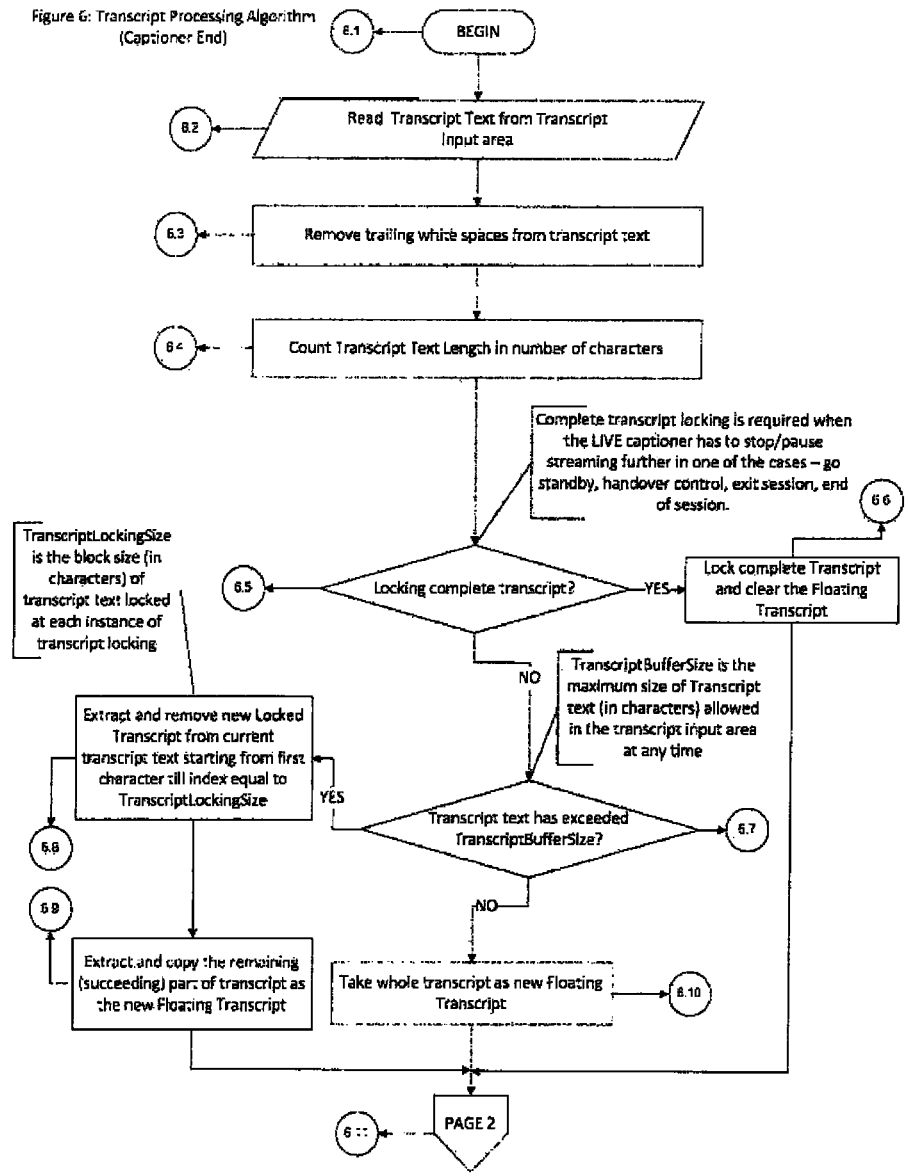
FIGS. 6A to 6C provide a flowchart illustration of the manner in which one preferred embodiment of the Transcript Processing routine, algorithm or process carries out its preferred function.
Figure 6B:
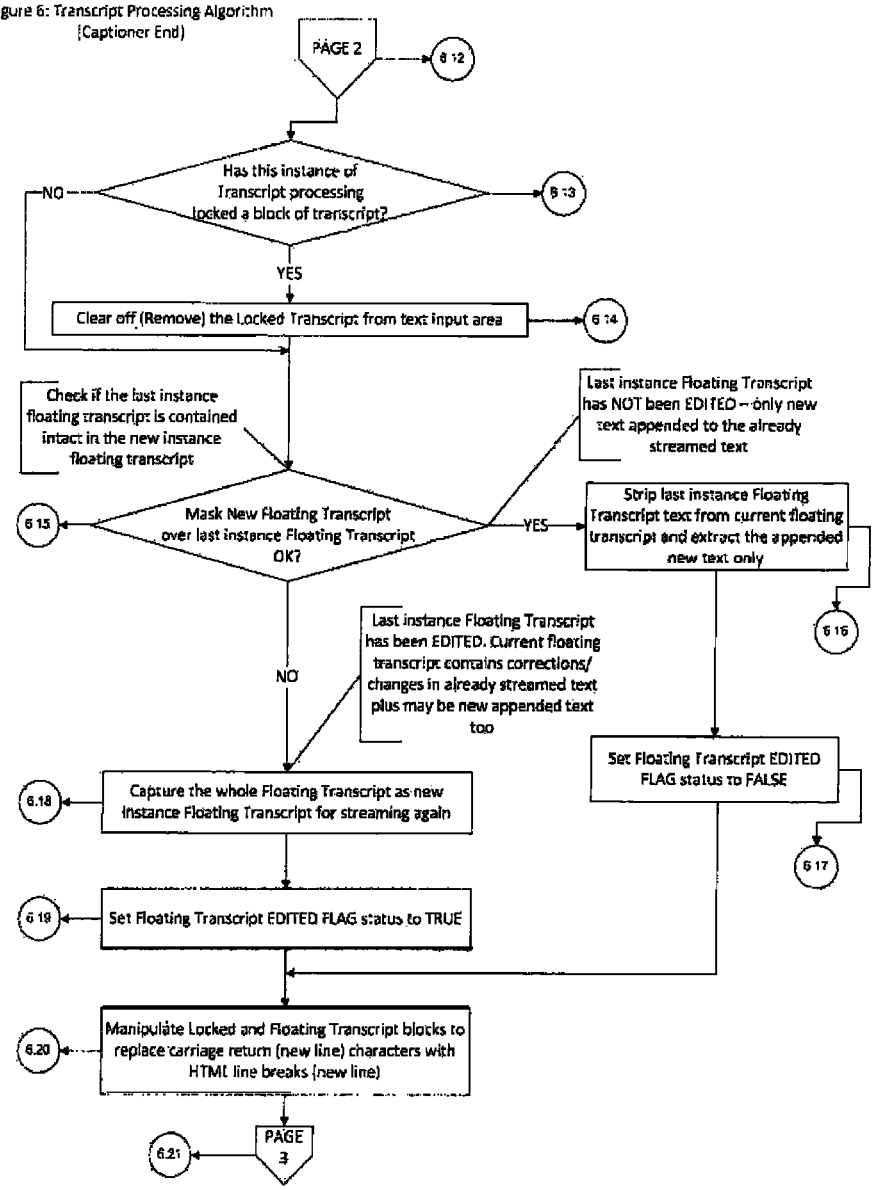
Figure 6C:
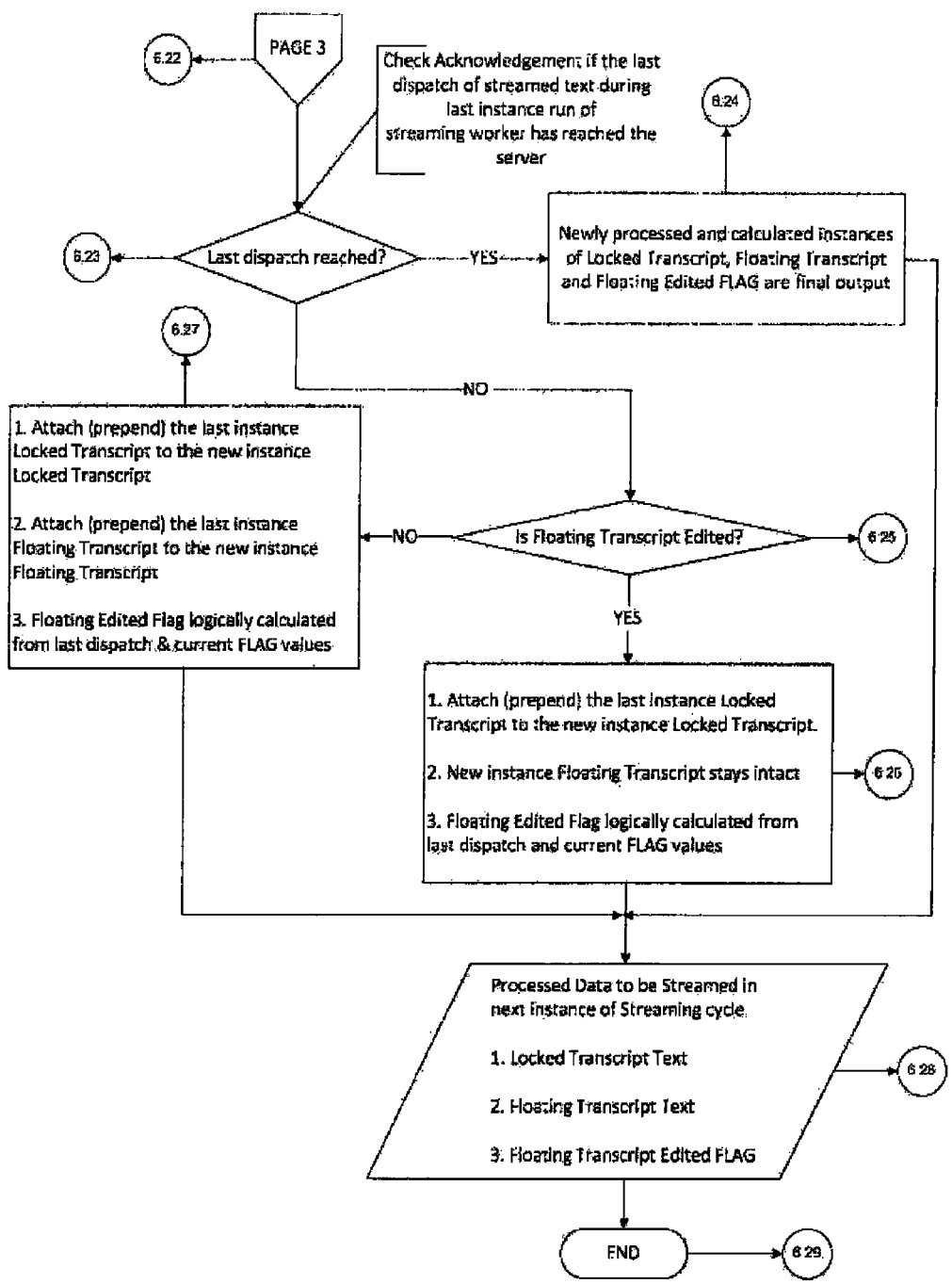

5.6 Invoke an external routine in Ai-STREAM to "Process Transcript". This executes the Transcript Processing Algorithm as a background worker process. Refer to FIG. 6A to 6C separately for "Transcript Processing Algorithm" flowchart.

5.7 "Output" generated from the execution of "Transcript Processing Algorithm" as above in 5.6. "Transcript Processing Algorithm" provides the processed data to be streamed in three parts:

a. Locked Transcript Text b. Floating Transcript Text c. Floating Transcript Edited status FLAG 5.8 "Off Page Reference" connector to the "Page 2" (FIG. 5B) of flowchart diagram/figure.

5.9 "Off Page Reference" connector in continuity from "Page 1" (FIG. 5A) of flowchart diagram/figure.

5.10 Confirm whether the Processed Transcript Text (concatenation of Locked Transcript Text and Floating Transcript Text) is not blank i.e. the Transcript Processing Algorithm has returned some new text to be streamed. If the result of this check is "No" i.e. "False"; it indicates that no new captioning activity has been identified on LIVE captioner's machine, or from LIVE captioner, and captioner might be idle for some time. In this case, proceed directly to step 5.19.

5.11 If the result of 5.10 above is "Yes" i.e. "True"; create/invoke a new streaming request to the Ai-Live server. Post the streaming data (Locked Transcript Text, Floating Transcript Text and Floating Transcript. Edited status FLAG) to the designated routine/method in Ai-Live Controller Web Service on the server and request for Server Response Acknowledgment in response to the streaming request.

5.12 Confirm whether the last streaming request resulted in raising any exception(s) or error(s) during streaming to the server.

5.13 If the result of 5.12 above is "Yes" i.e. "True"; handle and log the exception(s) and/or error(s) appropriately. Proceed to 5.14 in either case—whether the result of 5.12 above is "Yes" or "No".

5.14 Check Server Response Acknowledgment status (in response to the last streaming request) and confirm whether the status="SUCCESS".

5.15 If the result of 5.14 above is "No" i.e. "False"; set "Has Last Dispatch Reached" FLAG to "False". "Has Last Dispatch Reached" FLAG is used by the "Transcript Processing Algorithm" to accordingly process and output the transcript data for streaming. Refer to FIG. 6A to 6C separately for "Transcript Processing Algorithm" flowchart.

5.16 If the result of 5.14 above is "Yes" i.e. "True"; set "Has Last Dispatch Reached" FLAG to "True".

5.17 "Off Page Reference" connector to the "Page 3" (FIG. 5C) of flowchart diagram/figure.

5.18 "Off Page Reference" connector in continuity from "Page 2" (FIG. 5B) of flowchart diagram/figure.

5.19 Check the "Has Finished" FLAG status to confirm whether the current LIVE captioner has finished captioning.

5.20 If the result of 5.19 above is "No" i.e. "False"; invoke the Streaming Worker Timer to clock the next run of Streaming Worker Process and proceed to the end of the algorithm/process (5.23). This leads to the next repeated execution of the Streaming Worker Process after a brief interval. The entire process starts up again (5.1—BEGIN) and iterates until the LIVE captioner has finished captioning and switched to STAND BY.

5.21 If the result of 5.19 above is "Yes" i.e. "True"; set current captioner status to STAND BY i.e. switch from LIVE to STAND BY.

5.22 Set "Live Session Event State" in Ai-STREAM running on, or otherwise available to, current captioner's computer to "UserHasSwitchedToStandBy". This event state is further processed by the "Process Event State Algorithm". Refer to FIG. 4 separately for "Process Event State Algorithm".

5.23 Live Session Streaming Worker Process ends.

As indicated above, a Transcript Processing routine, algorithm or process is used to process the inputted text, FIGS. 6A to 6C provide a flowchart illustration of the manner in which one preferred embodiment of the Transcript Processing routine, algorithm or process carries out its preferred function. Each item in the flowchart has a reference numeral and the process taking place at each item is outlined here with a corresponding description for the each reference numeral.

Transcript Processing 6.1 Transcript Processing Algorithm Process begins.

6.2 "Input" to the process—"Transcript Text" read from transcript input area (text area) in Ai-STREAM. In some preferred embodiments, the transcript input area is in a main window of Ai-STREAM.

6.3 Remove trailing whitespaces from the "Transcript Text" to avoid streaming whitespaces that do not have any trailing text.

6.4 Obtain length count of "Transcript Text" in number of characters.

6.5 Confirm whether the current LIVE captioner is "Locking Complete Transcript".

A Boolean status FLAG for "Locking Complete Transcript" is inferred and provided by the "Streaming Worker" process from the "HasFinished" status FLAG processed in "Streaming Worker" process. "Locking Complete Transcript" indicates that the LIVE captioner has to stop (or pause) streaming further and so the complete floating transcript must be locked with the current instance execution of "Transcript Processing Algorithm" process.

6.6 If the result of 6.5 above is "Yes" i.e. "True"; Lock complete "Transcript" and clear the "Floating Transcript". This means concatenating the "Floating Transcript" string variable to "Locked Transcript" string variable and then emptying the "Floating Transcript" string variable. Proceed to next step in 6.13.

6.7 If the result of 6.5 above is "No" i.e. "False"; confirm whether the "Transcript" Text size (character count) has exceeded "TranscriptBufferSize".

"TranscriptBufferSize" is the maximum size (length in character count) of "Transcript" text allowed in the transcript input area at any time.

6.8 If the result of 6.7 above is "Yes" i.e. "True"; Extract and remove new "Locked Transcript" from current transcript text starting from first character till character position index equal to "TranscriptLockingSize". "TranscriptLockingSize" is the block size (length in character count) of transcript text locked at each instance of transcript locking.

6.9 Extract and copy the remaining (succeeding) part of transcript as the new "Floating Transcript".

6.10 If the result of 6.7 above is "No" i.e. "False"; take the whole transcript text as new "Floating Transcript". The transcript text has not yet accumulated to the specified buffer size.

6.11 "Off Page Reference" connector to the "Page 2" (FIG. 6B) of flowchart diagram/figure.

6.12 "Off Page Reference" connector in continuity from "Page 1" (FIG. 6A) of flowchart diagram/figure.

6.13 Check and confirm whether transcript locking has occurred back in 6.7, 6.8 & 6.9. If the result is "No" i.e. "False"; proceed to 6.15 normally.

6.14 If the result of 6.13 above is "Yes" i.e. "True"; clear off (remove) the "Locked Transcript" text block from the transcript text input area on, in some preferred embodiments, the Ai-STREAM main window.

6.15 Confirm whether the last instance string value of "Floating Transcript" text is contained intact in the new instance string value of "Floating Transcript" text. To confirm this, mask the new "Floating Transcript" over the last instance "Floating Transcript" and verify whether it "masks" well.

6.16 If the result of 6.15 above is "Yes" i.e. "True"; this indicates that the last instance "Floating Transcript" has not been edited—only new text appended to the already streamed text. Strip last instance "Floating Transcript" string text block from current new "Floating Transcript" string and extract the appended new text only into the "Floating Transcript".

6.17 Set "Floating Transcript EDITED" status FLAG to "False". Proceed to 6.20.

6.18 If the result of 6.15 above is "No" i.e. "False"; this indicates that the last instance "Floating Transcript" has been edited and current new "Floating Transcript" contains corrections/changes in already streamed text, plus potentially new appended text. Capture the whole "Floating Transcript" text string as new instance "Floating Transcript" for streaming again.

6.19 Set "Floating Transcript EDITED" status FLAG to "True".

6.20 Manipulate "Locked Transcript" and "Floating Transcript" blocks to replace carriage return (new line) characters with HTML line breaks (new line).

6.21 "Off Page Reference" connector to the "Page 3" (FIG. 6C) of flowchart diagram/figure.

6.22 "Off Page Reference" connector in continuity from "Page 2" (FIG. 6B) of flowchart diagram/figure.

6.23 Confirm whether the "Last Dispatch" of streaming captions has reached the server. Check "Server Response Acknowledgement" received in the "Streaming Worker Process" to verify if the "Last Dispatch" of streamed text during last instance run of "Streaming Worker Process" has reached the server. Refer to FIGS. 5A to 5C for Streaming Worker Process.

6.24 If the result of 6.23 above is "Yes" i.e. "True"; this indicates that the newly inferred instance values of "Locked Transcript", "Floating Transcript" and "Floating Transcript Edited FLAG" are the final output. Proceed to "Output" in 6.28.

6.25 Confirm whether "Is Floating Transcript Edited". To confirm this lookup the status of "Floating Transcript Edited FLAG" inferred back in either of 6.17 or 6.19.

6.26 If the result of 6.25 above is "Yes" i.e. "True";
  a. Attach (prefix) the last instance text string value of "Locked Transcript" to the new instance text string value of "Locked Transcript".
  b. New Instance text string value of "Floating Transcript" stays intact.
  c. "Floating Transcript EDITED" FLAG inferred (logically calculated) from "Last Dispatch" FLAG and current "Floating Transcript EDITED" FLAG values.
  Proceed to 6.28.

6.27 If the result of 6.25 above is "No" i.e. "False";
  a. Attach (prefix) the last instance text string value of "Locked Transcript" to the new instance text string value of "Locked Transcript".
  b. Attach (prefix) the last instance text string value of "Floating Transcript" to the new instance text string value of "Floating Transcript".
  c. "Floating Transcript EDITED" FLAG inferred (logically calculated) from "Last Dispatch" FLAG and current "Floating Transcript EDITED" FLAG values.

6.28 "Output"—processed data to be streamed during next streaming cycle i.e. next instance execution of "Streaming Worker" Process:
  a. "Locked Transcript" text
  b. "Floating Transcript" text
  c. "Floating Transcript Edited FLAG"

6.29 Transcript Processing Algorithm Process ends.

Figure 6D:
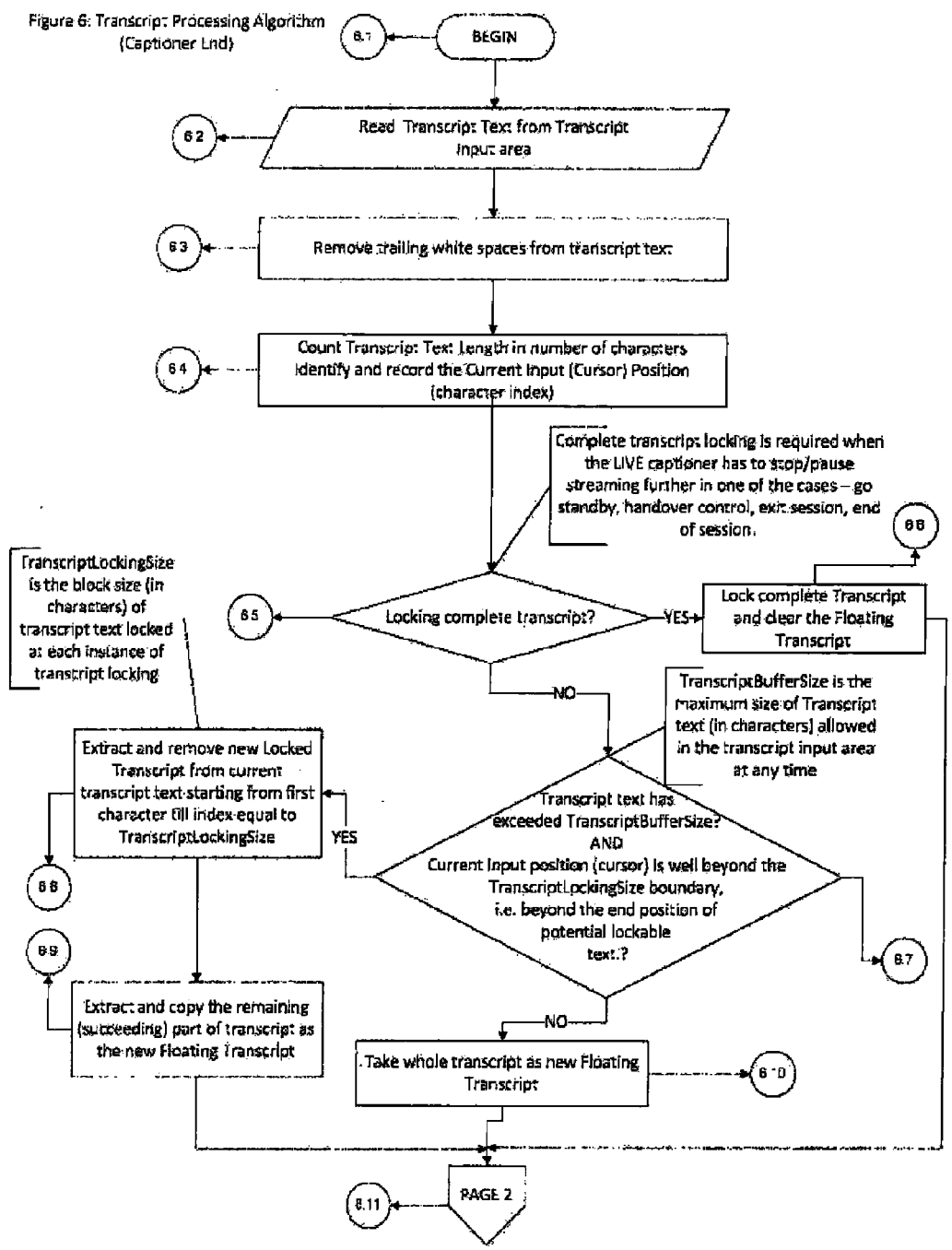
FIGS. 6D to 6F provide a flowchart illustration of an alternative embodiment of the Transcript Processing routine, algorithm or process.
Figure 6E:
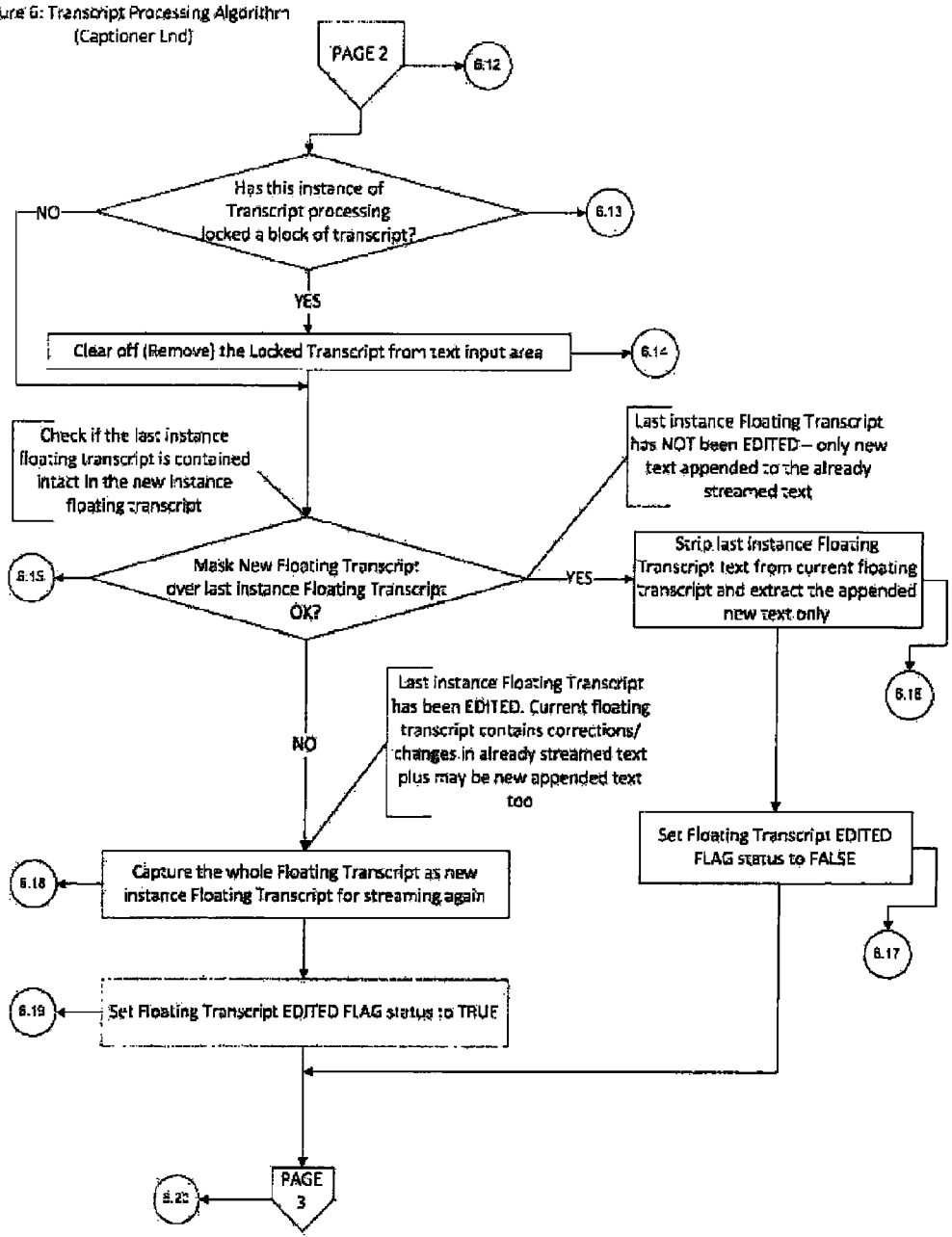
Figure 6F:
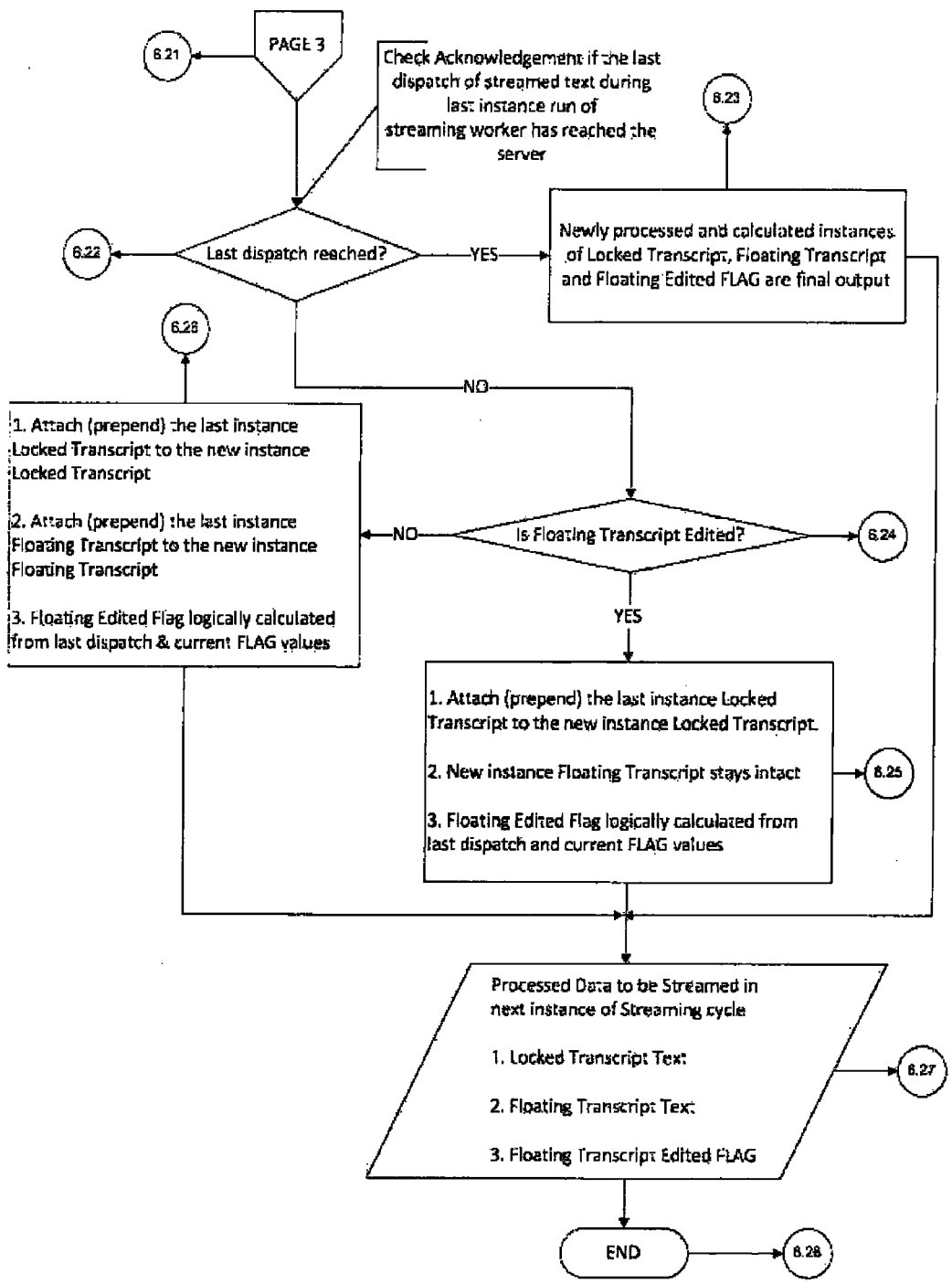

FIGS. 6D to 6F provide a flowchart illustration of an alternative embodiment of a Transcript Processing routine, algorithm or process. Each item in the flowchart has a reference numeral and the process taking place at each item is outlined here with a corresponding description for the each reference numeral.

Transcript Processing (Alternative)

6.1 Transcript Processing Algorithm Process begins.

6.2 "Input" to the process—"Transcript Text" read from transcript input area (text area) in Ai-STREAM. In some preferred embodiments, the transcript input area is in a main window of Ai-STREAM.

6.3 Remove trailing whitespaces from the "Transcript Text" to avoid streaming whitespaces that do not have any trailing text.

6.4 Obtain length count of "Transcript Text" in number of characters. Identify and record the Current Input (Cursor) Position (character index).

6.5 Confirm whether the current LIVE captioner is "Locking Complete Transcript".

A Boolean status FLAG for "Locking Complete Transcript" is inferred and provided by the "Streaming Worker" process from the "HasFinished" status FLAG processed in "Streaming Worker" process. "Locking Complete Transcript" indicates that the LIVE captioner has to stop (or pause) streaming further and so the complete floating transcript must be locked with the current instance execution of "Transcript Processing Algorithm" process.

6.6 If the result of 6.5 above is "Yes" i.e. "True"; Lock complete "Transcript" and clear the "Floating Transcript". This means concatenating the "Floating Transcript" string variable to "Locked Transcript" string variable and then emptying the "Floating Transcript" string variable. Proceed to next step in 6.13.

6.7 If the result of 6.5 above is "No" i.e. "False"; confirm whether the Transcript Text has some potential Lockable portion. Partial transcript locking is possible only if "Transcript" Text size (character count) has exceeded "TranscriptBufferSize" AND Current input position (cursor) is well beyond the TranscriptLockingSize boundary, i.e. beyond the end position of potential lockable text.

"TranscriptBufferSize" is the maximum size (length in character count) of "Transcript" text allowed in the transcript input area at any time.

"TranscriptLockingSize" is the block size (length in character count) of transcript text locked at each instance of transcript locking.

6.8 If the result of 6.7 above is "Yes" i.e. "True"; Extract and remove new "Locked Transcript" from current transcript text starting from first character till character position index equal to "TranscriptLockingSize". "TranscriptLockingSize" is the block size (length in character count) of transcript text locked at each instance of transcript locking.

6.9 Extract and copy the remaining (succeeding) part of transcript as the new "Floating Transcript".

6.10 If the result of 6.7 above is "No" i.e. "False"; take the whole transcript text as new "Floating Transcript". The transcript text has not yet accumulated to the specified buffer size.

6.11 "Off Page Reference" connector to the "Page 2" (Figure GE) of flowchart diagram/figure.

6.12 "Off Page Reference" connector in continuity from "Page 1" (FIG. 6D) of flowchart diagram/figure.

6.13 Check and confirm whether transcript locking has occurred back in 6.7, 6.8 & 6.9. If the result is "No" i.e. "False"; proceed to 6.15 normally.

6.14 If the result of 6.13 above is "Yes" i.e. "True"; clear off (remove) the "Locked Transcript" text block from the transcript text input area on, in some preferred embodiments, the Ai-STREAM main window.

6.15 Confirm whether the last instance string value of "Floating Transcript" text is contained intact in the new instance string value of "Floating Transcript" text. To confirm this, mask the new "Floating Transcript" over the last instance "Floating Transcript" and verify whether it "masks" well.

6.16 If the result of 6.15 above is "Yes" i.e. "True"; this indicates that the last instance "Floating Transcript" has not been edited—only new text appended to the already streamed text. Strip last instance "Floating Transcript" string text block from current new "Floating Transcript" string and extract the appended new text only into the "Floating Transcript".

6.17 Set "Floating Transcript EDITED" status FLAG to "False". Proceed to 6.20.

6.18 If the result of 6.15 above is "No" i.e. "False"; this indicates that the last instance "Floating Transcript" has been edited and current new "Floating Transcript" contains corrections/changes in already streamed text, plus potentially new appended text. Capture the whole "Floating Transcript" text string as new instance "Floating Transcript" for streaming again.

6.19 Set "Floating Transcript EDITED" status FLAG to "True".

6.20 "Off Page Reference" connector to the "Page 3" (FIG. 6F) of flowchart diagram/figure.

6.21 "Off Page Reference" connector in continuity from "Page 2" (Figure GE) of flowchart diagram/figure.

6.22 Confirm whether the "Last Dispatch" of streaming captions has reached the server. Check "Server Response Acknowledgement" received in the "Streaming Worker Process" to verify if the "Last Dispatch" of streamed text during last instance run of "Streaming Worker Process" has reached the server. Refer to FIGS. 5A to 5C for Streaming Worker Process.

6.23 If the result of 6.23 above is "Yes" i.e. "True"; this indicates that the newly inferred instance values of "Locked Transcript", "Floating Transcript" and "Floating Transcript Edited FLAG" are the final output. Proceed to "Output" in 6.27.

6.24 Confirm whether "Is Floating Transcript Edited". To confirm this lookup the status of "Floating Transcript Edited FLAG" inferred back in either of 6.17 or 6.19.

6.25 If the result of 6.25 above is "Yes" i.e. "True";
 a. Attach (prefix) the last instance text string value of "Locked Transcript" to the new instance text string value of "Locked Transcript".
 b. New Instance text string value of "Floating Transcript" stays intact.
 c. "Floating Transcript EDITED" FLAG inferred (logically calculated) from "Last Dispatch" FLAG and current "Floating Transcript EDITED" FLAG values.
 d. Proceed to 6.27.

6.26 If the result of 6.25 above is "No" i.e. "False";
 a. Attach (prefix) the last instance text string value of "Locked Transcript" to the new instance text string value of "Locked Transcript".
 b. Attach (prefix) the last instance text string value of "Floating Transcript" to the new instance text string value of "Floating Transcript".
 c. "Floating Transcript EDITED" FLAG inferred (logically calculated) from "Last Dispatch" FLAG and current "Floating Transcript EDITED" FLAG values.

6.27 "Output"—processed data to be streamed during next streaming cycle i.e. next instance execution of "Streaming Worker" Process:
 a. "Locked Transcript" text
 b. "Floating Transcript" text
 c. "Floating Transcript Edited FLAG"
 Transcript Processing Algorithm Process ends.

The experience of a captioner may vary depending on the configuration being used in the operation of the system, including depending on whether the captioner is located near to, or remotely from, the voice/sound to be captioned. As previously indicated, in some preferred embodiments, one or more text input means includes a voice recognition program. In some such embodiments, the captioner listens to the voice/sound to be captioned and re-speaks it into the voice recognition program to generate the inputted text or first text string. This type of configuration is preferably suited to the captioner being located remotely from the voice/sound to be captioned.

The experience of the captioner when the system is operated with this configuration may, for example, be as follows:

The captioner starts computer, plugs in microphone and plugs headset into telephone.

The captioner opens voice recognition program, such as Dragon NaturallySpeaking and the Ai-STREAM application.

The captioner verifies URL in Ai-STREAM (as prompted by pop-up).

The captioner opens User Profile in voice recognition program and performs accuracy check.

The captioner logs into Ai-STREAM with pre-supplied login and selects the correct session from a drop-down list.

The captioner agrees to terms and conditions in order to proceed, if required.

The captioner warms up by practising speaking into Ai-STREAM.

The captioner is connected to live audio with a phone call initiated either from the captioner or from where the voice/sound is being generated.

Session begins and captioner listens and re-speaks the content adding punctuation and summarising where appropriate, creating text output which is streamed to the viewer.

The captioner monitors streamed output, using the monitoring window.

During session, captioner and viewer may interact using secure public chat panel.

During session, captioner may handover control of the session to another captioner.

During session, another captioner may request control of the live session.

During session, captioner may forcibly take control of the session from another captioner.

The captioner is able to edit previously streamed text of last 2000 characters if errors occur from voice recognition program.

When the session is nearing scheduled end time, the captioner will be alerted by a flashing message.

If session goes over scheduled end time, the captioner may extend the session depending on arrangement with viewer.

To end the session, the captioner logs out and exits the session and completes and submits a shift report.

A warning message will appear when the final or sole captioner logs out of the session, advising that the captioner's exit will result in the end of the session.

After exiting, the captioner can update voice recognition software dictionary if desirable.

Ai-Live Controller Web Service

In preferred embodiments, Ai-Live Controller Web Service (also variously referred to herein as "Controller") is the platform for live session operation, activity control and communication amongst captioners and viewers. Controller preferably uses an 'Application State' on a server which is globally shared within an application pool.

For each active live session, Controller preferably creates and stores a LiveSession class object and saves it into the Application State. Since the Application State is globally shared within the application pool, it facilitates sharing the live session information, communication and control coordination amongst participants. The LiveSession class object stored in the Application State maintains all the properties of a live session, including, for example:
 Unique Session Id
 Session Title
 Start and End Date Time
 Who is the LIVE captioner?
 Is Control Requested?
 Which is the requesting captioner?
 Has Control been granted to the requesting captioner?
 the online statuses of viewers and captioners in the session.

In preferred embodiments, the Application State, LiveSession class object, and their respective preferred components, are of significance, particularly to the manner in which the system can synchronize, or substantially simultaneously coordinate, text streaming with delivery of streamed text to a viewer. This is described in more detail below.

Apart from monitoring and coordinating the live session activities, the Controller, of some preferred embodiments, also monitors and manages caption streaming access for individual viewers in each live session. It keeps a consistent track of the transcript already streamed to each individual viewer and maintains continuity of streaming captions separately for each viewer on subsequent caption fetch requests from the viewers. In preferred embodiments, like Ai-STREAM seeks an acknowledgement from Controller after sending captions, Controller also seeks an acknowledgement from the viewers' text receiving means after sending captions. In an event of timed out request/delivery of captions to viewer, the Controller preferably resends the last dispatch of captions to the viewer in the next request.

In preferred embodiments, Controller relies on the In Process Session State management for tracking and serving continuity of streaming captions for each individual viewer and maintains the state of "Dispatched Transcript" for each user separately in each user's "Web Request Context Session State". This is discussed in more detail below with reference to FIGS. 7A to 7C and 8.

The Controller of some preferred embodiments also takes care to auto save the live session transcript to a text file on the web server file system. The text file can be accessed during a session and/or after a session has been completed or is expired.

In some preferred embodiments, the ability of the Controller to monitor and manage caption streaming access for individual viewers is facilitated by suitable communication with an application adapted to provide viewers with access to the system. In some such preferred embodiments, particularly those associated with the system running over the internet or through an intranet using a web browser, the application is the Ai-Live Web Application.

Ai-Live Web Application

In preferred embodiments, Ai-Live system provides internet browser based access to live session captioning access to authorized viewers. A viewer preferably logs into a secure access area and selects the session to join out of a list of sessions to which the viewer is assigned.

Selection by a viewer of a live session to join preferably results in a viewer page connecting to the Controller. Once the viewer joins the session, a viewer screen is preferably loaded. The viewer screen preferably presents the viewer with live streaming captions appearing on the screen, with new text running through and populating the screen after short durations of fractions of a second. In preferred embodiments, this is achieved by the viewer page silently running a script that makes regular asynchronous requests to the Controller without intervening with the viewer's attention in attending live streaming captions.

In some preferred embodiments, the asynchronous request model used by viewer page is based on AJAX (Asynchronous JavaScript and XML) framework. Each subsequent asynchronous request to the Controller fetches newly arrived captions on the server following the previous request and/or the corrections/modifications in the transcript already fetched in one of the previous requests.

The viewer page of some preferred embodiments implements another transcript processing algorithm that receives a string of captions fetched by the current request, analyses it against the transcript already received and displayed on viewer page in previous streaming requests, identifies new captions in continuity to the existing transcript and corrections/modifications in existing transcript (if any) and applies the transcript additions/corrections appropriately to the current viewer's page.

Figure 7A:
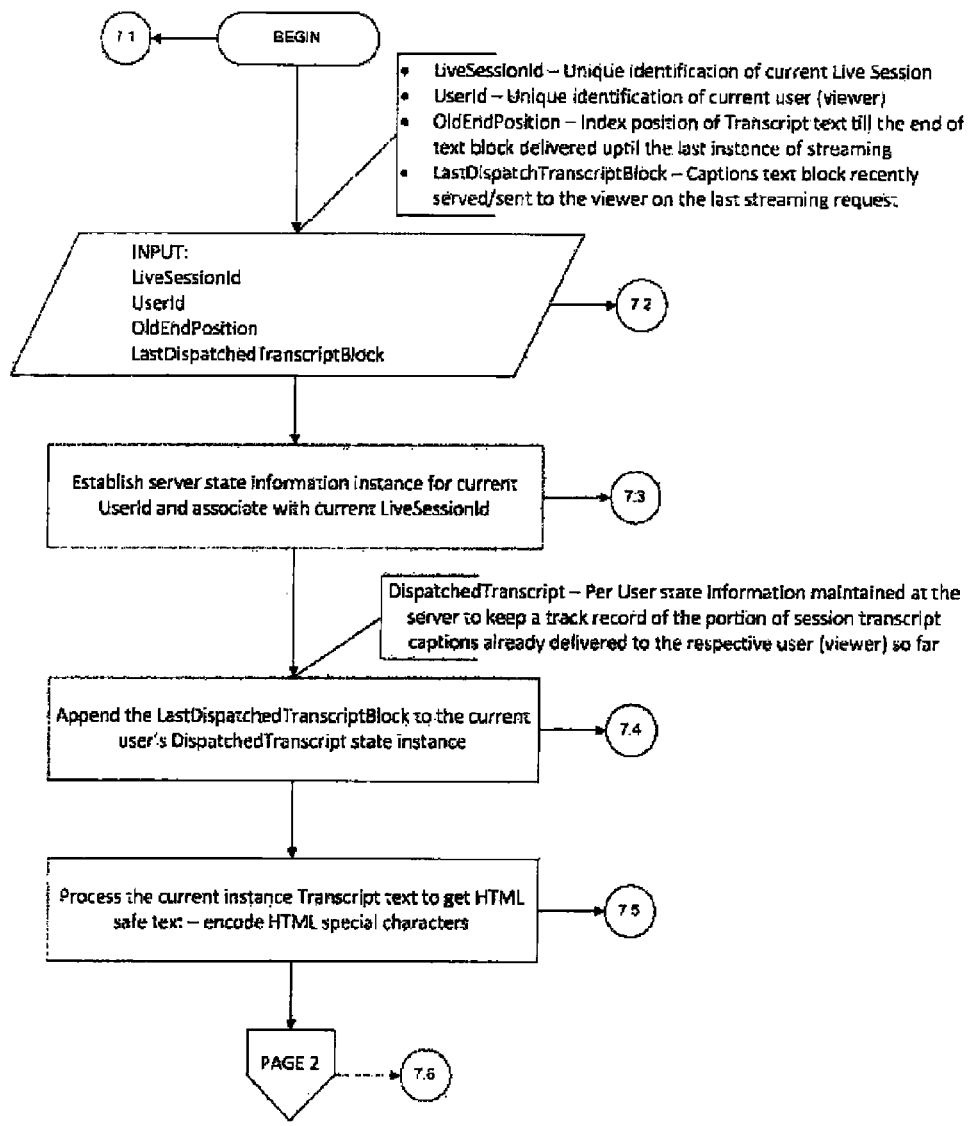
FIGS. 7A to 7C provide a flowchart illustration of the manner in which one preferred embodiment of the Transcript Delivery to Viewer routine, algorithm or process carries out its preferred function.
Figure 7B:
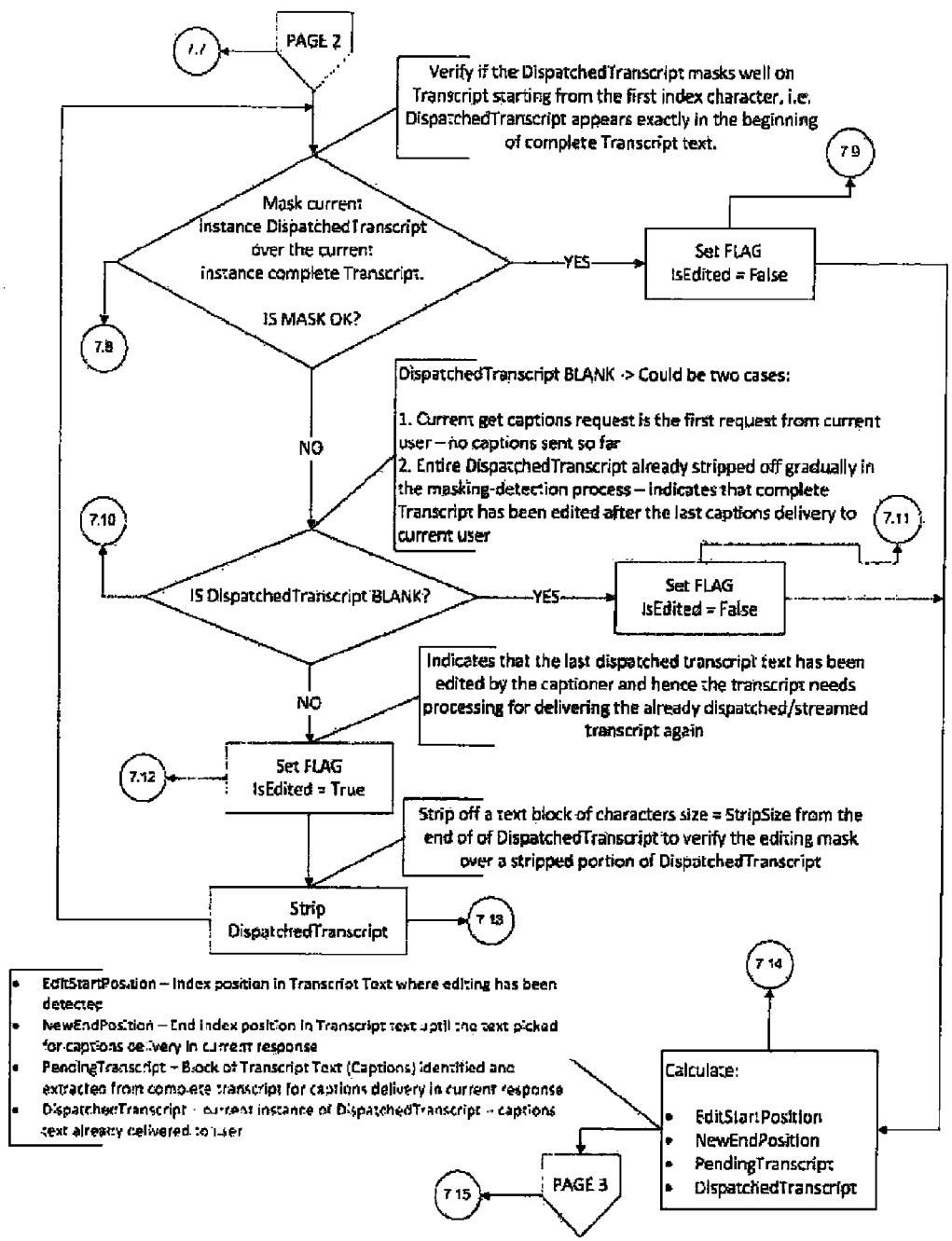
Figure 7C:
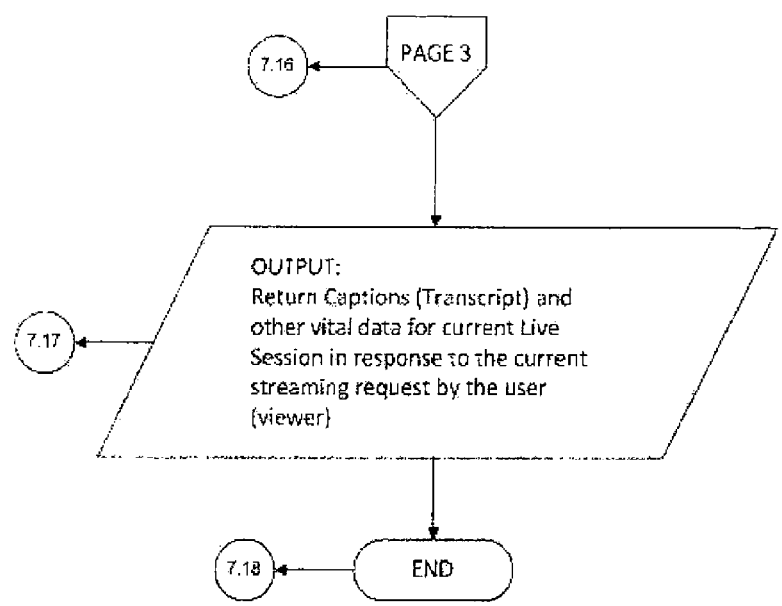
Figure 7D:
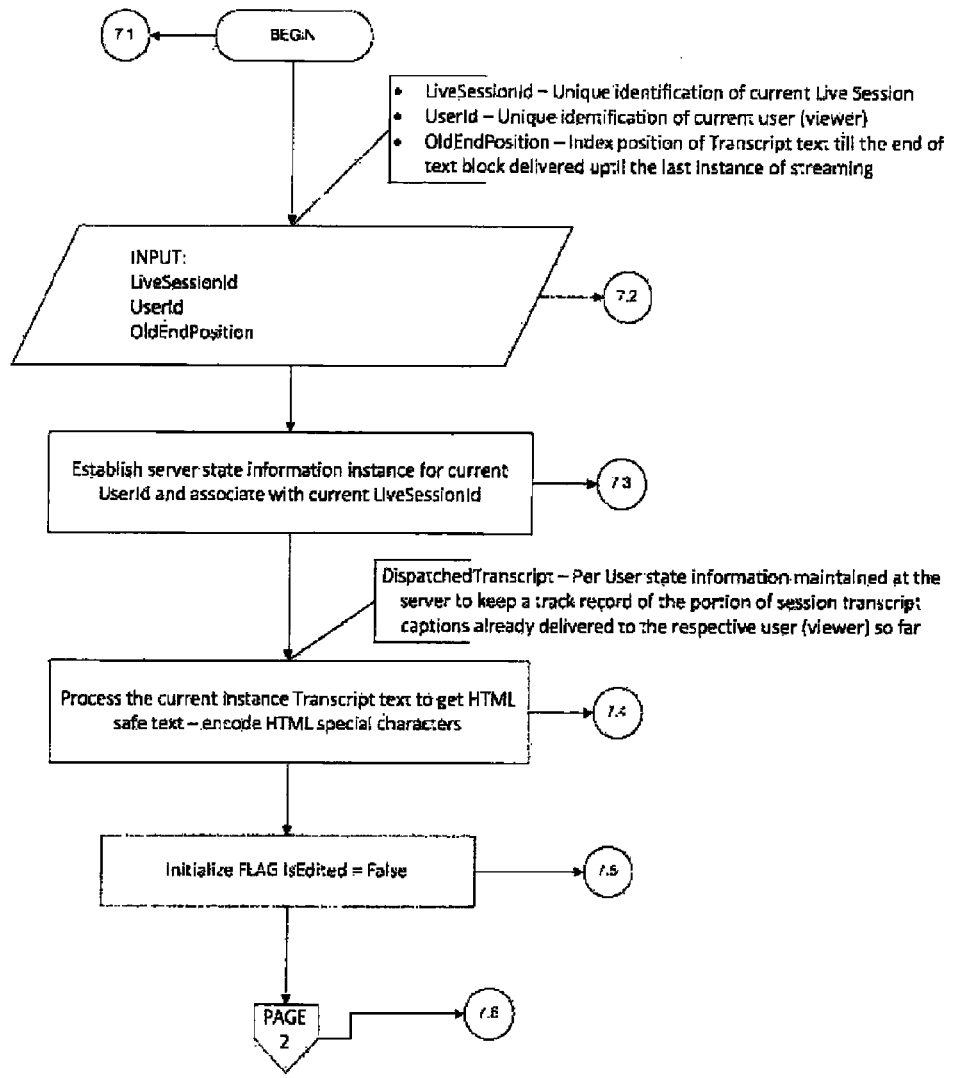
FIGS. 7D to 7G provide a flowchart illustration of an alternative embodiment of the Transcript Delivery to Viewer routine, algorithm or process.
Figure 7E:
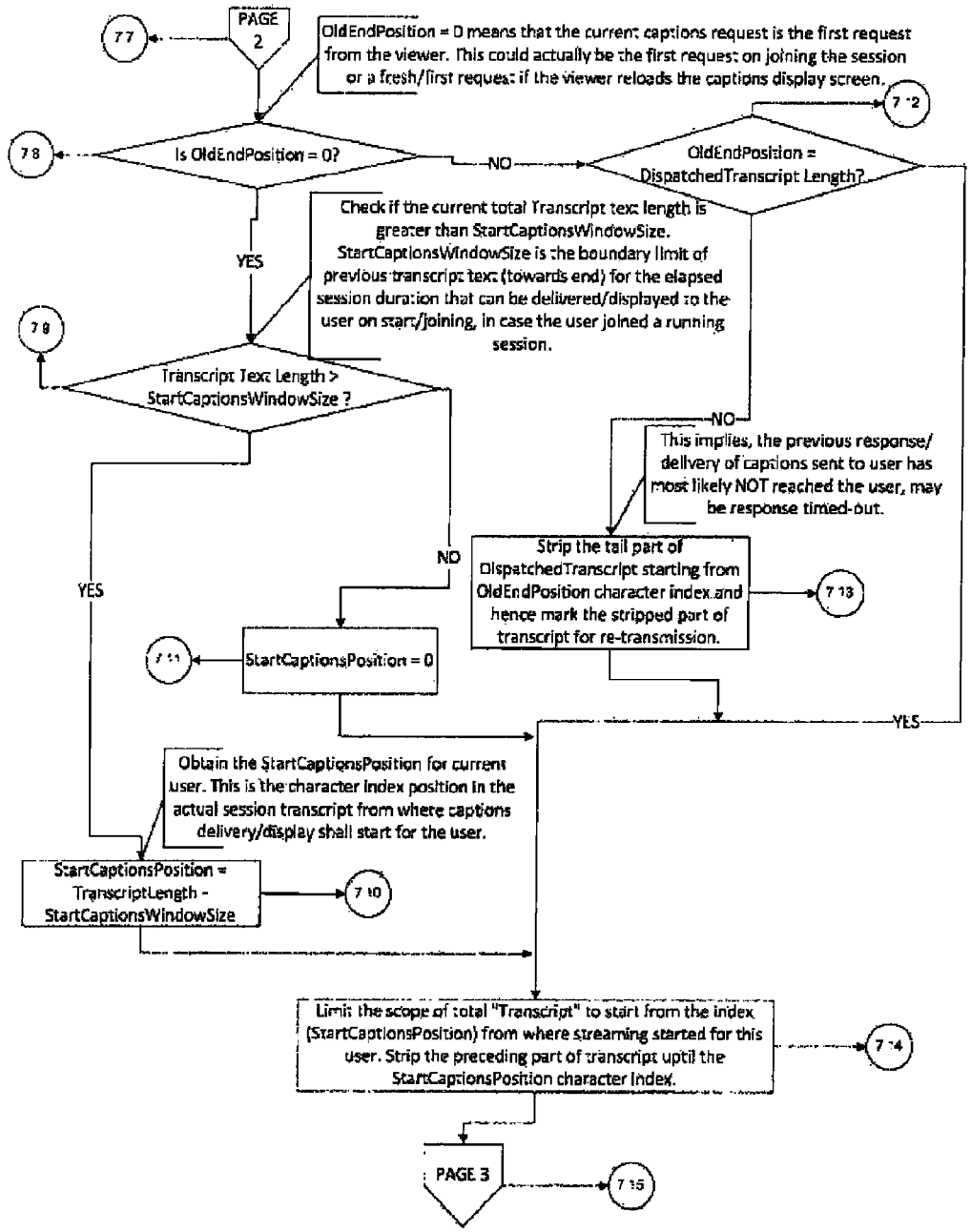
Figure 7F:
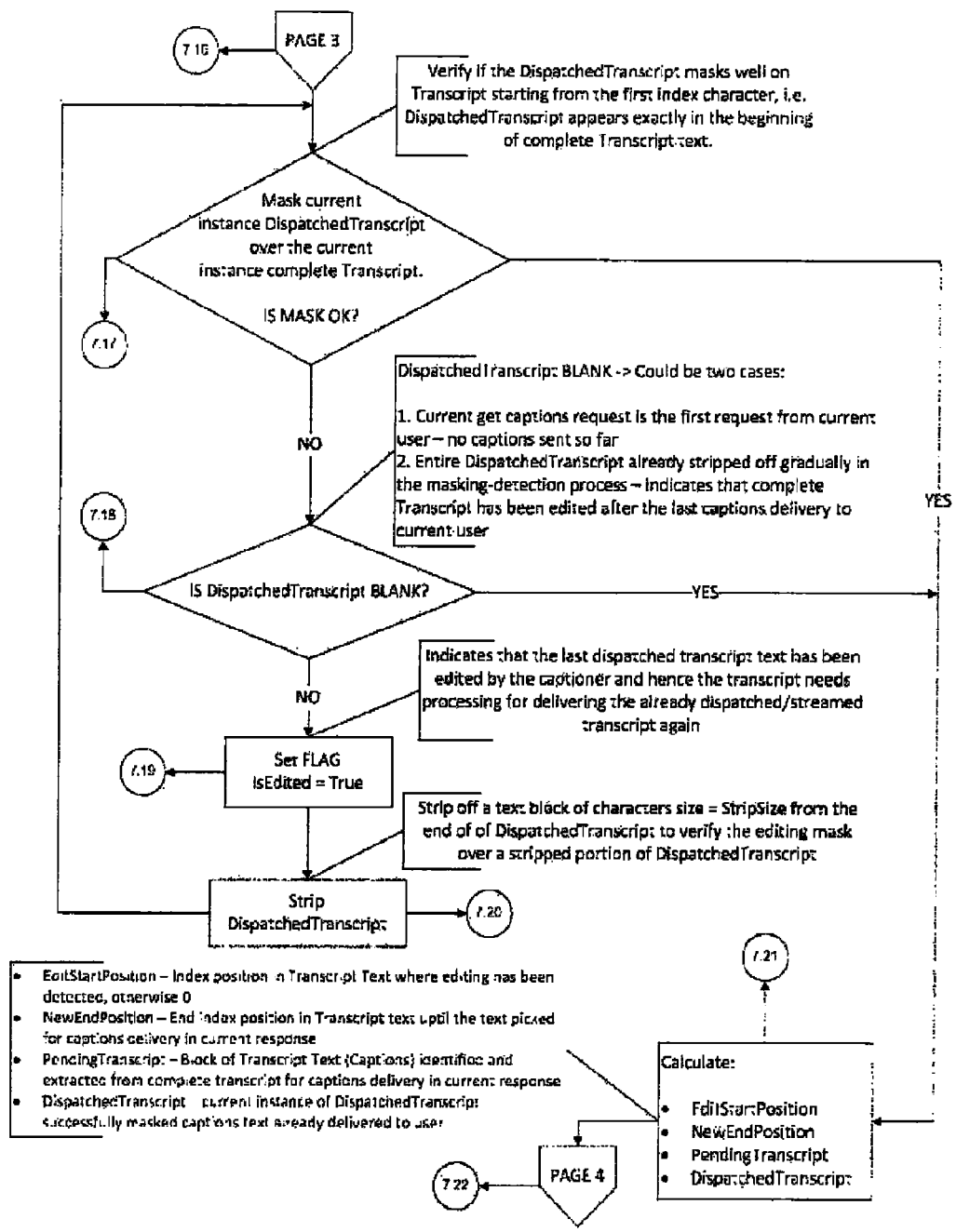
Figure 7G:
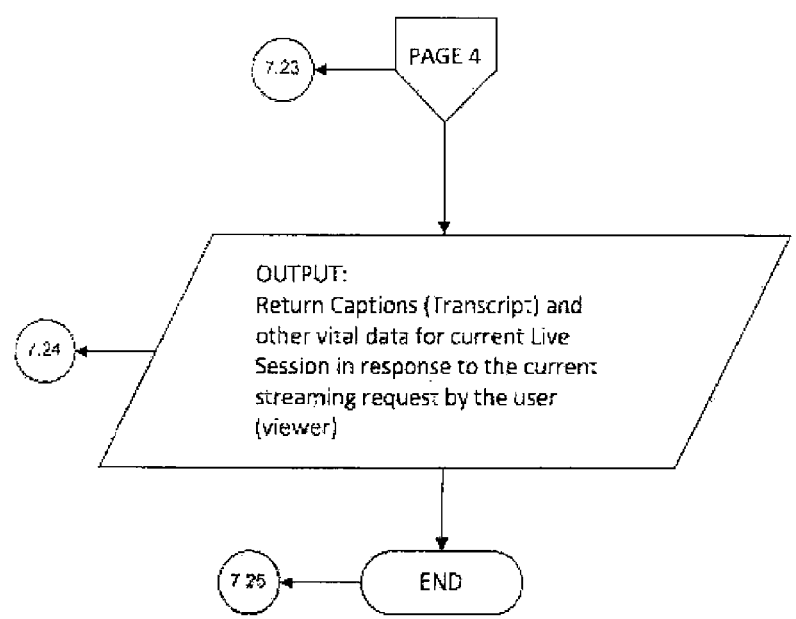

FIGS. 7A to 7C provide a flowchart illustration of the manner in which one preferred embodiment of the Transcript Delivery to Viewer routine, algorithm or process carries out its preferred function. Each item in the flowchart has a reference numeral and the process taking place at each item is outlined here with a corresponding description for the each reference numeral.

Transcript (Captions) Delivery to Viewer

7.1 Transcript (Captions) Delivery to Viewer Algorithm begins.

7.2 "Input" data to the process—following instance variables:
  a. "LiveSessionId"—Unique identification of current Live Session
  b. "UserId"—Unique identification of current user (viewer)
  c. "OldEndPosition"—Index position of Transcript text till the end of text block delivered up to the last instance of streaming
  d. "LastDispatchTranscriptBlock"—Captions text block recently served/sent to the viewer on the last streaming request

7.3 Establish "server session state" information instance for current "UserId" and associate with current "LiveSessionId".

7.4 Append the "LastDispatchedTranscriptBlock" to the current user's "DispatchedTranscript" session state instance. "DispatchedTranscript" refers to a server session state variable that maintains (stores) per user state information on the server to keep a track record of the portion of session transcript (captions) text already delivered to the respective user (viewer) so far.

7.5 Process the current instance Transcript text to get HTML safe text—encode HTML special characters.

7.6 "Off Page Reference" connector to the "Page 2" (FIG. 7B) of flowchart diagram/figure.

7.7 "Off Page Reference" connector in continuity from "Page 1" (FIG. 7A) of flowchart diagram/figure.

7.8 Mask current instance "DispatchedTranscript" over the current instance complete "Transcript" and verify whether the "DispatchedTranscript" masks well on "Transcript" starting from the first index character, i.e. whether the "DispatchedTranscript" appears exactly in the beginning of complete "Transcript" text. This masking verification confirms whether the last dispatched transcript text has been edited by the captioner in subsequent streaming cycles.

7.9 If the result of 7.8 above is "Yes" i.e. "True"; Set "IsEdited" FLAG to "False".
  Proceed to 7.14 ahead.

7.10 If the result of 7.8 above is "No" i.e. "False"; check and verify whether the "DispatchedTranscript" variable is BLANK i.e. contains no value. "DispatchedTranscript" could be blank for a number of reasons, including:
  a. Current streaming request to fetch (get/receive) captions is the first request from current user—no captions sent earlier so far.
  b. Entire "DispatchedTranscript" already stripped off gradually in the masking (editing detection) process—indicates that complete "Transcript" has been edited after the last captions delivery to current user.

7.11 If the result of 7.10 above is "Yes" i.e. "True":
  a. Set "IsEdited" FLAG to "False"
  b. Proceed to 7.14 ahead.

7.12 If the result of 7.10 above is "No" i.e. "False"; Set "IsEdited" FLAG to "True". This indicates that the last dispatched transcript text has been edited by the captioner in subsequent streaming cycles and hence the transcript needs processing for delivering the already dispatched/streamed transcript over again.

7.13 Remove a small block of text (characters) towards the end of the "DispatchedTranscript" string variable value i.e. truncated a few characters from the end of the "DispatchedTranscript" text string and cut the "DispatchedTranscript" to store only the remaining "left" text (characters) after truncation. Move back to 7.8 and repeat the masking (editing detection) procedure on "DispatchedTranscript".

7.14 Process and calculate the following data variables:
  a. "EditStartPosition"—Index position in "Transcript" Text where editing has been detected.
  b. "NewEndPosition"—End index position in "Transcript" text up to the text picked for captions delivery in current response.
  c. "PendingTranscript"—Block of Transcript Text (Captions) identified and extracted from complete transcript for captions delivery in current response
  d. "DispatchedTranscript"—current instance value of "DispatchedTranscript"—captions text already delivered to user 7.15 "Off Page Reference" connector to the "Page 3" (FIG. 7C) of flowchart diagram/figure.

7.16 "Off Page Reference" connector in continuity from "Page 2" (FIG. 7B) of flowchart diagram/figure.

7.17 "Output" of the process: Return processed (calculated) captions (transcript text) and other vital data for current Live Session in response to the current streaming request by the user (viewer).

7.18 Transcript (Captions) Delivery to Viewer Algorithm ends.

FIGS. 7D to 7G provide a flowchart illustration of an alternative embodiment of the Transcript Delivery to Viewer routine, algorithm or process. Each item in the flowchart has a reference numeral and the process taking place at each item is outlined here with a corresponding description for the each reference numeral.

Transcript (Captions) Delivery to Viewer (Alternative)

7.1 Transcript (Captions) Delivery to Viewer Algorithm begins.

7.2 "Input" data to the process—following instance variables:
  a. "LiveSessionId"—Unique identification of current Live Session
  b. "UserId"—Unique identification of current user (viewer)
  c. "OldEndPosition"—Index position of Transcript text till the end of text block delivered up to the last instance of streaming 7.3 Establish "server session state" information instance for current "UserId" and associate with current "LiveSessionId"

7.4 Process the current instance Transcript text to get HTML safe text—encode HTML special characters.

7.5 Initialize and Set IsEdited FLAG to False. This FLAG is used to determine whether the captions already delivered to the user in the previous cycles has been edited/modified.

7.6 "Off Page Reference" connector to the "Page 2" (FIG. 7E) of flowchart diagram/figure.

7.7 "Off Page Reference" connector in continuity from "Page 1" (FIG. 7D) of flowchart diagram/figure.

7.8 Check if OldEndPosition=0?

OldEndPosition=0 means that the current captions request is the first request from the viewer. This could actually be the first request on joining the session or a fresh/first request if the viewer reloads the captions display screen.

If YES, Proceed to 7.9 ahead. Otherwise if NO, proceed to 7.12 ahead.

7.9 If the result of 7.8 above is YES, i.e. "True" then check if the current total Transcript text length is greater than StartCaptionsWindowSize.

StartCaptionsWindowSize is the boundary limit of previous transcript text (towards end) for the elapsed session duration that can be delivered/displayed to the user on start/joining, in case the user joined a running session.

If YES, proceed to 7.10 ahead. Otherwise if NO, proceed to 7.11 ahead.

7.10 If the result of 7.9 above is YES, i.e. "True"; obtain the StartCaptionsPosition for current user. This is the character index position in the actual session transcript from where captions delivery/display shall start for the user.

Proceed to 7.14 ahead.

7.11 If the result of 7.9 above is NO, i.e. "False, set the StartCaptionsPosition=0. This implies that the captions delivery/display for the current user starts from the beginning of running session's transcript because the current transcript size is still within the boundary limits of StartCaptionsWindowSize.

Proceed to 7.14 ahead.

7.12 If the result of 7.8 above is NO, i.e. "False", it implies the current request is a subsequent request for from the user. Verify if the OldEndPosition acknowledgement received with the user request is equal to the end position of the DispatchedTranscript as per the server's preview? This is to verify whether or not the previous (preceding current request) response/delivery of captions sent to the user had actually reached the user.

If YES, proceed to 7.14 ahead. Otherwise if NO, proceed to 7.13 ahead.

7.13 If the result of 7.12 above is NO, it implies that the previous (preceding current request) response/delivery of captions sent to user has most likely NOT reached the user, may be response timed-out.

Strip the tail part of DispatchedTranscript starting from OldEndPosition character index and hence mark the stripped part of transcript for re-transmission.

7.14 Limit the scope of total "Transcript" to start from the index (StartCaptionsPosition) from where streaming started for this user. Strip the preceding part of transcript up until the StartCaptionsPosition character index.

7.15 "Off Page Reference" connector to the "Page 3" (FIG. 7F) of flowchart diagram/figure.

7.16 "Off Page Reference" connector in continuity from "Page 2" (FIG. 7E) of flowchart diagram/figure.

7.17 Mask current instance "DispatchedTranscript" over the current instance complete "Transcript" and verify whether the "DispatchedTranscript" masks well on "Transcript" starting from the first index character, i.e. whether the "DispatchedTranscript" appears exactly in the beginning of complete "Transcript" text. This masking verification confirms whether the last dispatched transcript text has been edited by the captioner in subsequent streaming cycles.

If the result is YES, proceed to 7.21 ahead. Otherwise if NO, proceed to 7.18 ahead.

7.18 Check and verify whether the "DispatchedTranscript" variable is BLANK i.e. contains no value. "DispatchedTranscript" could be blank for a number of reasons, including:
  a. Current streaming request to fetch (get/receive) captions is the first request from current user—no captions sent earlier so far.
  b. Entire "DispatchedTranscript" already stripped off gradually in the masking (editing detection) process— indicates that complete "Transcript" has been edited after the last captions delivery to current user.

c. If YES, proceed to 7.21 ahead. Otherwise if NO, proceed to 7.19 ahead.

7.19 Set "IsEdited" FLAG to "True". This indicates that the last dispatched transcript text has been edited by the captioner in subsequent streaming cycles and hence the transcript needs processing for delivering the already dispatched/streamed transcript over again.

7.20 Remove a small block of text (characters) towards the end of the "DispatchedTranscript" string variable value i.e. truncated a few characters from the end of the "DispatchedTranscript" text string and cut the "DispatchedTranscript" to store only the remaining "left" text (characters) after truncation. Move back to 7.17 and repeat the masking (editing detection) procedure on "DispatchedTranscript".

7.21 Process and calculate the following data variables:
  a. "EditStartPosition"—Index position in "Transcript" Text where editing has been detected.
  b. "NewEndPosition"—End index position in "Transcript" text up to the text picked for captions delivery in current response.
  c. "PendingTranscript"—Block of Transcript Text (Captions) identified and extracted from complete transcript for captions delivery in current response
  d. "DispatchedTranscript"—current instance value of "DispatchedTranscript"—captions text already delivered to user

7.22 "Off Page Reference" connector to the "Page 4" (FIG. 7G) of flowchart diagram/figure.

7.23 "Off Page Reference" connector in continuity from "Page 3" (FIG. 7F) of flowchart diagram/figure.

7.24 "Output" of the process: Return processed (calculated) captions (transcript text) and other vital data for current Live Session in response to the current streaming request by the user (viewer).

Transcript (Captions) Delivery to Viewer Algorithm ends.

In some preferred embodiments, one or more components of the system, including the viewer page itself, also initiates a further routine, algorithm or process (variously referred to in the specification as "viewer display routine, algorithm or process") that enables the added/corrected streaming text that is added to the viewer screen with each streaming fetch cycle to be highlighted with a particular background colour or appear in inverse video mode to facilitate location identification and following by the viewer of the periodic transcript updates with improved focus and concentration as the text is fetched. The inverse video mode can be applied to all added/corrected text. The viewer display routine, algorithm or process is described in more detail below, with reference to FIGS. 9A and 9B.

In some preferred embodiments, the viewer screen supports auto scroll mode. In such embodiments, as the streaming text fills the viewer screen, the screen automatically continues to be scrolled up vertically moving the old text upwards and accommodating the new text as it appears for viewer readability. The viewer screen preferably also provides control to the viewer to stop/start the auto scroll mode, enabling the viewer to manually scroll up or down throughout the entire transcript if desirable.

In further preferred embodiments, the viewer screen provides text formatting controls to facilitate the viewer with his own choice of streaming text formatting and appearance, including in relation to visual features, such as, font size, style, colour, background colour, highlight colour, and other visual features.

The viewer screen of some preferred embodiments also includes an interactive public message area where the viewer can chat with fellow viewers and captioners. Such a public message area can provide an interactive live session service in which the viewers can raise their queries/thoughts in an interactive-type environment, such as a classroom or lecture theatre. In some such embodiments, the interactivity is facilitated through the coordinating captioner. The public message area can also execute regular asynchronous calls to monitor online presence of other users and send and fetch new messages in near live time.

Synchronization Between Streaming (Captioning) and Viewing

In preferred embodiments, the process of text streaming is synchronised, or adapted to be co-ordinated substantially simultaneously, with the process of delivery of streamed text to the viewer. In a manner of speaking, the text streaming process occurs 'on the streaming (captioning) end' and the delivery of streamed text to the viewer process occurs 'on the viewing end', broadly as follows:

On the streaming (captioning) end—the Ai-STREAM preferably connects to the Controller with a "Live Session Id" token and keeps on streaming captions for the running live session in each subsequent streaming request cycle. As explained in detail above, the streamed captions preferably keep on accumulating in the "Live Session" object stored in the "Application State" on the server. The continuous subsequent streaming requests in Ai-STREAM are executed by the background worker process threads.

On the viewing end—as explained in detail above, the viewer page preferably silently keeps on running a script that makes regular asynchronous requests to the Controller without intervening with the viewer's attention in attending live streaming captions. Each subsequent asynchronous request to the Controller fetches new arrived captions on the server following the previous request and/or the corrections/modifications in the transcript already fetched in one of the previous requests.

Figure 8:
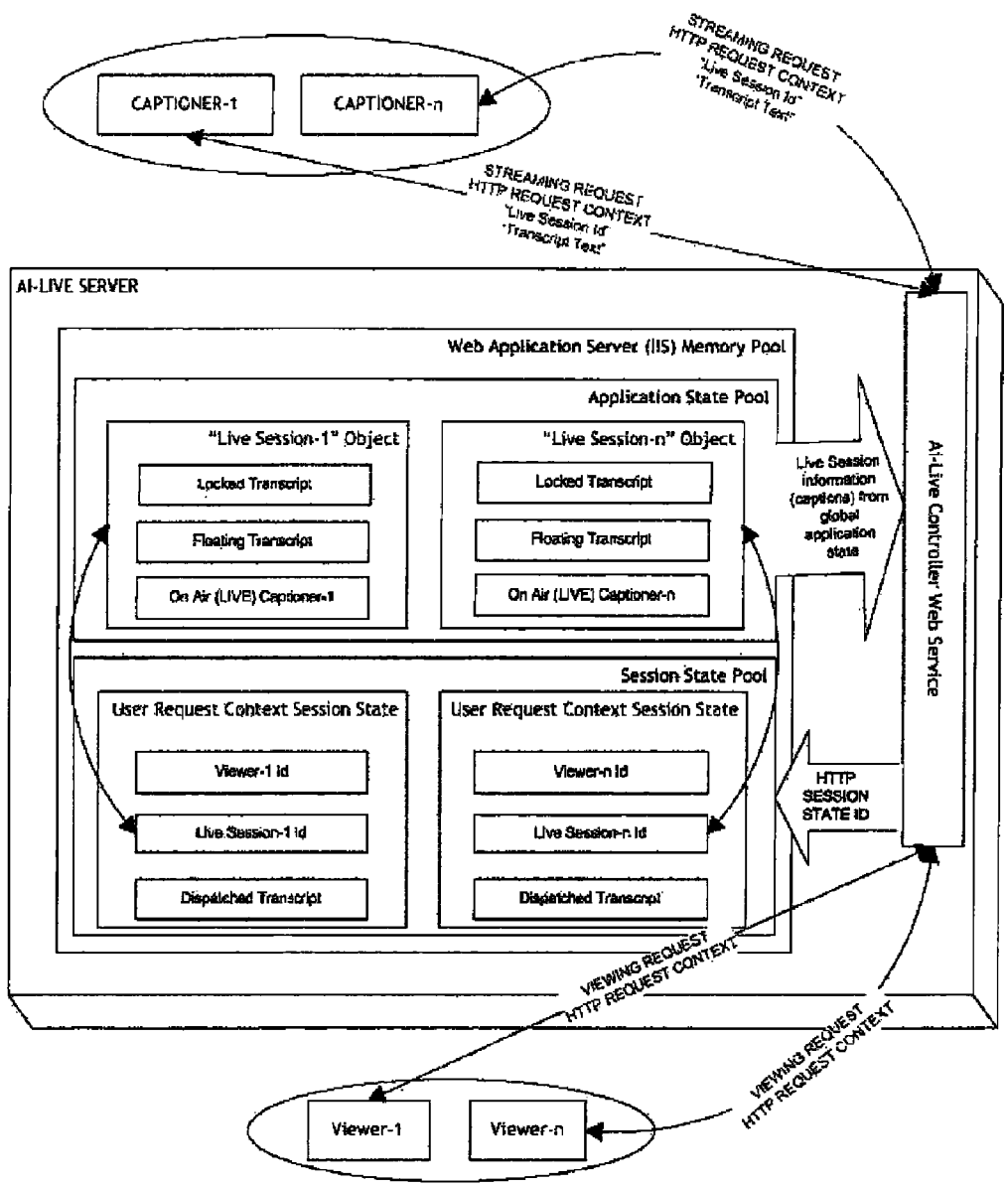
FIG. 8 is a schematic illustration of the architecture adapted to enable synchronization between text streaming and delivery of streamed text according to one preferred embodiment of the invention.

Synchronization between text streaming and delivery of streamed text is carried out, in some preferred embodiments, by the Controller executing on the server. The architecture for this process to be executed is illustrated in FIG. 8.

The Web Application Server's Memory Pool provides the framework and communications channel for synchronization between streaming (captioning) and viewing. In the embodiment depicted, the Ai-Live system runs on the Internet Information Services (IIS)—MS Windows based Web Application Server. The memory pool of the web server is further categorized into an "Application State Pool" and a "Session State Pool".

Application State Pool stores the data in Application Variables that are shared globally (common) between all users (visitors) accessing the same web application.

Session State Pool stores the data in Session Variables that are private to each individual user (visitor) accessing the same web application.

The Web Application is served by a web application server over Hyper Text Transfer Protocol (HTTP). The user requests to the web server through an Internet Browser are bound to a dedicated HTTP Request Context. As a web browser instance sends the first request (web request) to a website (web application), the browser instance gets allocated a dedicated HTTP Request Context uniquely identified by a unique HTTP Session State Id. This dedicated HTTP Session State allocated to a specific browser instance (user/visitor of website/application) can be used to store the data (information) in form of Session Variables. Data stored in these Session Variables prevails between subsequent user (browser) requests to the website/application from the same user (browser) instance.

In a Live Streaming Session application, there may be multiple users (particularly viewers) connected to and accessing a Live Session, i.e. multiple participants in the Live Session. In preferred embodiments, irrespective of the number of participants, certain attributes of a Live Session are common to all participants at all instances of time, including, for example, the streamed transcript (captions) text in a Live Session, LIVE captioner identification and active/terminated status of Live Session, among other such attributes.

The preferable technologically shared nature of Application Variables preferably provides a means to share this common Live Session information amongst all participants. Further, the Live Session is maintained and stored in an Application Variable in an object-oriented fashion. Ai-Live creates an object-oriented construct of the Live Session by creating a LiveSession class object and stores in an Application Variable. Each time the Live Session needs to be accessed, for adding or fetching captions or updating the operational state of the Live Session, the Controller accesses the LiveSession object from the designated Application Variable and completes the desired operation by accessing the appropriate Attribute(s) of the LiveSession object and executing the appropriate procedure(s).

Dealing with multiple participants (particularly viewers) accessing a Live Session simultaneously preferably requires a mechanism to monitor and track each individual participant's state in the Live Session, including the transcript (captions) delivery state instance for each viewer.

In preferred embodiments, the system seeks out how much of the Live Session Transcript has already been delivered to each individual viewer so as to efficiently deliver the next batch of pending captions in the next request from the viewer. The technologically private nature of Session Variables preferably provides a means to manage the state information exclusively for each individual viewer. For example, a Session variable stores the Live Session Id for each user, thus keeping a track of to which Live Session/s a particular user is joined. The Live Session Id Session variable stored exclusively for each viewer helps identify which Application Variable to access for the current viewer's Live Session access.

Another Session variable stores the Dispatched Transcript text exclusively for each user that helps keep a track of the portion of transcript (captions) already delivered to a viewer in a Live Session and thus efficiently identify and deliver pending portions of captions from the total Transcript streamed up to that point in the Live Session.

In preferred embodiments, the streaming and viewing synchronization is maintained broadly through the following procedure (steps):

1. A user request (captioner or viewer) for streaming or viewing reaching the server is directed to the Controller.

2. The Controller accesses the HTTP Request Context Session State of the user to identify the Live Session Id of which the user is a participant.

3. Having identified the Live Session Id, the Controller accesses the corresponding LiveSession object from the Application State.

4. Controller accesses the appropriate Attribute(s) and executes the appropriate procedure(s) of the LiveSession object and provides an appropriate response to the user corresponding to the request received.

As noted above, in some preferred embodiments, one or more components of the system, including the viewer page itself, also initiates a viewer display routine, algorithm or process that enables the added/corrected streaming text that is added to the viewer screen to have specific font colouring and/or to be highlighted in inverse video mode to facilitate bring added/corrected text to the viewer's attention.

In broad terms, this routine, algorithm or process refers the transcript text already fetched and displayed on the viewer page during the last streaming cycle as "Old Text" and the transcript text update received during the current streaming cycle as "New Text". The "New Text" fetched from the server is one component attribute of the Live Session and Transcript state data received in XML (Extensible Mark-up Language) format. Other attributes of the XML data contain the "Is Old Text Edited" Boolean status flag that indicates (the indication coming from server) whether a portion or the whole of the "Old Text" already streamed and displayed on the viewer screen has been received on the server as re-streamed content following some adding/corrections from the captioner.

Another attribute in supplement when "Is Old Text Edited" flag returns "True", is "Edit Start Position" that contains the nearest character position index preceding the detected editing index position in the "Old Text".

If the viewer receives a "true" status for "Is Old Text Edited" flag, the viewer display algorithm follows "editing detection" procedure that locates the editing changes in "Old Text" per word and characterises the identified edited words as "highlighted text" in inverse video manner by applying a distinctive background and fore text colour to the edited words.

Irrespective of the status of "Is Old Text Edited" Flag there will usually be some "New Text" received in a streaming cycle. The viewer display algorithm characterises the "New Text" text string/block as "highlighted text" and appends it to the "Old Text" displayed on viewer screen.

By means of the editing and new content addition detection procedure outlined above, the "Edited Text" and "New Text" identified and highlighted during a streaming request subsequently becomes the part of "Old Text" during the next streaming requests that results in subsequent turning off the highlighting from earlier highlighted text and the highlighting effect moves to new changes and/or additions identified in next streaming request cycle.

Figure 9A:
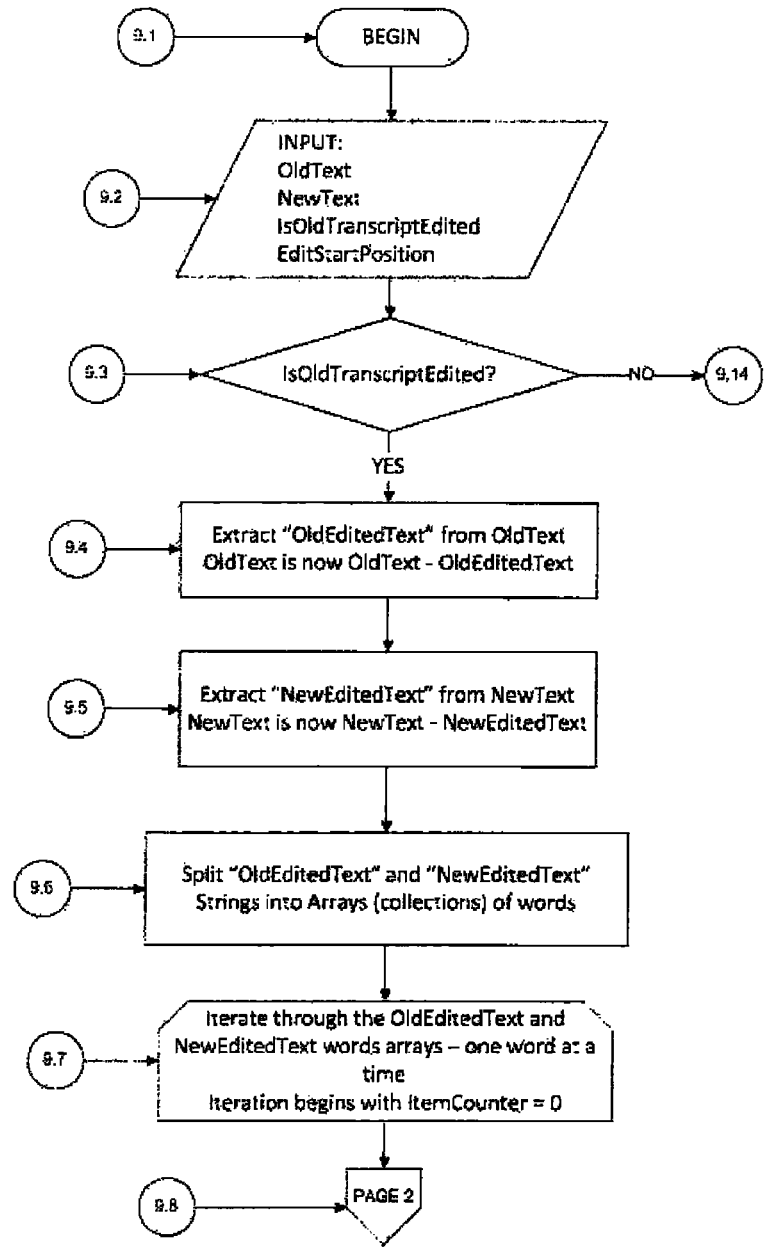
FIGS. 9A to 9B provide a flowchart illustration of the manner in which one preferred embodiment of the Viewer Display routine, algorithm or process carries out its preferred function.
Figure 9B:
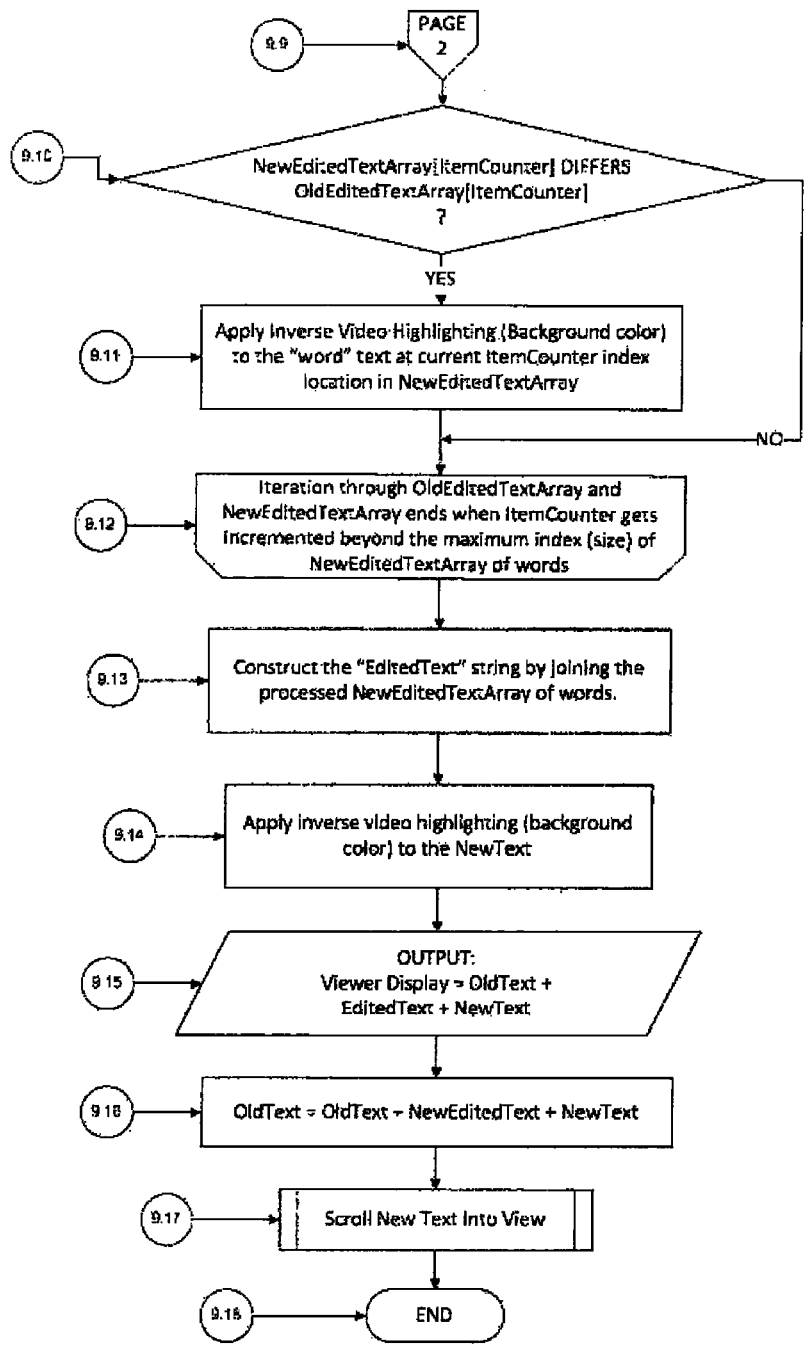

FIGS. 9A and 9B provide a flowchart illustration of the manner in which one preferred embodiment of the viewer display routine, algorithm or process carries out its preferred function. Each item in the flowchart has a reference numeral and the process taking place at each item is outlined here with a corresponding description for the each reference numeral.

Viewer display routine, algorithm or process 9.1 Viewer Display formatting and highlighting of new text and edited changes algorithm begins.

9.2 Input to the viewer display algorithm is the Live Session and Transcript state data received in XML (Extensible Mark-up Language) format. The essential attributes of this XML data include:

NewText—the transcript text update received during the current streaming cycle as "New Text".

IsOldTranscriptEdited—Boolean status flag that indicates (indication from server) whether a portion or whole of the "Old Text" already streamed and displayed on the viewer screen has been received on the server as re-streamed content following some editing/corrections from the captioner.

EditStartPosition—the nearest character position index preceding the detected editing index position in the "Old Text".

Apart from these data attributes received from the server during each streaming request cycle, the viewer display algorithm also maintains some instance state variables including primarily:

OldText—the transcript text already fetched and displayed on viewer page during last streaming cycle.

9.3 Check the IsOldTranscriptEdited FLAG status to verify whether the server has returned a "Yes" i.e. "True" status indicating any editing or correction in the old transcript text already streamed and displayed on viewer screen during the preceding streaming requests. If the result of 9.3 above is "Yes" i.e. "True"; proceed to 9.4. Otherwise if the result of 9.3 above is "No" i.e. "False"; proceed to 9.14.

9.4 Extract "OldEditedText" from OldText by stripping off and removing the lateral portion of OldText string starting from EditStartPosition character index position till the end of the OldText string. OldText is then equal to remaining OldText string after removing the OldEditedText from right end of the OldText string.

9.5 Extract "NewEditedText" from NewText by stripping off and removing the starting portion of NewText string starting from first character index position till the character index position equal to EditStartPosition in NewText. NewText is then equal to remaining NewText string after removing the NewEditedText string from left end of the NewText string.

9.6 Split the OldEditedText and NewEditeText strings by the blank-space delimiter so as to get arrays (collections) of words. OldEditedText gets split into OldEditedTextArray and NewEditedText gets split into NewEditedTextArray.

9.7 Iterate through the OldEditedTextArray and NewEditedTextArray (arrays of words) one word at a time. Begin the iteration with Item Counter=0 and repeat through steps 9.10 to 9.11.

9.8 Off page reference connector to Page 2 (FIG. 9B).

9.9 Off page reference connector in continuity from Page 1 (FIG. 9A).

9.10 Check and verify whether the current word at the current ItemCounter (value in iteration) index location in NewEditedTextArray differs from the corresponding word at the same index location in OldEditedTextArray. If the result of 9.10 above is "Yes" i.e. "True"; proceed to 9.11. Otherwise, if the result of 9.10 above is "No" i.e. "False"; proceed to 9.12.

9.11 Apply inverse video highlighting formatting (background and fore text colour) to the "word" text identified at current ItemCounter index location in NewEditedTextArray thus characterizing the word as highlighted edited text.

9.12 Repeat the iteration started above in 9.7; Iteration through OldEditedTextArray and NewEditedTextArray ends when ItemCounter value gets incremented beyond the maximum index (size) value of NewEditedTextArray of words.

9.13 Construct the "EditedText" string by joining the processed NewEditedTextArray of words—that contains the inverse video highlighting effect for the identified "words" that differ from corresponding index word in OldEditedTextArray.

9.14 Apply inverse video highlighting (background and fore text colour) display formatting to the NewText.

9.15 Combine together the OldText, EditedText and NewText to construct the updated transcript and write to the Viewer display. This updated transcript text displayed on the viewer screen shows the old unedited text in normal formatting. However the edited portions of old text and new text are shown as highlighted in inverse video formatting.

9.16 Append the NewEditedText and NewText strings to the OldText so that the OldText now refers to the whole transcript text string received and displayed on viewer screen up to current streaming request cycle. In this manner, the EditedText and NewText identified and highlighted during the current streaming request subsequently becomes the part of OldText for the next streaming requests that result in subsequent turning off the highlighting from earlier highlighted text and the highlighting effect moves to new changes and/or additions identified in next streaming request cycle.

9.17 Execute a routine to Scroll New Text into View. This routine (set of commands) programmatically re-positions the web browser's vertical scroll bar to automatically scroll down such that the new added text to viewer screen in each repeated streaming request cycle is automatically made viewable to the viewer in case the page display size has grown beyond the vertical (height) dimensions of the viewer's (user) browser display area.

9.18 Viewer Display formatting and highlighting of new text and edited changes Algorithm ends.

Figure 9C:
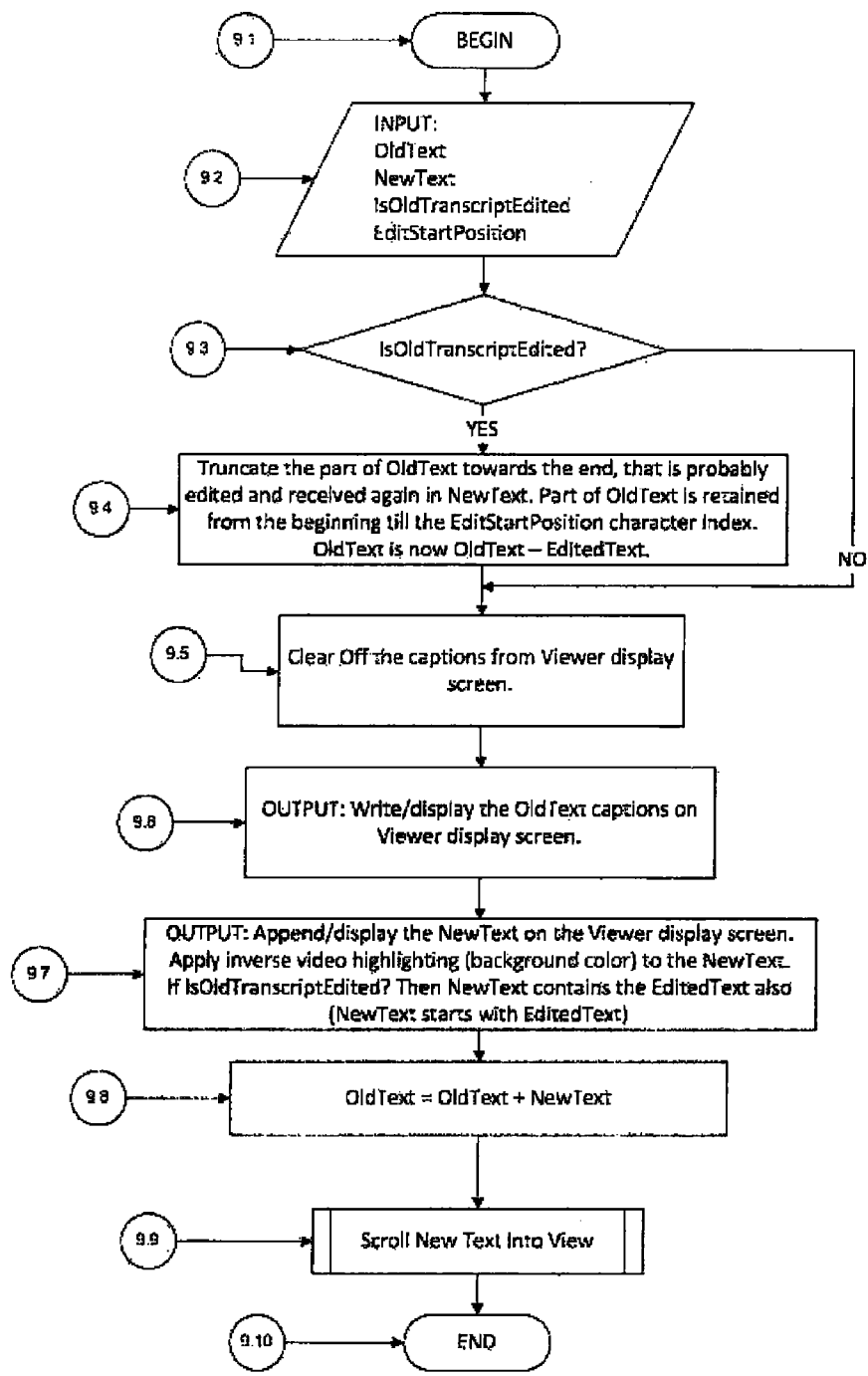
FIG. 9C provides a flowchart illustration of an alternative embodiment of the Viewer Display routine, algorithm or process.

FIG. 9C provides a flowchart illustration of an alternative embodiment of the viewer display routine, algorithm or process.

Viewer display routine, algorithm or process (Alternative)

9.1 Viewer Display formatting and highlighting of new text and edited changes algorithm begins.

9.2 Input to the viewer display algorithm is the Live Session and Transcript state data received in XML (Extensible Mark-up Language) format. The essential attributes of this XML data include:

NewText—the transcript text update received during the current streaming cycle as "New Text".

IsOldTranscriptEdited—Boolean status flag that indicates (indication from server) whether a portion or whole of the "Old Text" already streamed and displayed on the viewer screen has been received on the server as re-streamed content following some editing/corrections from the captioner.

EditStartPosition—the nearest character position index preceding the detected editing index position in the "Old Text".

Apart from these data attributes received from the server during each streaming request cycle, the viewer display algorithm also maintains some instance state variables including primarily:

OldText—the transcript text already fetched and displayed on viewer page during last streaming cycle.

9.3 Check the IsOldTranscriptEdited FLAG status to verify whether the server has returned a "Yes" i.e. "True" status indicating any editing or correction in the old transcript text already streamed and displayed on viewer screen during the preceding streaming requests. If the result of 9.3 above is "Yes" i.e. "True"; proceed to 9.4. Otherwise if the result of 9.3 above is "No" i.e. "False"; proceed to 9.5.

9.4 Truncate the part of OldText towards the end, that is probably edited and received again in NewText. Part of OldText is retained from the beginning till the EditStartPosition character Index.

OldText is now OldText—EditedText.

9.5 Clear Off the captions from Viewer display screen. Make the viewer screen blank for rewriting the latest captions. This process is unobtrusive and seamless so that the viewer does NOT notice the present captions being wiped off from his screen prior to rewriting the latest captions.

9.6 Write/display the OldText captions on Viewer display screen.

9.7 Append/display the NewText on the Viewer display screen. Apply inverse video highlighting (background color)

to the NewText. If "IsOldTranscriptEdited" Then NewText contains the EditedText also (in this case NewText starts with EditedText)

9.8 Recalculate and maintain OldText=OldText+NewText, i.e. NewText appended to OldText.

9.9 Execute a routine to Scroll New Text into View. This routine (set of commands) programmatically re-positions the web browser's vertical scroll bar to automatically scroll down such that the new added text to viewer screen in each repeated streaming request cycle is automatically made viewable to the viewer in case the page display size has grown beyond the vertical (height) dimensions of the viewer's (user) browser display area.

Viewer Display formatting and highlighting of new text and edited changes. Algorithm ends.

The experience of a viewer may vary depending on the configuration being used in the operation of the system, including depending on whether the captioner and/or the viewer are located near to, or remotely from, the voice/sound to be captioned. Where the captioner is in a remote location from the voice/sound to be captioned, and the viewer is located near to the voice/sound to be captioned, the experience of the viewer may, for example, be as follows:

The viewer or another person or automated process connects microphone and audio equipment and telephony required to deliver audio to remote captioner.

The viewer enters Ai-Live URL in web browser.

The viewer logs in on login page, using designated user-ID and password after agreeing to terms and conditions, if required.

The viewer selects desired session from drop-down list.

The Ai-Live viewer screen appears and the viewer's presence is noted in the secure chat panel window.

At this point, the captioner and viewer can communicate via the secure public chat panel.

Session commences and viewer receives live text streaming of audio content as entered by remote captioner.

At any point, the viewer can change text formatting and appearance, such as, font size, style, colour, background colour, highlight colour, and other visual features.

The latest and most recently amended streaming text is highlighted with a background colour and appears in reverse video mode to assist the viewer in following the text and changes to the text.

The viewer can scroll back to previous text as desired.

The viewer can securely communicate with fellow viewer(s) and captioner(s) of the same session using the secure public chat panel at any time during the session.

Session ends and viewer exits session.

Viewer can fill in pop-up feedback form, if available.

Transcript can be available after the session if requested.

Ai-Flo

Some preferred embodiments of the system further include an application referred to herein as "Ai-Flo". Ai-Flo is preferably adapted to handle administrative aspects associated with management of single or multiple live streaming sessions that are joined by viewer and captioners using the M-Live system.

Preferably, the sessions are originally generated by Ai-Flo. The costing, user management and session management can all be handled using Ai-Flo. In some preferred embodiments, costing can be structured in a number of ways and may be related to credits assignment, session duration based credit deduction, or other suitably structured arrangements. The entities that may have input to Ai-Flo of some preferred embodiments include:

1. Administrator/SuperAdministrator
2. Customers
3. Business Units
4. Viewers
5. Captioners Administrator/SuperAdministrator: In some preferred embodiments, the administrator or superadministrator is assigned the right to create customers. Credits are assigned to the customer against the cash remitted by the customer. All reports are accessible to the administrator or superadministrator.

Customers: The customers are created and assigned credits by the administrator or superadministrator. The customers in turn can, in some preferred embodiments, create channels or schools. Credits can then be further assigned to the schools/channels. In some such preferred embodiments, customers are assigned the right to create channels, assign credits to channels, and generate reports.

Business Units: In some preferred embodiments, Business Units are the entities that can directly create sessions and assign viewers to the sessions. The session creation is preferably validated by reference to a number of variables, including, for example, date, time and available credits. After session creation the viewers are preferably assigned to the sessions. Credits are preferably deducted from the account of the viewers.

Viewers: Viewers creation and assignment is preferably handled by the Business Units. In some preferred embodiments, viewers are provided with a username and password to enable login to the Ai-Live system.

Captioners: Captioners preferably login to the Ai-Live system using credentials, such as username and password, which can be provided by the administrator or superadministrator.

The main task of session management is preferably dealt with in Ai-Flo. Sessions created by channels are assigned a unique session-ID which are in turn preferably used by the Ai-Live system. In some preferred embodiments, information about live sessions, including, for example, time to expire, dates, and other relevant information is passed on to the Ai-Live system in XML format through web services.

In some preferred embodiments, billing of viewers and captioners can be handled in prepaid and post-paid format. Preferably, credits are assigned against the cash remitted by customers. The credits are preferably deducted as and when the viewer joins and exits the session depending on, for example, the length of the session, or on the contractual terms entered into by each customer.

In some such preferred embodiments, the credits are assigned in the following manner Admin→Customer-→Business Units→Viewers. Each assignment and deduction of credits is logged into a database, which is preferably able to provide the balance of available credit for a particular customer at a given point in time.

Preferably, reports pertaining to different types of users are available under a reports menu or reports section of another menu. In preferred embodiments, data in the various tables in the databases recording Ai-Flo information can be exported to ".csv" files using export functionality.

The process of customer creation to viewer logging into the Ai-Live system according to some preferred embodiments is as follows:

1. Administrator creates customer; Assigns credits.
2. New service type can be created to specify the rates for future contracts.

3. A new contract is created for each Customer. One contract can be associated with one Customer only. But one Customer can be associated with several contracts.

4. Newly created Customer is associated with contract.

5. Customer then creates Business Units and assigns credits to them.

6. Business Units in turn create viewers and assigns credits to them.

7. The Viewers and Captioners log in to the Ai-Live system using the credentials provided.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be noted that, throughout the description and claims of this specification, the word 'comprise' and variations of the word, such as 'comprising' and 'comprises', is not intended to exclude other variants or additional components, integers or steps. Modifications and improvements to the invention will be readily apparent to those skilled in the art. Such modifications and improvements are intended to be within the scope of this invention.

The invention claimed is:

1. A system for real time streaming of a text string which is periodically updated comprising:
a processor; and
memory including processor-executable instructions that, when executed by the processor, enable communications with a server to process a first text string inputted via a first text input and update the first text string in real time with additional or edited text string portions inputted via a second text input to thereby generate a second text string;
the instructions further enabling the processor to periodically monitor a state of at least the second text string and generate an output text string therefrom, the output text string being communicated to a server for streaming to a text viewer,
wherein the output text string is updated to substantially correspond to the second text string, such that the output text string represents the updated text string, thereby facilitating editing of text string portions already communicated to the server,
wherein the output text string is communicated to the server in response to an asynchronous request from the text viewer,
wherein the instructions further enable a determination of whether the asynchronous request from the text viewer for the output text string is a first request from the text viewer,
wherein the instructions further enable, in the event of the first request from the text viewer, a determination of whether the size of the output text string exceeds a predetermined value, and depending on the result of the determination, streaming of either the output text string or a modified output text string to the text viewer, and
wherein the modified output text string is the output text string suitably truncated such that the size thereof does not exceed the predetermined value.

2. The system according to claim 1, wherein the second text string is generated by identification of presence of additional text or edited text portions in the first text string inputted since the previous communication of the output text string to the server.

3. The system according to claim 1, wherein the output text string is generated when one or more of the first text string, the additional or edited text string portions, and the second text string reaches a predetermined character length.

4. The system according to claim 1, wherein the first text string is processed by the allocation of different characteristics to different portions of the first text string.

5. The system according to claim 4, wherein a first portion of the first text string is allocated a locked transcript characteristic, substantially inhibiting the first portion of the first text string from being edited, and a second portion of the first text string is allocated a floating transcript characteristic, substantially allowing the second portion of the first text string to be edited.

6. The system according to claim 5, wherein the second text string is generated by identification of presence of additional text or edited text portions in the floating transcript portion of the first text string inputted since the previous communication of the output text string to the server.

7. The system according to claim 5, wherein the floating transcript portion of the first text string has a predetermined transcript buffer size, such that when exceeded by the first text string, a portion of the first text string is allocated a locked transcript characteristic.

8. The system according to claim 7, wherein the allocated locked transcript characteristic has a predetermined transcript lock size.

9. The system according to claim 8, wherein a locked transcript characteristic is allocated to a portion of the first string in the event that the size of the first text string exceeds the predetermined transcript buffer size and the position of the first text input is spaced from the first character of the first text string by at least the predetermined transcript lock size.

10. The system according to claim 1, wherein the asynchronous request includes information about the most recently received output text string at the text viewer.

11. The system according to claim 10, wherein the information includes an index position of a last character of the most recently received output text string at the text viewer.

12. The system according to claim 1, wherein the determination is made by examination of a characteristic of the most recently-streamed output text string to the text viewer, such as an index position of the last character of the most recently-streamed output text string.

13. The system according to claim 1, wherein the instructions include a module for implementing a delivery-verification routine, algorithm, or process to determine whether the text viewer received the most recently-streamed output text string.

14. The system according to claim 13, wherein the delivery-verification routine, algorithm, or process comprises:
instructions for the processor to extract, from the asynchronous request for an output text string received from the text viewer, information about the most recently received output text string at the text viewer;
instructions for the processor to compare the information to the most recently streamed output text string to thereby determine whether the text viewer received the most recently streamed second text string; and
instructions for the processor to re-stream the most recently streamed output text string in the event that the most recently streamed second text string was not received at the text viewer.

15. The system according to claim 1, wherein multiple sessions are accommodated, wherein the same or different text strings are capable of being inputted and viewed in each session.

16. The system according to claim 1, configured such that the output text string is capable of being streamed to a standard web browser.

17. The system according to claim 16, further including a user interface deliverable to a standard web browser, the interface including functionality enabling a user to control the manner in which the output text string is displayed on the text viewer.

18. The system according to claim 17, wherein the user interface includes functionality enabling the user to control visual features of the display of the output text string including one or more of font size, font style, formatting style, formatting, color, background color, highlight color, continuous or manual scrolling, and other visual features.

19. The system according to claim 16, wherein the output text string is processed prior to streaming to the text viewer so that added or edited text string portions are displayed in a different format to a format of previously streamed output text strings.

20. The system according to claim 19, wherein the output text string is processed by:
identification of a first output text string as the output text string displayed since a previous streaming of an output text string;
identification of whether at least a portion of the first output text string has changed since a previous streaming of an output text string;
identification of differences between the first output text string and the changed output text string; and
application of formatting to the differences which is unlike formatting applied to the first output text string.

21. The system according to claim 19, wherein the output text string is processed by:
identification of a first output text string as the output text string displayed since a previous streaming of an output text string;
identification of whether at least a portion of the first output text string has been changed since a previous streaming of an output text string thereby nominally giving rise to a changed output text string; truncating part of the first output text string;
cessation of display of the first output text string on the text viewer;
appending the changed output text string to the truncated first output text string to thereby generate a new output text string; and displaying the new output text string on the text viewer.

22. The system according to claim 20, wherein different formatting is applied for a predetermined period, upon expiry of which the formatting reverts to the formatting applied to the first output text string.

23. The system according to claim 17, wherein the user interface includes functionality enabling the user to scroll through previously streamed text.

24. The system according to claim 1, further including an operations manager that provides user and session management of at least one text streaming session.

25. The system according to claim 24, wherein the operations manager further provides and manages a costing structure and billing facility for each streaming session.

26. The system according to claim 1, further including a public chat window enabling interactivity among users or session participants.

27. A system for real-time streaming of a text string which is periodically updated, the system comprising:
a web server comprising:
a plurality of network interfaces that enables the web server to establish and facilitate live captioning sessions between a plurality of client devices;
a processor coupled to the plurality of network interfaces; and
memory coupled with the processor including instructions that, when executed by the processor, enable the server to:
receive, via at least one of the plurality of network interfaces, a first text string inputted via a first text input;
process and update the first text string in real time and during a live captioning session with additional or edited text string portions inputted via a second text input to thereby generate a second text string; and
periodically monitor a state of at least the second text string and generate an output text string therefrom, the output text string being communicated via the at least one of the plurality of network interfaces for streaming to a text viewer,
wherein the output text string is updated to substantially correspond to the second text string, such that the output text string represents the updated text string, thereby facilitating editing of text string portions already communicated to the server,
wherein the output text string is communicated in response to an asynchronous request from the text viewer,
wherein the instructions further enable a determination of whether the asynchronous request is a first request from the text viewer,
wherein the instructions further enable, in the event of the first request from the text viewer, a determination of whether the size of the output text string exceeds a predetermined value, and depending on the result of the determination, streaming of either the output text string or a modified output text string to the text viewer, and
wherein the modified output text string is the output text string suitably truncated such that the size thereof does not exceed the predetermined value.

28. The system of claim 27, wherein the output text string is communicated to the server.

29. The system of claim 27, wherein the live captioning session utilizes the Hyper Text Transfer Protocol (HTTP) and wherein the web server communicates the second text string to a browser of a first client device.

30. The system of claim 27, wherein the instructions further enable the server to maintain the live captioning session in an object-oriented fashion.

31. The system of claim 30, wherein the instructions enable the server to maintain the live captioning session in the object-oriented fashion by:
creating an object-oriented construct of the live captioning session; and
storing the object-oriented construct of the live captioning session as an application variable.

32. The system of claim 27, wherein the first text input corresponds to a client device of a captioner and wherein second and third client devices participating in the live captioning session correspond to client devices of hearing-impaired users, thereby enabling the hearing-impaired users to receive real-time captions of the captioner's verbal discussion.

33. The system of claim 27, wherein the web server receives a live session identifier from at least one client device.

* * * * *